US006565434B1

(12) United States Patent
Acres

(10) Patent No.: US 6,565,434 B1
(45) **Date of Patent: *May 20, 2003**

(54) METHOD AND APPARATUS FOR PROMOTING PLAY ON A NETWORK OF GAMING DEVICES

(75) Inventor: John Acres, Corvallis, OR (US)

(73) Assignee: Acres Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/425,544

(22) Filed: Oct. 22, 1999

Related U.S. Application Data

(62) Division of application No. 08/843,411, filed on Apr. 15, 1997, now Pat. No. 6,319,125, which is a continuation of application No. 08/465,915, filed on Jun. 6, 1995, now Pat. No. 5,752,882, which is a division of application No. 08/322,172, filed on Oct. 12, 1994, now Pat. No. 5,655,961.

(51) Int. Cl.[7] .................................. A63F 13/00
(52) U.S. Cl. .................................. 463/25; 463/27; 463/42
(58) Field of Search .................................. 463/1, 16–20, 463/25–28

(56) References Cited

U.S. PATENT DOCUMENTS

| | | | | |
|---|---|---|---|---|
| 3,598,964 | A | 8/1971 | Dell et al. | 235/382 |
| 3,659,284 | A | 4/1972 | Rusch | 340/324 A |
| 3,796,433 | A | 3/1974 | Fraley et al. | 273/138 A |
| 3,819,186 | A | 6/1974 | Hinterstocker | 273/138 A |
| 4,072,930 | A | 2/1978 | Lucero et al. | 340/152 T |
| 4,230,265 | A | 10/1980 | Casaly | 273/138 A |
| 4,258,838 | A | 3/1981 | Rockola et al. | 194/1 R |
| 4,283,709 | A | 8/1981 | Lucero et al. | 340/147 R |
| 4,335,809 | A | 6/1982 | Wain | 194/1 R |
| 4,409,656 | A | 10/1983 | Anderson | 364/200 |
| 4,467,424 | A | 8/1984 | Hedges et al. | 364/412 |
| 4,575,622 | A | 3/1986 | Pellegrini | 235/382 |
| 4,582,324 | A | 4/1986 | Koza et al. | |
| 4,624,459 | A | 11/1986 | Kaufman | 273/143 R |
| 4,636,951 | A | 1/1987 | Harlick | 364/412 |

(List continued on next page.)

FOREIGN PATENT DOCUMENTS

| | | |
|---|---|---|
| AU | B 27572/84 | 11/1984 |
| AU | B 53370/86 | 8/1986 |
| AU | 589158 | 10/1989 |

(List continued on next page.)

OTHER PUBLICATIONS

Report & Recommendation (Findings of Fact & Conclusions of Law Re: Claim Construction), May 2000.
Expert Report of Michael J. Bennett Pursuant to Fed. R. Civ. P. 26(A(2)(sic), Feb. 1999.

(List continued on next page.)

*Primary Examiner*—Michael O'Neil
*Assistant Examiner*—John M. Hotaling, II
(74) *Attorney, Agent, or Firm*—Marger & Johnson & McCollom, P.C.

(57) ABSTRACT

A method and apparatus for controlling a bonusing promotion system using a bonus server interconnected to a plurality of gaming devices is described. A percentage of a wager played on each gaming device is accumulated into a bonus pool stored on the bonus server. The bonus pool is compared to a threshold value stored on the bonus server each time the bonus pool changes. One of the gaming devices is selected when the threshold value is substantially met. A bonus prize funded by the bonus pool is awarded to the selected gaming device.

40 Claims, 31 Drawing Sheets

U.S. PATENT DOCUMENTS

| | | | | | |
|---|---|---|---|---|---|
| 4,652,998 | A | | 3/1987 | Koza et al. | 364/412 |
| 4,669,596 | A | | 6/1987 | Capers et al. | 194/210 |
| 4,669,730 | A | | 6/1987 | Small | 273/138 |
| 4,679,143 | A | | 7/1987 | Hagiwara | 364/412 |
| 4,760,247 | A | | 7/1988 | Keane et al. | 235/454 |
| 4,760,527 | A | | 7/1988 | Sidley | 364/412 |
| 4,764,666 | A | | 8/1988 | Bergeron | 235/380 |
| 4,775,937 | A | | 10/1988 | Bell | 364/412 |
| 4,805,907 | A | | 2/1989 | Hagiwara | 273/138 |
| 4,815,741 | A | | 3/1989 | Small | 273/138 A |
| 4,837,728 | A | | 6/1989 | Barrie et al. | 364/412 |
| 4,839,640 | A | | 6/1989 | Ozer et al. | 340/825.34 |
| 4,844,464 | A | | 7/1989 | Berge | 273/138 A |
| 4,856,787 | A | | 8/1989 | Itkis | 273/237 |
| 4,880,237 | A | | 11/1989 | Kishishita | 273/138 A |
| 4,882,473 | A | | 11/1989 | Bergeron et al. | 235/380 |
| 4,922,420 | A | | 5/1990 | Nakagawa et al. | |
| 4,926,327 | A | | 5/1990 | Sidley | 364/412 |
| 4,926,996 | A | | 5/1990 | Eglise et al. | |
| 4,948,138 | A | | 8/1990 | Pease et al. | |
| 4,964,638 | A | | 10/1990 | Ishida | 273/138 A |
| 4,991,848 | A | | 2/1991 | Greenwood et al. | 273/143 R |
| 5,007,649 | A | | 4/1991 | Richardson | 273/237 |
| 5,016,880 | A | | 5/1991 | Berge | |
| 5,038,022 | A | | 8/1991 | Lucero | 235/380 |
| 5,042,810 | A | | 8/1991 | Williams | 273/142 |
| 5,043,887 | A | | 8/1991 | Richardson | |
| 5,072,381 | A | | 12/1991 | Richardson et al. | |
| 5,078,405 | A | | 1/1992 | Jones | 273/309 |
| 5,096,195 | A | | 3/1992 | Gimmon | 273/138 A |
| 5,103,081 | A | | 4/1992 | Fisher et al. | 235/464 |
| 5,116,055 | A | | 5/1992 | Tracy | 273/138 A |
| 5,123,649 | A | | 6/1992 | Tiberio | 273/143 R |
| 5,129,652 | A | | 7/1992 | Wilkinson | 273/139 |
| 5,135,224 | A | | 8/1992 | Yamamoto et al. | 273/143 R |
| 5,159,549 | A | | 10/1992 | Hallman, Jr. et al. | |
| 5,179,517 | A | | 1/1993 | Sarbin et al. | 364/410 |
| 5,197,094 | A | | 3/1993 | Tillery et al. | 379/91 |
| 5,216,613 | A | | 6/1993 | Head, III | 369/275.2 |
| 5,217,224 | A | | 6/1993 | Sincock | 273/138 A |
| 5,224,706 | A | | 7/1993 | Bridgeman et al. | |
| 5,242,163 | A | | 9/1993 | Fulton | 273/85 CP |
| 5,249,800 | A | | 10/1993 | Hilgendorf et al. | 273/138 A |
| 5,257,179 | A | | 10/1993 | DeMar | 364/410 |
| 5,265,874 | A | | 11/1993 | Dickinson et al. | 273/138 A |
| 5,275,400 | A | * | 1/1994 | Weingardt et al. | 463/27 |
| 5,280,909 | A | | 1/1994 | Tracy | 273/138 A |
| 5,286,023 | A | | 2/1994 | Wood | 273/138 A |
| 5,287,269 | A | | 2/1994 | Dorrough et al. | 364/408 |
| 5,292,127 | A | | 3/1994 | Kelly et al. | 273/138 R |
| 5,321,241 | A | | 6/1994 | Craine | |
| 5,324,035 | A | | 6/1994 | Morris | 273/138 |
| 5,326,104 | A | | 7/1994 | Pease et al. | 273/138 A |
| 5,332,219 | A | | 7/1994 | Marnell, II et al. | |
| 5,342,049 | A | | 8/1994 | Wichinsky et al. | |
| 5,344,144 | A | * | 9/1994 | Canon | 273/138 |
| 5,345,379 | A | | 9/1994 | Brous et al. | 235/382 |
| 5,351,970 | A | | 10/1994 | Fioretti | |
| 5,370,306 | A | | 12/1994 | Schulze et al. | 273/138 A |
| 5,370,399 | A | | 12/1994 | Liverance | |
| 5,371,345 | A | | 12/1994 | LeStrange et al. | 235/380 |
| 5,398,932 | A | | 3/1995 | Eberhardt et al. | |
| 5,401,024 | A | | 3/1995 | Simunek | |
| 5,410,590 | A | | 4/1995 | Blood et al. | |
| 5,429,361 | A | | 7/1995 | Raven et al. | 273/138 A |
| 5,470,079 | A | | 11/1995 | LeStrange | 273/138 |
| 5,472,194 | A | | 12/1995 | Breeding et al. | 273/138 A |
| 5,473,144 | A | | 12/1995 | Mathurin, Jr. | 235/380 |
| 5,477,040 | A | | 12/1995 | Lalonde | 235/380 |
| 5,488,411 | A | | 1/1996 | Lewis | |
| 5,494,287 | A | | 2/1996 | Manz | 273/143 |
| 5,507,489 | A | | 4/1996 | Reibel et al. | |
| 5,511,781 | A | | 4/1996 | Wood et al. | |
| 5,524,888 | A | | 6/1996 | Heidel | |
| 5,533,727 | A | | 7/1996 | DeMar | 463/23 |
| 5,536,016 | A | | 7/1996 | Thompson | 273/269 |
| 5,542,669 | A | | 8/1996 | Charron et al. | |
| 5,550,359 | A | | 8/1996 | Bennett | 235/382 |
| 5,551,692 | A | | 9/1996 | Pettitt et al. | 273/143 R |
| 5,559,312 | A | | 9/1996 | Lucero | 235/380 |
| 5,564,700 | A | * | 10/1996 | Celona | 463/27 |
| 5,577,959 | A | | 11/1996 | Takemoto et al. | 463/25 |
| 5,580,309 | A | | 12/1996 | Piechowiak | 463/16 |
| 5,580,310 | A | | 12/1996 | Orus et al. | 463/16 |
| 5,586,936 | A | | 12/1996 | Bennett | 463/25 |
| 5,586,937 | A | | 12/1996 | Menashe | |
| 5,603,659 | A | | 2/1997 | Okada | |
| 5,611,730 | A | * | 3/1997 | Weiss | 463/20 |
| 5,651,057 | A | | 7/1997 | Blood et al. | |
| 5,655,961 | A | * | 8/1997 | Acres et al. | 463/27 |
| 5,668,950 | A | | 9/1997 | Kikuchi | 395/200.47 |
| 5,674,128 | A | | 10/1997 | Holch et al. | 463/42 |
| 5,702,304 | A | | 12/1997 | Acres et al. | 463/29 |
| 5,722,891 | A | * | 3/1998 | Inoue | 463/20 |
| 5,741,183 | A | | 4/1998 | Acres et al. | 463/42 |
| 5,743,523 | A | | 4/1998 | Kelly et al. | 273/138.1 |
| 5,752,882 | A | | 5/1998 | Acres et al. | 463/42 |
| 5,758,875 | A | | 6/1998 | Giacalone, Jr. | 273/143 R |
| 5,761,647 | A | | 6/1998 | Boushy | 705/10 |
| 5,766,076 | A | * | 6/1998 | Pease et al. | 463/27 |
| 5,770,533 | A | | 6/1998 | Franchi | 463/42 |
| 5,811,772 | A | | 9/1998 | Lucero | 235/380 |
| 5,816,917 | A | | 10/1998 | Kelmer et al. | 463/16 |
| 5,816,918 | A | * | 10/1998 | Kelly et al. | 463/16 |
| 5,820,459 | A | | 10/1998 | Acres et al. | 463/25 |
| 5,833,540 | A | | 11/1998 | Miodunski | 463/42 |
| 5,836,817 | A | | 11/1998 | Acres | 463/26 |
| 5,839,956 | A | | 11/1998 | Takemoto | 463/25 |
| 5,851,148 | A | * | 12/1998 | Brune et al. | 463/25 |
| 5,851,149 | A | * | 12/1998 | Xidos et al. | 463/42 |
| 5,854,542 | A | | 12/1998 | Forbes | 315/291 |
| 5,902,983 | A | | 5/1999 | Crevelt et al. | 235/380 |
| 5,919,091 | A | | 7/1999 | Bell et al. | 463/25 |
| 6,012,982 | A | * | 1/2000 | Piechowiak et al. | 463/16 |
| 6,039,648 | A | * | 3/2000 | Guinn et al. | 463/163 |
| 6,048,269 | A | | 4/2000 | Burns et al. | 463/25 |
| 6,077,162 | A | * | 6/2000 | Weis | 463/26 |

FOREIGN PATENT DOCUMENTS

| | | |
|---|---|---|
| AU | B 71194/91 | 8/1991 |
| AU | B 10488/92 | 7/1992 |
| AU | B 13023/92 | 9/1992 |
| AU | 20209/86 | 1/1993 |
| AU | B 20986/92 | 1/1993 |
| AU | 649009 | 5/1994 |
| AU | 21618/95 | 1/1996 |
| AU | 633469 | 1/1998 |
| AU | A 48323/97 | 6/1998 |
| GB | 2 151 054 A | 7/1985 |
| GB | 2 211 975 A | 7/1989 |
| WO | WO 94/12256 | 6/1994 |
| WO | WO 95/22811 | 8/1995 |
| WO | WO 95/30944 | 11/1995 |
| WO | WO 97/12338 | 4/1997 |
| WO | WO 98/35309 | 8/1998 |
| WO | WO 98/40140 | 9/1998 |

OTHER PUBLICATIONS

Expert Report of Michael J. Bennett Pursuant to Fed. R. Civ. P. 26(A)(2), Jul. 1999.

Expert Witness Report of Leroy A. Prohofsky, Feb. 1999.

Expert Witness Report of Leroy A. Prohofsky, Jun. 1999.

Supplement to Expert Witness Reports of Leroy A. Prohofsky, Jun. 1999.

Second Supplement to Expert Witness Reports of Leroy A. Prohofsky, Sep. 1999.

Rebuttal Statement by Expert Witness William K. Bertram, Ph.D., Mar. 1999.

Rebuttal Statement by Expert Witness John F. Acres, Jul. 1999.

Rebuttal Statement by Expert Witness William K. Bertram, Ph.D., Jul. 1999.

Expert Witness Report of R. Franklin Burnett, Jun. 1999.

Rebuttal Statement by Expert Witness Thomas F. Smegal, Jr., Jul. 1999.

* cited by examiner

Fig. 4
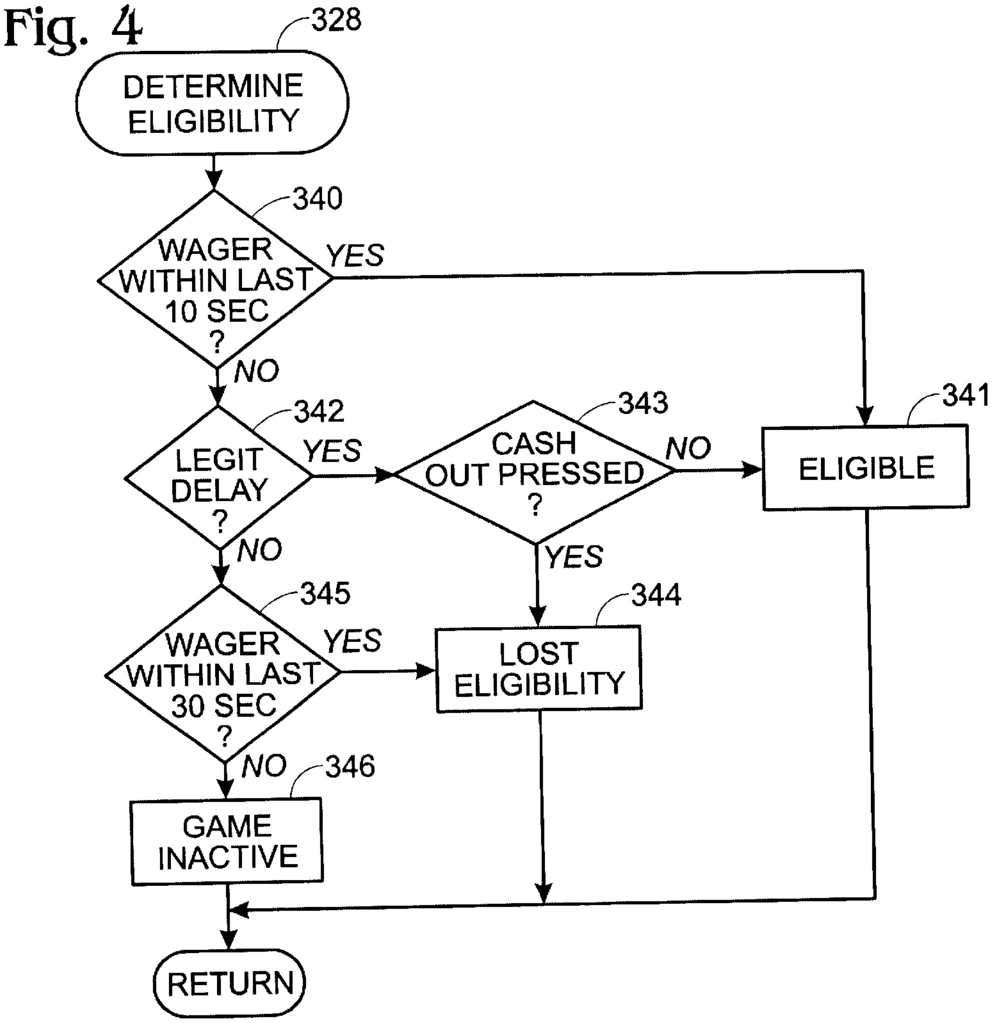
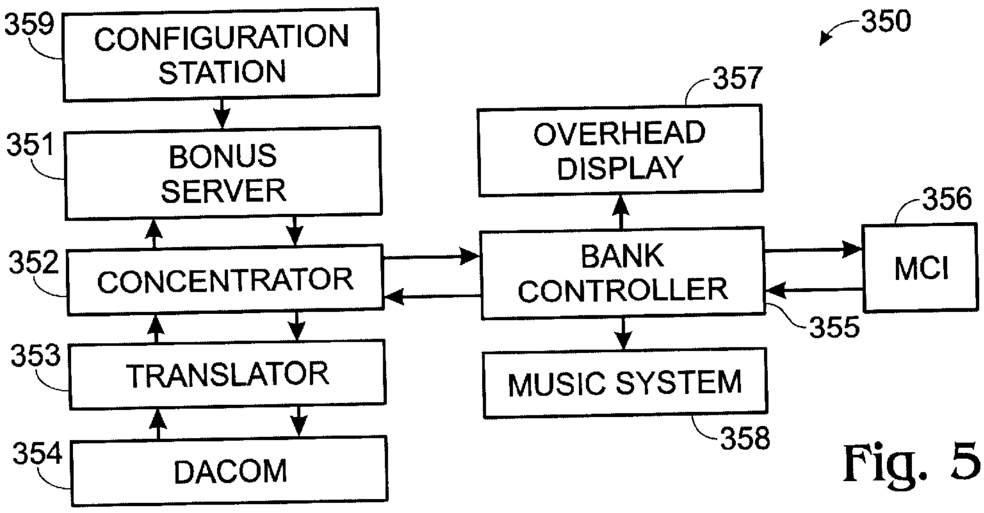
Fig. 5

TO FIG. 32B

METHOD AND APPARATUS FOR PROMOTING PLAY ON A NETWORK OF GAMING DEVICES

This application is a divisional of U.S. patent application Ser. No. 08/843,411, filed Apr. 15, 1997 now U.S. Pat. No. 6,319,125 which is a continuation of application Ser. No. 08/465,915, file Jun. 6, 1995, now U.S. Pat. No. 5,752,882, which is a divisional of application Ser. No. 08/322,172, filed Oct. 12, 1994, now U.S. Pat. No. 5,655,961.

BACKGROUND OF THE INVENTION

This invention relates generally to gaming devices and more particularly to a method and apparatus for promoting play on a network of gaming devices.

SUMMARY OF THE INVENTION

An embodiment of the present invention is a method and apparatus for controlling a bonusing promotion system using a bonus server interconnected to a plurality of gaming devices. A percentage of a wager played on each gaming device is accumulated into a bonus pool stored on the bonus server. The bonus pool is compared to a threshold value stored on the bonus server each time the bonus pool changes. One of the gaming devices is selected when the threshold value is substantially met. A bonus prize funded by the bonus pool is awarded to the selected gaming device.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 4 shows a flow diagram of a routine for determining bonus eligibility in the method shown in FIG. 3.

FIG. 5 shows a functional block diagram of a bonus promotion system according to the present invention.

DETAILED DESCRIPTION

U.S. patent applications Ser. No. 08/322,172 entitled "METHOD AND APPARATUS FOR OPERATING NET- WORKED GAMING DEVICES," filed Oct. 12, 1994, now U.S. Pat. No. 5,655,961, and Ser. No. 08/647,621 entitled "METHOD AND APPARATUS FOR IMPLEMENTING A JACKPOT BONUS ON A NETWORK OF GAMING DEVICES," filed May 13, 1996, now U.S. Pat. No. 5,752,882, are incorporated herein by reference for all purposes.

Table of Contents

I. Bonus Promotion Description and Operation
- A. Gaming Device
- B. Individual Bonus Promotions
  1. Cash Bonus Prize
  2. Participation (Mystery) Bonus Prize
  3. Progressive Jackpot Bonus Prize
  4. Multiple Jackpot Bonus Prize
  5. Welcome Back Bonus Prize
  6. Match Play Bonus Prize
  7. Personal Progressive Bonus Prize
- C. Player Eligibility II. Bonus Promotion System
- A. Overview
- B. Bonus Server
  1. Cash, Mystery and Progressive Bonuses
  2. Multiple Jackpot
  3. Player Points
  4. Welcome Back Bonus
  5. Match Play Bonus
  6. Personal Progressive Bonus
- C. Bank Controller
- D. Machine Communication Interface
- E. Card Reader
- F. Display III. Operation
- A. Data Flow Between Components
  1. Overview
  2. Cash Bonus
  3. Mystery Bonus
     a. Overview
     b. Functional Operation
     c. Card Insertion Event
     d. Operation During Play
     e. Card Removal Event
  4. Progressive Bonus
  5. Multiple Jackpot
     a. Overview
     b. Functional Operation
     c. Card Insertion Event
     d. Operation During Play
     e. Card Removal Event
- B. Bonus Server
- C. Bank Controller
- D. Machine Communication Interface
  1. Memory Structure
  2. Boot Loader Operation
  3. Communication With Bank Controller
  4. Code Updates
  5. Communication With Gaming Device
  6. Communication With Peripheral Devices
  7. Bonus Engines
  8. Player Tracking Records
  9. Software Structure
     a. Software Modules
     b. Module Implementation
     c. Bank Controller Communication Super Module
     d. Local OL Communication Super Module
     e. Gaming Device Communication Module

I. Bonus Promotion Description and Operation

A. Gaming Device

Figure 1:
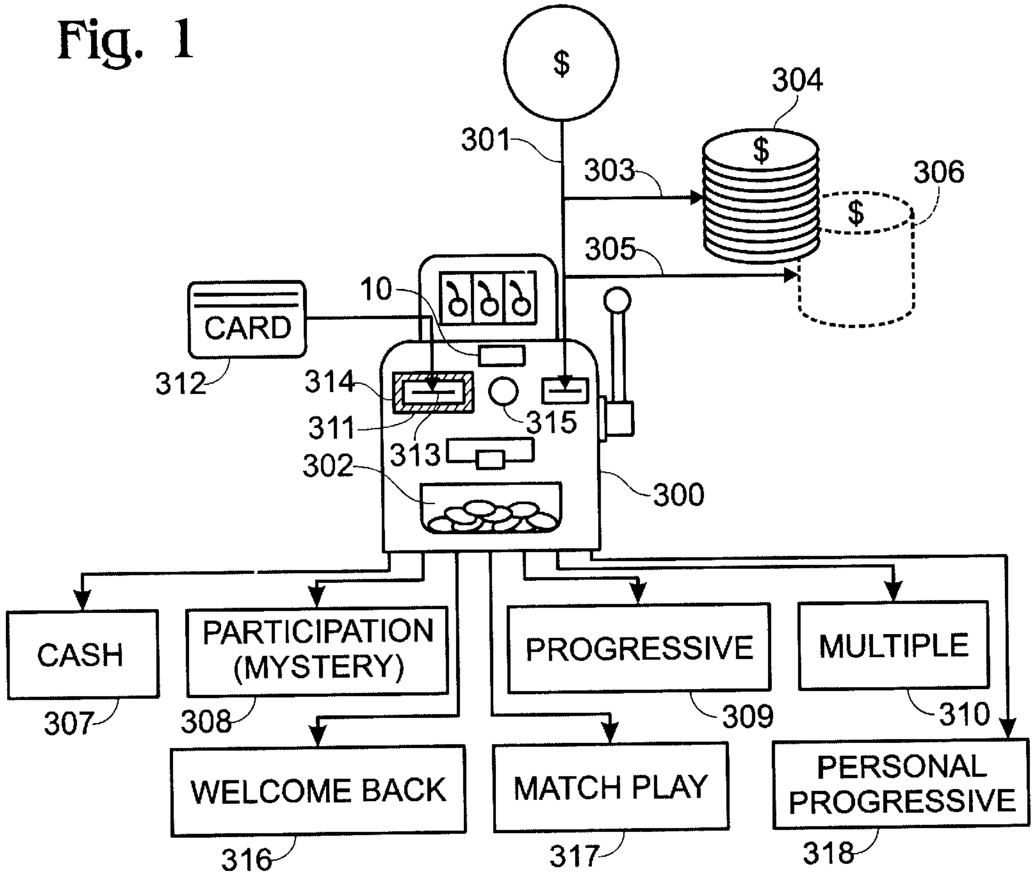
FIG. 1 shows a functional block diagram of a gaming device according to the present invention.

FIG. 1 shows a functional block diagram of a gaming device 300 according to the present invention. The gaming device 300 (also referred to as an electronic gaming machine or "EGM") is configured as a component in a bonus promotion system, which is further described below with reference to FIG. 5. Each gaming device 300 can be a slot machine or other gaming device. During operation of the gaming device 300, a player (not shown) places a wager 301 on the gaming device 300. The wager 301 generally represents some multiple of a fixed monetary value, also known as "coin-in." If the player wins the game, a jackpot 302 equalling some multiple of the wager 301 in the form of coins, tokens or credits is awarded to the player according to a payout table (not shown) associated with the gaming device 300.

According to the present invention, bonus prizes are awarded as part of bonus promotions. The gaming industry is highly regulated and some minimum percentage of all coin-in must be paid out at each gaming device 300. The bonus promotions create bonus prizes which are awarded in addition to the jackpots 302 based on a separate set of payout tables or criteria, as further described below in Section III. A bonus prize can be in the form of cash, credits or non-monetary awards, such as a car, or any combination thereof. The bonus prize can also be tiered into a main bonus prize and multiple secondary bonus prizes, plus optional consolation prizes, and similar combinations.

Each gaming device 300 has a display assembly 210, a bonus button 315 and an audible bonus indicator (ABI) 122 (shown in FIG. 10) for providing a visual and audible indication of bonus prize award status. Generally, when a bonus prize is about to be awarded, the display assembly 210 on each active or eligible gaming device 300 begins to flash. Player eligibility is discussed further in Section I.C. Once a winning gaming device 300 has been selected, the display assembly 310 stops flashing and the bonus button 315 begins to flash and audible bonus indicator 122 (shown in FIG. 10) begins to beep if a consolation prize is being awarded on that particular gaming device 300.

According to the present invention, seven forms of bonus prizes are awarded: cash 307, participation (mystery) 308, progressive 309 and multiple jackpot 310, welcome back 316, match play 317 and personal progressive 318 bonus prizes, as further described below in section i.B. A base percentage 303 of each wager 301 is accumulated into a bonus pool 304 for funding each bonus prize. Optionally, a secondary percentage 305 of each wager 301 is accumulated into a "hidden" pool 306 for creating a seed value for the next bonus prize. At the appropriate time, the bonus prize is awarded based on a predefined bonus criteria at an eligible gaming device 300, thereby depleting the bonus pool 304. Some forms of bonus or consolation prize awarding require the player to accept by pressing a bonus button 315 located on the gaming device 300. The hidden pool 306, if used, is rolled over into the bonus pool 304 to start the next bonus promotion. The bonus prize can be paid to the player through the gaming device 300 or manually.

B. Individual Bonus Promotions

1. Cash Bonus Prize

The cash bonus prize 307 (hereinafter "cash bonus") is a fixed cash prize funded by the bonus pool 304. The cash bonus 307 is awarded when the coin-in collected into the bonus pool 304 substantially equals the cash bonus 307. Consolation prizes, which consist of fixed cash prizes whose values are not based on the bonus pool 304, are also awarded.

The hidden pool 306 is not used to directly fund the cash bonus 307. However, the hidden pool 306 can be used to collect interim coin-in which would otherwise be lost for bonus promotion purposes, such as the coin-in received during periods of gaming device ineligibility or inactivity.

In the described embodiment, the cash bonus 307 is one millon dollars. In addition, consolation prizes of $50 are also awarded. However, only active players whose wagering activity exceeds a predefined frequency of play can win the cash bonus 307. The base percentage 303 of each wager 301 is 0.54% but can be programmed to other desireable percentages. Other values or percentages can be used. The cash bonus 307 is manually awarded when the bonus pool 304 substantially equals one million dollars. Consolation prizes are awarded in three categories. Eligible member players receive 200% of the consolation prize while eligible anonymous players and ineligible, uncarded players receive 100% of the consolation prize. The distinction between member versus anonymous players is described below in Section I.C.

All gaming devices 300 interconnected to the bonus promotion system 350 (shown in FIG. 5) participate in the cash bonus 307. When the bonus pool 304 substantially equals one million dollars, the following sequence of events occurs:

(1) All gaming devices 300 are locked up from further game play, thereby creating a noticeable silence and disrupting normal activities.

(2) The display assembly 210 on each active gaming device 300 begins flashing.

(3) The bonus server 351 (shown in FIG. 5) randomly selects a winner from all active gaming devices 300.

(4) Optionally, an anticipation message is played over the music system 358 (shown in FIG. 5) announcing the imminent awarding of the cash bonus prize.

(5) Floor personnel are notified.

(6) A consolation prize is awarded at all active gaming devices 300 except the winning gaming device 300. For each gaming device 300 receiving a consolation prize, the display assembly 210 stops flashing and the bonus button 315 begins flashing. Preferably, the audible bonus indicator 122 (shown in FIG. 10) begins to beep and a message appears on the display assembly 210 instructing the player to press the bonus button 315 to collect the consolation prize. Preferably, each player has unlimited time to press the bonus button 315. Once the bonus button 315 is pressed, the gaming device 300 awards the consolation prize and unlocks so normal game play can resume.

(7) Optionally, celebration music is played over a public address system (not shown) using the music system 358 for several minutes.

(8) The winner of the cash bonus 307 is manually announced.

(9) The display assembly 210 on the winning gaming device 300 continues flashing and indicates winner status.

(10) The cash bonus 307 is manually paid and the winning gaming device 300 is unlocked.

2. Participation (Mystery) Bonus Prize

The participation (mystery) bonus prize 308 (hereinafter "mystery bonus") is a cash, credit or non-cash prize, such as a car, funded by the bonus pool 304. The mystery bonus 308 is awarded when the coin-in collected into the bonus pool 304 substantially equals a "mystery" threshold. In addition, consolation prizes, which consist of fixed cash prizes also funded by the bonus pool 304, are awarded. Multiple mystery bonuses 308 can be awarded at one time. The mystery threshold is randomly selected before each new promotion starts and must fall within a range of pre-defined values. Player eligibility is required, as described further in Section I.C.

The hidden pool 306 is not used to directly fund the mystery bonus 308. However, the hidden pool 306 can be used to create a seed value for the next set of prizes to be awarded as well as to collect interim coin-in which would otherwise be lost for bonus promotion purposes, such as coin-in received during periods of gaming device ineligibility or inactivity.

In the described embodiment, three kinds of mystery bonuses are awarded. First, a car is awarded when the value of the bonus pool 304 substantially equals a lucky number falling between ten thousand and forty thousand. In addition, progressively larger secondary cash prizes ranging between $100 and $400 and consolation prizes of $50 are also awarded. Funding for the car and secondary cash prizes is provided by the bonus pool 304 and funding for the seed value for the next set of prizes is provided by the hidden pool 306. For the bonus pool 304, the base percentage 303 of each wager 301 is 1.5% for the car and 0.75% for the secondary cash prizes. For the hidden pool 306, the secondary percentage 305 of each wager 301 is 1.0% for the car and 0.5% for the progressive cash prizes. Other values or percentages can be used. The consolation prizes are awarded under the same eligibility categories as the cash bonus 307, but player eligibility is required to win.

Second, a large cash prize is awarded when the value of the bonus pool 304 substantially equals a pre-selected random value falling between $10,000 and $40,000. In addition, progressively larger secondary cash prizes ranging between $100 and $400 and consolation prizes of 50 credits are also awarded. Funding for all cash prizes is provided by the bonus pool 304 and funding for the seed value for the next set of cash prizes is provided by the hidden pool 306. For the bonus pool 304, the base percentage 303 of each wager 301 is 1.5% for the large cash prize and 0.75% for the progressive cash prizes. For the hidden pool 306, the secondary percentage 305 of each wager 301 is 1.0% for the large cash prize and 0.5% for the progressive cash prizes. Other values or percentages can be used. The consolation prizes are awarded under the same eligibility categories as the cash bonus 307, but player eligibility is required to win.

Third, a rapid hit mystery prize randomly awards progressively larger cash prizes falling between $100 and $400 when the bonus pool 304 substantially equals a current progressive prize value. In addition, consolations prizes of 50 credits are also awarded. Funding for the cash prizes is provided by the bonus pool 304 and funding for the seed value for the next set of cash prizes is provided by the hidden pool 306. For the bonus pool 304, the base percentage 303 of each wager 301 is 1.5%. For the hidden pool 306, the secondary percentage 305 of each wager 301 is 0.75%. Other values or percentages can be used. The consolation prizes are awarded under the same eligibility categories as the cash bonus 307, but player eligibility is required to win.

Each mystery bonus 308 uses the overhead display 357 (shown in FIG. 5) for encouraging game play by displaying the mystery umber. For the car mystery bonus, the overhead display 357 is configured as a curved tricolor light emitting diode (LED) display which mimics a car odometer and shows the lucky number without commas or decimal point. For the large cash prize, the overhead display is configured as a 3×4 flat, tricolor LED display which shows the preselected random value in dollars and a monochrome vacuum fluorescent display (VFD) which shows the secondary prize amount. For the rapid hit mystery prize, the overhead display is configured as a 2×2 flat, tricolor LED display which shows the current progressive prize value in dollars.

Typically, a subset of all of the gaming devices 300 interconnected to the bonus promotion system 350 (shown in FIG. 5) participate in the mystery bonus 308 and of that subset, only eligible gaming devices 300 can win the mystery or a consolation prize. The pre-defined threshold value, that is, the lucky number for the car mystery bonus, the pre-selected random value for the large cash prize and the current progressive prize value for the rapid hit mystery prize, is generically referred to as the "mystery number." When the bonus pool 304 substantially equals the mystery number, the following sequence of events occurs:

(1) The gaming devices 300 are locked up from further game play, thereby creating a noticeable silence and disrupting normal activities.

(2) The display assembly 210 on each active gaming device 300 begins flashing and the audible bonus indicator 122 (shown in FIG. 10) begins beeping.

(3) The gaming device 300 at which the wager 301 causing the bonus pool 304 to equal or exceed the mystery number is selected as the winner.

(4) Optionally, an anticipation message is played over the music system 358 (shown in FIG. 5) announcing the imminent awarding of the mystery bonus prize.

(5) Floor personnel are notified except for the rapid hit mystery prize.

(6) A consolation prize is awarded at all active gaming devices 300 except the winning gaming device 300. For each gaming device 300 receiving a consolation prize, the display assembly 210 stops flashing and the bonus button 315 begins flashing. Preferably, the audible bonus indicator 122 (shown in FIG. 10) begins to beep and a message appears on the display assembly 210 instructing the player to press the bonus button 315 to collect the consolation prize. Preferably, each player has unlimited time to press the bonus button 315. Once the bonus button 315 is pressed, the audible bonus indicator 122 (shown in FIG. 10) beeps to acknowledge payment of the consolation prize, the gaming device 300 awards the consolation prize and unlocks so normal game play can resume.

(7) Optionally, celebration music is played over a public address system (not shown) using the music system 358 for several minutes.

(8) The winner of the cash bonus 307 is manually announced.

(9) The display assembly 210 on the winning gaming device 300 continues flashing and indicates winner status. The overhead display 357 shows the number of the winning gaming device 300 alternating with the amount won and new amount available except for the rapid hit mystery prize.

10) The cash bonus 307 is manually paid and the winning gaming device 300 is unlocked except for the rapid hit mystery prize.

3. Progressive Jackpot Bonus Prize

The progressive jackpot bonus prize 309 (hereinafter "progressive bonus") is a cash prize funded by the bonus pool 304. The progressive bonus 309 is awarded when the coin-in collected into the bonus pool 304 substantially equals a preselected cash value which progressively increases with each successive prize award. In addition, consolation prizes are also awarded. The preselected cash value is randomly selected before each new set of progressive promotions starts and must fall within a range of pre-defined values. Player eligibility is required, as described further in Section I.C.

The hidden pool 306 is not used to directly fund the progressive bonus 309. However the hidden pool 306 can be used to create a seed value for the next set of prizes to be awarded as well as to collect interim coin-in which would otherwise be lost for bonus promotion purposes, such as coin-in received during periods of gaming device ineligibility or inactivity.

In the described embodiment, a cash prize of starting at $10,000 is awarded when the bonus pool 304 substantially equals the current progressive cash prize value. In addition, consolation prizes of 50 credits are also awarded. Funding for the cash prize is provided by the bonus pool 304 and funding for the seed value for the next set of prizes is provided by the hidden pool 306. For the bonus pool 304, the base percentage 303 of each wager 301 is 1.5%. For the hidden pool 306, the secondary percentage 305 of each wager 301 is 0.75%. Other values or percentages can be used. The consolation prizes are awarded under the same eligibility categories as the cash bonus 307, but player eligibility is required to win.

The progressive bonus 309 uses the overhead display 357 (shown in FIG. 5) for encouraging game play by displaying the current progressive cash prize value.

Typically, a subset of all of the gaming devices 300 interconnected to the bonus promotion system 350 (shown in FIG. 5) participate in the progressive bonus 309 and of that subset, only eligible gaming devices 300 can win the progressive or a consolation prize. When the bonus pool 304 substantially equals the current progressive cash prize value, the following sequence of events occurs:

(1) The gaming devices 300 are locked up from further game play, thereby creating a noticeable silence and disrupting normal activities.

(2) The display assembly 210 on each active gaming device 300 begins flashing and the audible bonus indicator 122 (shown in FIG. 10) begins beeping.

(3) The gaming device 300 at which the wager 301 causing the bonus pool 304 to equal or exceed the current progressive cash prize value is selected as the winner.

(4) Optionally, an anticipation message is played over the music system 358 (shown in FIG. 5) announcing the imminent awarding of the mystery bonus prize.

(5) Floor personnel are notified.

(6) A consolation prize is awarded at all active gaming devices 300 except the winning gaming device 300. For each gaming device 300 receiving a consolation prize, the display assembly 210 stops flashing and the bonus button 315 begins flashing. Preferably, the audible bonus indicator 122 (shown in FIG. 10) begins to beep and a message appears on the display assembly 210 instructing the player to press the bonus button 315 to collect the consolation prize. Preferably, each player has unlimited time to press the bonus button 315. Once the bonus button 315 is pressed, the audible bonus indicator 122 (shown in FIG. 10) beeps to acknowledge payment of the consolation prize, the gaming device 300 awards the consolation prize and unlocks so normal game play can resume.

(7) Optionally, celebration music is played over a public address system (not shown) using the music system 358 for several minutes.

(8) The display assembly 210 on the winning gaming device 300 continues flashing and indicates winner status. The overhead display 357 shows the number of the winning gaming device 300 alternating with the amount won and new amount available.

(9) The progressive bonus 309 is manually paid and the winning gaming device 300 is unlocked.

4. Multiple Jackpot Bonus Prize

The multiple jackpot bonus prize 310 (hereinafter "multiple jackpot") multiplies the amount of the jackpot 302 received by a player for a fixed time period. The bonus jackpot award period begins with the insertion of a special card into a designated card reader in a bank controller 355 (shown in FIG. 5). Unlike the other bonus promotions, no eligibility is required, no special or consolation prizes are awarded and the bonus pool 304 and hidden pool 306 are not used. Also, player eligibility is not required. The present invention is similar to the method and apparatus for implementing a jackpot bonus, including multiple jackpot wherein the gaming device reconfigures its payout to be a multiple of its default payout schedule, on a network of gaming devices described in copending patent application Ser. No. 08/647,621 filed May 13, 1996, owned by the assignee of the present application, which is incorporated herein by reference for all purposes.

In the described embodiment, multiples of two, three and five are used to award multiple jackpots whenever the jackpot 302 at each gaming device in the bank exceeds a minimum winnings threshold of 20 credits. The bonus jackpot award period lasts for about one minute. Other values can be used. In addition, the number of times a bank of gaming devices 300 can be activated by the special card is limited for a given time period and an exception is sent to a DACOM 354 host (shown in FIG. 5) if a user attempts to excessively activate a bank.

Only the gaming devices 300 interconnected to the selected bank controller 355 participate in the multiple jackpot 310. When the special card is inserted into the designated card reader, the following sequence of events occurs:

(1) The display assembly 210 on each gaming device 300 interconnected with the selected bank controller 355 begins flashing.

(2) For about 60 seconds, each interconnected gaming device 300 pays out some multiple of the normal jackpot amount for any jackpot 302 above 20 credits.

(3) Optionally, a sound sequence is played over the music system 358 (shown in FIG. 5) when the special card is inserted.

(4) At the end of 60 seconds, normal game play resumes.

5. Welcome Back Bonus Prize

The welcome back bonus prize 316 (hereinafter "welcome back bonus") offers a period of half-price wagering to any valid carded player who earns a minimum required number of points. Valid, carded play is described further in Section I.C. The purpose of the welcome back bonus 316 is to encourage players to visit the gaming establishment or casino frequently. Each welcome back bonus 316 award is not immediately available when earned. Instead, the player must wait until a later pre-defined time to redeem the welcome back bonus 316 through half-price wagering. In the described embodiment, the minimum required points are published and known by most players.

An example of the welcome back bonus 316 will now be described. In this example, use of the welcome back bonus 316 via half-price wagering is deferred until 6:00 AM the following morning, although any other time could be used. If a player earns the welcome back bonus 316 at 6:15 am, she must wait 23 hours and 45 minutes to redeem the bonus. However, if she earns the bonus at 5:45 AM, she must wait only 15 minutes. The fixed award time makes player education easy and simplifies implementation. In addition, a $4.00 welcome back bonus 316 is used in this example which provides $8.00 of half-price wagering. The player earns one point for every $2.00 wagered with 300 points required to earn the $4.00 welcome back bonus 316. The amount of the bonus, number of required points and rate at which points are earned are adjustable.

The points required for each welcome back bonus 316 can be cumulatively earned over successive visits. Once earned, a player must wait until after 6:00 AM the following morning before using the bonus. No player can accumulate more than one award during a single playing session. For instance, suppose a player earns a welcome back bonus 316 at 10:00 PM on a Monday, yet continues to play over the next 6 hours to earn an additional 900 points. While the 900 points are enough to earn three additional welcome back bonus 316 awards, only one award will be granted.

The award of each welcome back bonus 316 is made automatically upon the first card insertion following the 6:00 AM threshold. The play must accept the award. Further deferral is not allowed. However, on those occasions in which a gaming session lasts for more than 12 hours, the player can collect the welcome back bonus 316 at the end of the session instead of having to come back again.

Suppose a player wins one welcome back bonus 316 by earning at least 300 points on a Thursday. She can return at any time after 6:00 AM the following morning to use the welcome back bonus 316. However, since the welcome back bonus 316 extends "half-price" gaming instead of coins, tokens or credits, the player must play to collect the bonus. Each welcome back bonus 316 is in effect only as long as it takes to wager the earned bonus. In the example, bonus play lasts until $8.00 has been wagered. On Friday, if she earns at least 300 additional points, she is eligible for another the welcome back bonus 316 award at 6:00 AM the following morning. The points earned during welcome back bonus play count towards the next bonus.

In the described embodiment, the display assembly 210 (shown in FIG. 1) and ABI 122 (shown in FIG. 10) on each gaming device 300 serve as important status indicators for players familiar with the welcome back bonus 316. Each time a valid card 312 is inserted into a card reader 311 on the gaming device 300 (shown in FIG. 1), the display assembly 210 displays a welcome message that greets the player with her name, current point balance and a message explaining her welcome back bonus status. Three status conditions are possible:

(1) Player has no pending welcome back bonus 316 awards. A message appears on the display assembly 210 stating "Earn XX more points to win a Welcome Back award" where "XX" indicates remaining points until a Welcome Back bonus 316 award has been earned. The ABI 122 sounds a tone at the start of the message to alert the player.

(2) Player has earned a welcome back bonus 316 award, but cannot use it at the present time. A message appears on the display assembly 210 stating "Congratulations. You have earned a Welcome Back award. It is available to you anytime after 6:00 AM." The actual time is adjustable. The ABI 122 sounds a tone to alert the player of this important message.

(3) Player has earned the welcome back bonus 316 and is qualified to use it at the present time. A message appears on the display assembly 210 stating "Congratulations. Your Welcome Back award is now available. Half Price gaming begins NOW!" The ABI 122 sounds a different tone to alert the player to an immediate award.

During game play, the display assembly 210 keeps the player informed of exactly what is happening. There are three possible conditions:

(1) Player has not yet earned enough points for a welcome back bonus 316 award. Each time a player reaches a 50 point interval, the ABI 122 sounds a beep and a message appears on the display assembly 210 stating "only XXX points required to earn your Welcome Back award" where "XXX" indicates the remaining points until a Welcome Back bonus 316 award has been earned. The pointer interval is adjustable.

(2) Player has earned a welcome back bonus 316 award, but cannot use it at the present time. No messages appears.

(3) Player has earned a welcome back bonus 316 award and is qualified to use it at the present time. Immediately after the card insertion messages have completed, the display assembly 210 displays "Welcome Back= $YY.YY" where "YY.YY" indicates the balance of the welcome back bonus 316 award available.

Each time a wager 301 is placed by the player on the gaming device 300, half of the wager value is subtracted from the displayed amount and added to an internal EGM credit meter. For example, suppose a ten credit wager is placed with $4.00 showing on the display assembly 210 of a nickel slot machine with a 50 credit balance. The ten credits are removed from the internal EGM credit meter and five credits of value equalling $0.25 are deducted from the display assembly 210 amount. The five credits are simultaneously added to the credit meter. Thereafter, the display assembly 210 shows "Welcome Back=3.75" and the credit meter shows 45 credits. The player has just gotten a 10 credit wager while spending only five credits.

The amount shown on the display assembly 210 display is decremented until the welcome back bonus 316 award remaining is less than one credit. The ABI 122 sounds a tone to indicate the end of the welcome back bonus 316 session and a message appears on the display assembly 210 indicating the bonus points required to earn the next the welcome back bonus 316 award. Bonus points are earned during each welcome back bonus 316 session in the same manner as earned during normal game play. Thus, if the welcome back bonus 316 award equals $8.00, the player earns 4 bonus points during the welcome back bonus 316 session. After the end of a welcome back bonus 316 session, the display assembly 210 reverts to normal operation and provides alert messages at regular bonus point intervals.

If the player removes her card 312 before the welcome back bonus 316 session has ended, no messages appear on the display assembly 210. When the player later inserts her card 312 into a card reader 311 on another gaming device 300, either during this visit or on a fixture visit, the same set of messages and tones as described above are presented, although the display assembly 210 shows only the welcome back bonus 316 award balance remaining.

Message sequences and sequence parameters are stored in a bonus server 351 (shown in FIG. 5). Whenever the bonus server 351 starts operation or has its values modified, the bonus server 351 broadcasts a message packet containing sequence parameters to each MCI 356 associated with a gaming device 300 as described below in Section III.A. If an MCI 356 is replaced or restarted, the MCI 356 requests the necessary parameters from the bonus server 351. In an alternative embodiment, the DACOM host 354 (also shown in FIG. 5) can be modified to store interim values for each MCI 356 which does all calculations. The parameters used in the welcome back bonus 316 are listed below in Table 1.

TABLE 1

| Parameter | Data Type | Source |
|---|---|---|
| Points for the award | 9999 (numeric) | Bonus server 351 |
| Message contents | alpha strings | Bonus server 351 |
| Message sequences | alpha strings | Bonus server 351 |
| Award amount | 9999 (numeric) | Bonus server 351 |
| Waiting time (Hours) | 99 (numeric) | Bonus server 351 |
| Earned bonus points | 1/0 (status byte) | Player record on DACOM host 354 |
| Points towards next award | 9999 (numeric) | Player record on DACOM host 354 |
| Award balance | 99.99 (currency) | Player record on DACOM host 354 |
| $turnover/point | 999.99 (currency) | Player record on DACOM host 354 |
| Total point balance | 9999999 (numeric) | Player record on DACOM host 354 |

Upon the insertion of a card 312 into a card reader 311, the MCI 356 retrieves the player record from the DACOM host 354. Each player record must have the values listed above in Table 1 initialized to zero values at system start-up, except for the $turnover/point value which must be initialized to the appropriate amount.

The MCI 356 calculates the total points and welcome back bonus 316 points as they are earned. The MCI 356 also controls the messages displayed on the display assembly 210 as described above using the parameters obtained from the bonus server 351. When enough welcome back bonus 316 points have been earned, the MCI 356 sets the welcome back bonus 316 earned bonus points status byte and clears the points towards next award value. The latter value is not incremented as long as the earned flag bonus points status byte is set. In addition, the MCI 356 also calculates the date and time at which the player will be qualified by adding a waiting time to the current date and time.

When the card 312 is removed from the card reader 311, the parameters are sent to the DACOM host 354 for storage in the associated player record. When the card 312 is inserted a card reader 311 for another gaming device 300, the player record is again retrieved from the DACOM host 354 and is used by the associated MCI 356 to control the welcome back bonus 316 session. Once the date and time at which the player will be qualified has been met or exceeded, the MCI 356 clears the earned flag bonus points status byte and adds points for the welcome back bonus 316 award to the total point balance.

6. Match Play Bonus Prize

The match play bonus prize 317 (hereinafter "match play") offers a further incentive for frequent play. In one embodiment of the present invention, one credit point is accumulated for every $2.00 wagered. These credit points can be redeemed for restaurant vouchers at one cent per point or used for purchasing televisions and related goods at a significantly lower rate of exchange.

In a further embodiment, credit points are still accumulated but can be converted to a match play 317 value at the player's option. The match play 317 value is essentially regular game play at a 50% discount. Each time a player wagers two credits, one credit is removed from the bonus pool 304 (shown in FIG. 1) and transferred to an internal EGM credit meter for recording Match Play points. For example, if a player wagers ten credits, he will receive five credits back, so long as there are at least five credits in his Match Play account. In this embodiment, each Match Play point is worth one cent, although other values could be used.

During match play, several components in each gaming device 300 are used, including the display assembly 210, ABI 122 (shown in FIG. 10), the bonus button (BB) 315 and internal EGM credit meter (not shown). An example of the player activity steps are shown below wherein the left hand column describes player actions and the right hand column describes the game response:

Standard Carded Play with No Match Play Points Used.

| | | |
|---|---|---|
| (1) | Player inserts card 312 | Display assembly 210 greets player by name and displays credit point balance. |
| (2) | Play begins | For every $2.00 wagered, credit points increased by one point. ABI 122 beeps once after each point is awarded. |
| (3) | Player removes card 312 | Total credit points, including those just earned, are stored in DACOM host 354. |

Carded Play with Match Play Points Used.

| | | |
|---|---|---|
| (1) | Player inserts card 312 | Display assembly 210 greets player by name and displays credit point balance. |
| (2) | Play begins | For every $2.00 wagered, credit points increased by one point. ABI 122 beeps once after each point is awarded. |
| (3) | Player pushes BB 315 | Credit point balance on display assembly 210 is replaced by "Match Play = XXX.XX" and ABI 122 sounds a special tone to signify entry into Match Play. For example, if player has 5,372 points, the display assembly 210 will show "Match Play = $53.72". |
| (4) | Player wagers 10 credits | Ten credits are removed from the internal EGM credit meter and five credits are immediately added back. For example, on a nickel slot machine, the display assembly 210 would now show "Match Play = $53.47". |
| (5) | Player wagers 15 credits | Fifteen credits are removed from the internal EGM credit meter and seven credits are added back. The DACOM host 354 records the half Match Play point owed. The displayed amount is decremented by 7 credits equalling thirty-five cents and now reads "Match Play = $53.12". |
| (6) | Player wagers 10 credits | Ten credits are removed from the internal EGM credit meter and five credits are added back. The displayed amount is decremented by five credits or twenty-five cents and now reads "Match Play = $52.87". |

-continued

Carded Play with Match Play Points Used.

| | | |
|---|---|---|
| (7) | Player wagers 5 credits | Five credits are removed from the internal EGM credit meter and three credits are added back, including the half-credit from Step (5). The displayed amount is decremented by three credits or fifteen cents and now reads "Match Play = $52.72". |
| (8) | Player continues to wager | Match Play credits are decremented as described above and the appropriate amounts of credits are added to the internal EGM credit meter. Each time the wagers total $2.00, one cent is added back to the credit meter. |
| (9) | Player decides to eat lunch | Removing the card 312 automatically sends the unused credit point balance to the DACOM host 354 where it is stored in the player record. For example, if the displayed amount was $40.00 when the card 312 was removed, the credit point balance will be 4,000. Any credits on the EGM credit meter are cashed out. |
| (10) | Player wants $20.00 lunch voucher | Player presents card 312 and asks for $20.00 lunch voucher. After showing appropriate ID, coupon is printed and points deducted at appropriate rate from player record. Credit point balance is now 2,000. |
| (11) | After lunch, player returns to casino | Upon card insertion, she is greeted by name and her point balance is displayed as 2,000 points. |
| (12) | Player wagers $100 over 15 minutes | A total of fifty points are added to her account and 2,050 points are shown on the display assembly 210. |
| (13) | Funds running low, player pushes BB 315 to enter Match Play | Points are immediately converted to Match Play. ABI 122 beeps to signify change of playing mode and display assembly 210 now shows "Match Play = $20.50". |
| (14) | Player wagers additional $10.00 over several games | Appropriate Match Play points are added to internal EGM credit meter after each game. In this example, an additional five points were earned because $10 was wagered. These points increase the Match Play meter by five cents. After subtracting $5.00 from displayed amount, display assembly 210 now indicates "Match Play = $15.55". |
| (15) | Player pushes BB 315 to end Match Play | By pushing BB 315 again, Match Play is ended. ABI 122 sounds distinctive tone to confirm and display assembly 210 display is converted back to points display. In this example, it now indicates "1,555 Points". |

Players may enter and exit Match Play as often as desired. However, another bonus button 315 event, for instance, the awarding of a consolation prize, can cause the bonus button 315 to change function. For example, if a player is in points mode and a consolation prize is offered which requires her to press the bonus button 315 within 30 seconds, the initial bonus button 315 press claim the consolation prize and not change the mode from Points to Match Play. A distinctive ABI 122 tone indicates that a consolation prize was collected. The player must press the bonus button 315 again to enter Match Play.

The match play 317 value provides an easy way for players to convert bonus points to Match Play points without having to visit the club center or requiring the assistance from casino personnel. Moreover, the rate at which points are converted to Match Play points is adjustable as is the rate at which these points are converted to restaurant vouchers.

7. Personal Progressive Bonus Prize

The personal progressive bonus prize 318 (hereinafter "personal progressive") enables each player to "grow" their own mystery award which only they are eligible to win. Often, players participating in a bonus promotion, such as the progressive bonus 309, are discouraged to see a jackpot winner walk away with all the jackpot growth, particularly the bonus contribution the non-winning player has made. The player might have contributed a large portion of the progressive bonus 309 yet not have any chance of sharing in the bonus. The personal progressive 318 helps a player to avoid this situation.

With the personal progressive 318 bonus, a player can play on any gaming device 300 and the bonus follows them to each successive EGM, although the actual bonus increment rates can vary between different types of EGMs. The player must use a valid card 312 for game play to contribute to the personal progressive 318 bonus amount and can win a bonus on any denomination of gaming device 300. The player's chance of winning on any particular game is directly proportional to the size of the bet. The personal progressive 318 bonus stays with their card 312 until the bonus is won, even if it takes months or years.

In the described embodiment, the following parameters are used. First, all gaming devices 300 participate and no consolation prizes are awarded. A valid player card 312 is required and the bonus button 315 must be pressed, with no time limit, to collect the bonus. Optionally, the bonus button 315 can be disabled or a time limit set. Each personal progressive 318 bonus can be between $10 and $40, but can be programmed to other suitable ranges. The personal progressive 318 bonuses are funded by 0.25% of each wager 301, but other percentages can be programmable.

During game play, player tracking is provided via the display assembly 210 (shown in FIG. 1) which shows the amount of the bonus earned upon card insertion and after every $0.50 increment thereafter. Upon a win, the ABI 122 (shown in FIG. 10) beeps to inform of the player of the win who is then prompted to push BB to collect the personal progressive 318 bonus. The award is paid to the internal EGM credit meter.

C. Player Eligibility

Each gaming device 300 includes a card reader 311 for reading a player card 312 to determine player eligibility. The card reader 311 includes a card slot 313 into which the player card 312 is inserted. A bezel 314 surrounds the card slot 313 for providing continuous visual feedback to the player regarding eligibility to win prizes. However, the card reader 311 only effects player eligibility for the bonus promotions and each gaming device 300 will continue to operate with or without the insertion of a player card 312. However, depending upon the particular bonus promotions in progress at the time, uncarded play can limit the prizes to the jackpot 302.

The player card 312 is used by the gaming establishment for identifying individual players. The player card 312 can also be used as a wager debit card and for tracking game play. A player is "registered" or "named" if the player card 312 has been entered into a player database (not shown), whereas the player is "numbered" or "anonymous" if the player card 312 has been issued to the player, but has not been entered into the player database. All other players are "uncarded."

For those bonus promotions which require eligibility, a player is ordinarily eligible to win a bonus or consolation prize if a minimum frequency of play is maintained as measured by games played per minute. In the described embodiment, eligibility requires the playing of at least one game every ten seconds, that is, at least six games per minute. Other game playing frequencies can be used.

A combination of three colors for the bezel 314 in combination with either a flashing or solid condition are used for indicating player eligibility. The bezel 314 feedback combinations are shown below in Table 2.

TABLE 2

| BEZEL COLOR | MEANING |
|---|---|
| GREEN | valid card insertion, player eligible |
| FLASHING GREEN | valid card insertion, player not eligible |
| ORANGE | no card inserted, player eligible |
| FLASHING ORANGE | no card inserted, player just became ineligible |
| RED | no card inserted, game inactive |
| FLASHING RED | invalid card insertion |
| OFF | malfunctioning gaming device |

Figure 3:
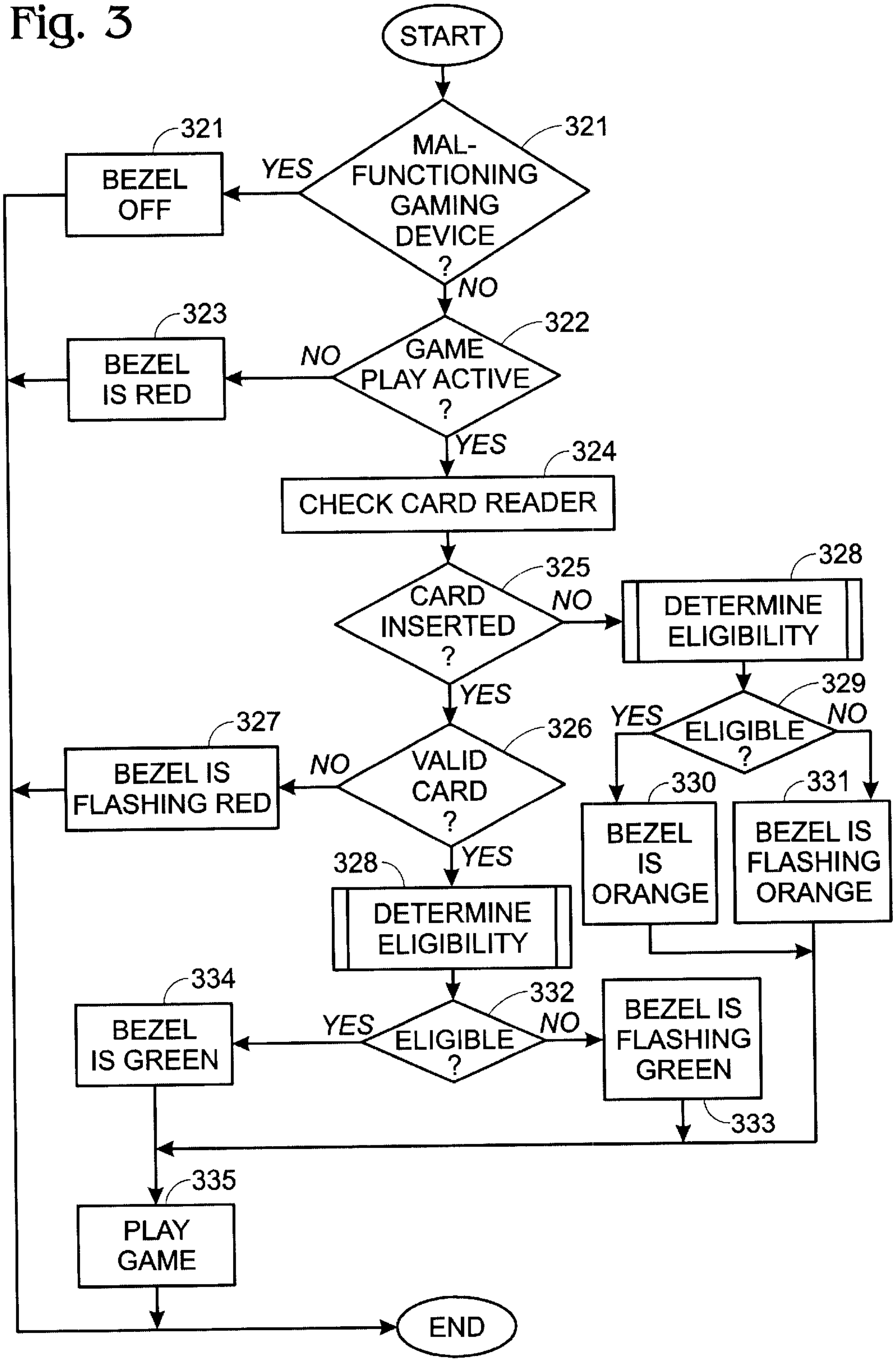
FIG. 3 shows a flow diagram of a method for controlling visual feedback of bonus eligibility using the gaming device of FIG. 1.

FIG. 3 shows a flow diagram of a method for controlling visual feedback of bonus eligibility using the gaming device of FIG. 1. Its purpose is to control the color and condition of the bezel 314 according to the above table. Eligibility is determined by the machine communication interface (MCI) 356 for each gaming device 300 and the associated card reader 311. Blocks 320–323 and 327 describe inactive game play conditions resulting in the method of FIG. 3 terminating whereas blocks 324–335 describe active game playing conditions.

First, if the gaming device 300 is malfunctioning or the card reader is out red of order (block 320), the bezel 314 is turned off (block 321) and the method terminates. However, if the gaming device 300 is not malfunctioning (block 320), the MCI 356 checks to determine whether game play is active. Active game play means a game has been wagered on the gaming device 300 within a predefined time period. In the described embodiment, 30 seconds must elapse before game play becomes inactive.

Ordinarily, if no game play is taking place (block 322), the bezel 314 is red (block 323) and the method terminates. Otherwise, if game play is active (block 322), the card reader 300 is checked for a player card 312 insertion (block 324). If a player card 312 is inserted in the card reader 311 (block 325), the card reader 311 determines whether the player card 312 is valid and properly inserted. If the player card 312 is invalid or is improperly inserted into the card reader 311 (block 326), the bezel 314 is a flashing red color (block 327) and the method terminates.

Otherwise, if a valid player card 312 has been inserted (block 327), the MCI 356 determines the carded player's eligibility (block 328) as further described below with reference to FIG. 4. If no player card 312 has been inserted (block 325), the MCI 356 determines the uncarded player's eligibility (block 328), as further described below with reference to FIG. 4. If no card has been inserted (block 325) yet the player is eligible (block 329), the bezel 314 is orange (block 330). Otherwise, if no player card 312 has been inserted (block 325) and the player is ineligible (block 329), the bezel 314 is a flashing orange color (block 331). If a valid player card 312 has been inserted (block 326) and the player is eligible (block 332), the bezel 314 is a green color (block 334). Otherwise, if a valid player card 312 has been inserted (block 326) yet the player is not eligible (block 332), the bezel 314 is a flashing green (block 333).

FIG. 4 shows a flow diagram of a routine for determining bonus eligibility in the method shown in FIG. 3. Its purpose is to classify the gaming device 300 as either eligible, ineligible or inactive. If a wager 301 has been placed on the gaming device 300 within the last 10 seconds (block 340), the player is eligible to win a bonus (block 341). Otherwise, if a wager 301 has not been placed within the last 10 seconds (block 340), the MCI 356 determines whether 10 seconds elapsed due to a legitimate delay, such as a detected coin-in jam, jackpot payout needing additional time to complete the incrementing of the credit meter or other legitimate causes. The 10 second eligibility period is extended by the duration of these events. However, if the player presses the bonus button 315 to accept or "cash out" his bonus award, eligibility is terminated immediately. Thus, if there has not been a wager within the last 10 seconds (block 340) yet the delay was due to a legitimate cause (block 342) and the player has not pressed the button 315 (block 343), the player is eligible (block 341). Otherwise, if the delay was legitimate (block 342) yet the bonus button 315 was pressed (block 343), eligibility is lost (block 344). If there is no legitimate reason for the delay (block 342) yet a wager has been placed within the last 30 seconds (block 345), game play is active yet the player has still lost eligibility (block 344). Otherwise, if there has been no wager within the last 30 seconds (block 345) the game is considered inactive (block 346) and the routine returns.

II. Bonus Promotion System

A. Overview

FIG. 5 shows a functional block diagram of a bonus promotion system 350 according to the present invention. The system 350 includes a bonus server 351 which is the central control point for each of the bonus promotions except the multiple jackpot 310. The bonus server 351 tracks cash-in for the bonus pool 304 and hidden pool 306 and determines the appropriate time at which to award each bonus prize. In the described embodiment, a single bonus server 351 controls all progressive jackpots 309. Second and third bonus servers 351 respectively control the car mystery and cash mystery variants of the participation bonuses 308. A fourth bonus server 351 controls the cash bonus 307. Since the multiple jackpot 310 is initiated at random times by insertion of a special card in a bank controller 355, no bonus server 351 is dedicated to controlling the multiple jackpot 310.

A concentrator 352 interfaces each bonus server 351 with a bank controller 355 and a translator 353. Its purpose is to optimize performance within the bonus promotion 350 by freeing bonus servers 351 from the task of having to poll each individual MCI 356 for bonus meter readings for the associated gaming device 300 (not shown). The concentrator 352 broadcasts a table of all current bonus meters and their respective statuses twice every second to the bonus servers 351. Each bonus server 351 controls it's respective bonus promotion through bonusing meters broadcast from the concentrator 352.

The translator 353 integrates the communication and system control protocols used by the DACOM host 354, further described below with the rest of the bonus promotion system 350. As such, the translator 353 serves as a bridge between the DACOM host 354 and the bonus promotion system 350.

The DACOM host 354 provides monitoring capabilities over the various components comprising the bonus promotion system 350. By monitoring their respective states during operations. In addition, the DACOM host 354 accumulates accounting information, slot accounting, player tracking and runs casino management applications.

The bank controller 355 controls a bank of gaming devices 300 which are each interconnected to an MCI 356. In addition, the bank controller 355 controls the overhead displays 357 and music system 358. Finally, the bank controller 355 includes a card reader (not shown) used in slot bank bonus promotions, such as the multiple jackpot 310. The bank controller 355 monitors the communication status of all attached MCIs 356 and determines when one of those units has gone off line.

Finally, an MCI 356 is imbedded into each gaming device 300. It is responsible for allowing the DACOM host 354 to communicate directly with the attached gaming device 300. Each MCI 356 controls the card reader 311 (shown in FIG. 1), the ABI 122 (shown in FIG. 10), a fluorescent flasher, a bonus button 315 (also shown in FIG. 1) and a vacuum fluorescent display (VFD) mounted on or in each gaming device 300. During normal operations, the MCI 356 continuously monitors changes to turn over, stroke, wins and bonus out and can quickly send any changes to these meter, referred to as bonus meters to the bank controller 355 at a rate of up to four times per second. The MCI 356 also detects player card 312 insertion and removals via the card reader 311. Finally, the MCI 356 periodically configures itself for the bonus promotion to which it has been assigned.

Figure 2A:
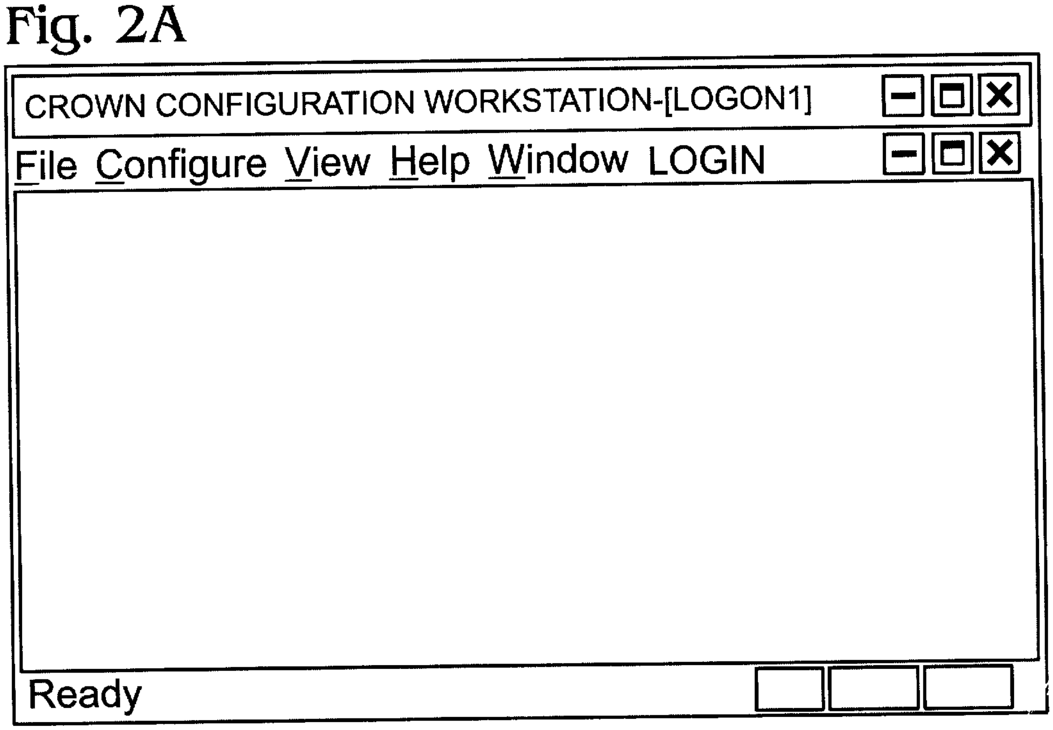
FIGS. 2A through 2N show screen images for configuring the bonus promotions of the present invention.
Figure 2B:
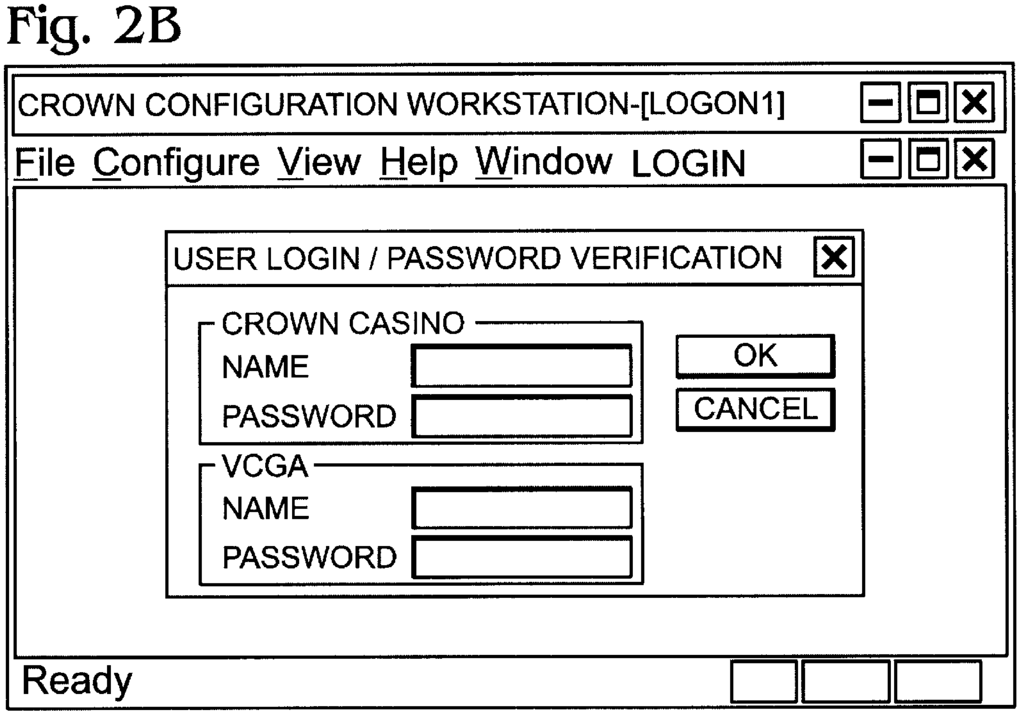
Figure 2D:
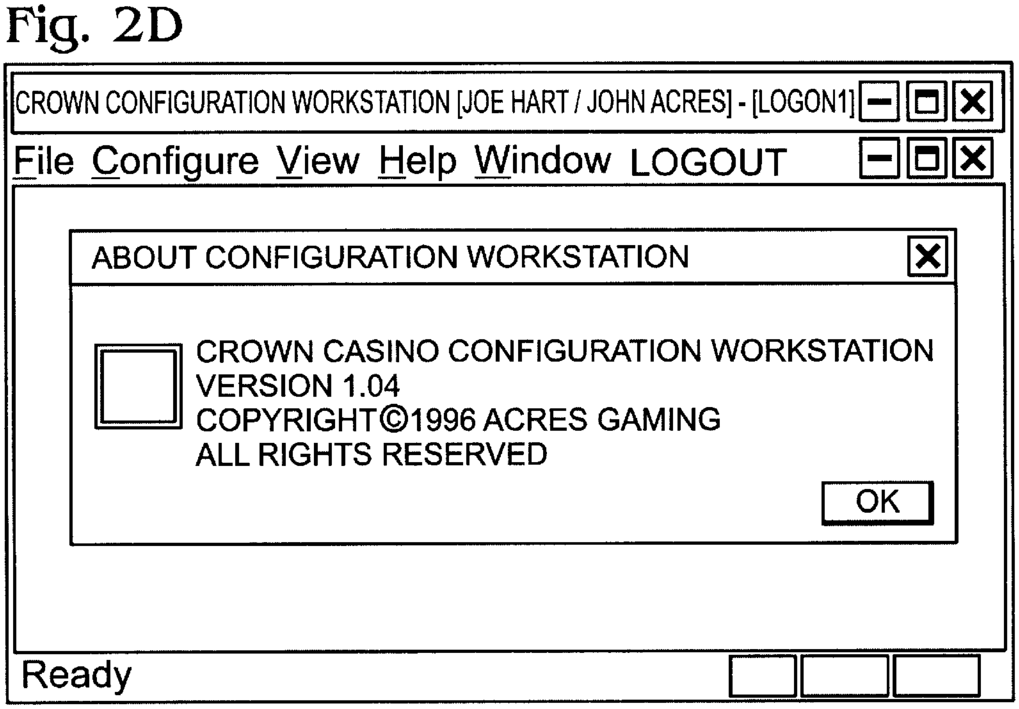
Figure 2C:
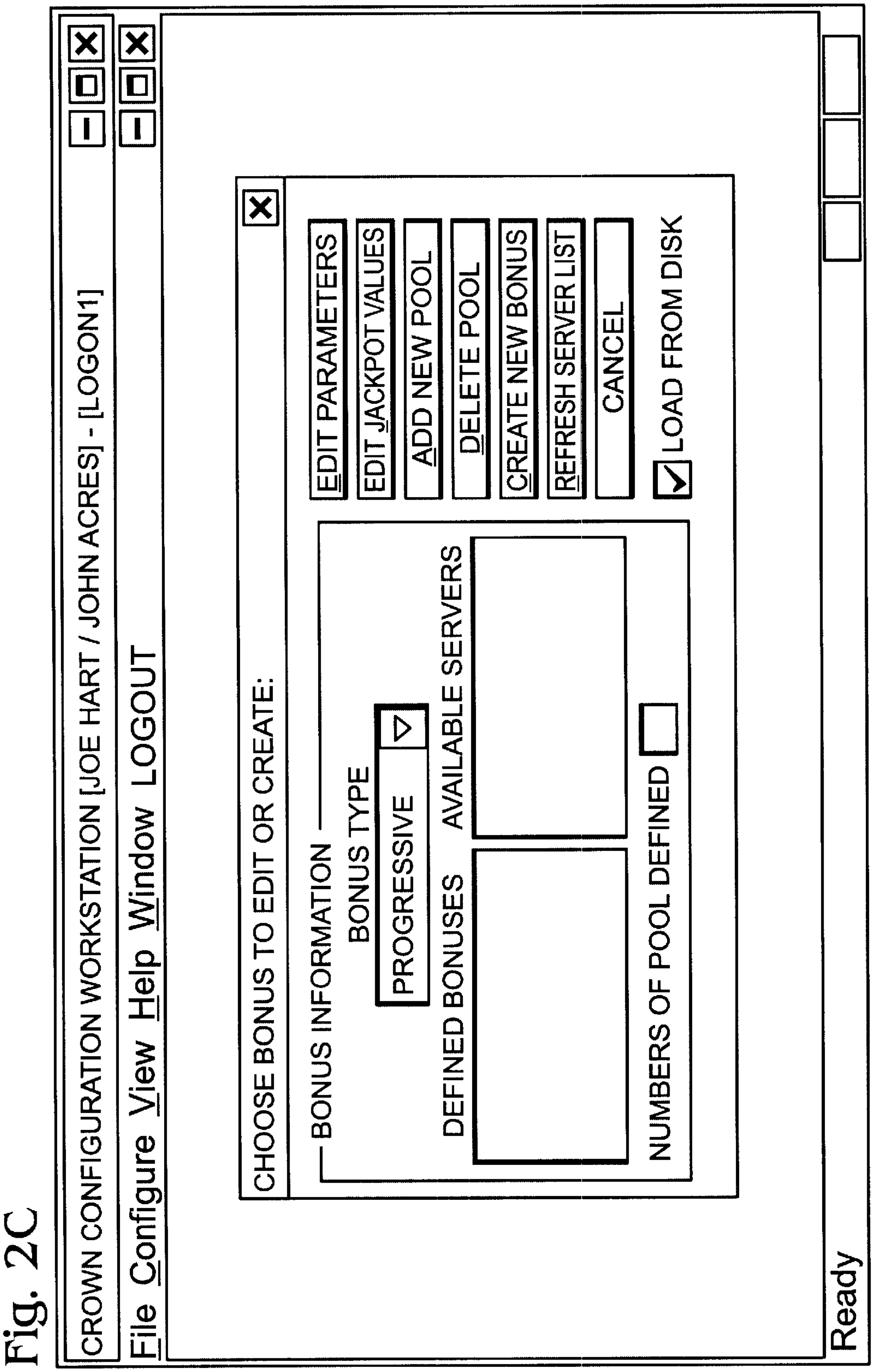
Figure 2E:
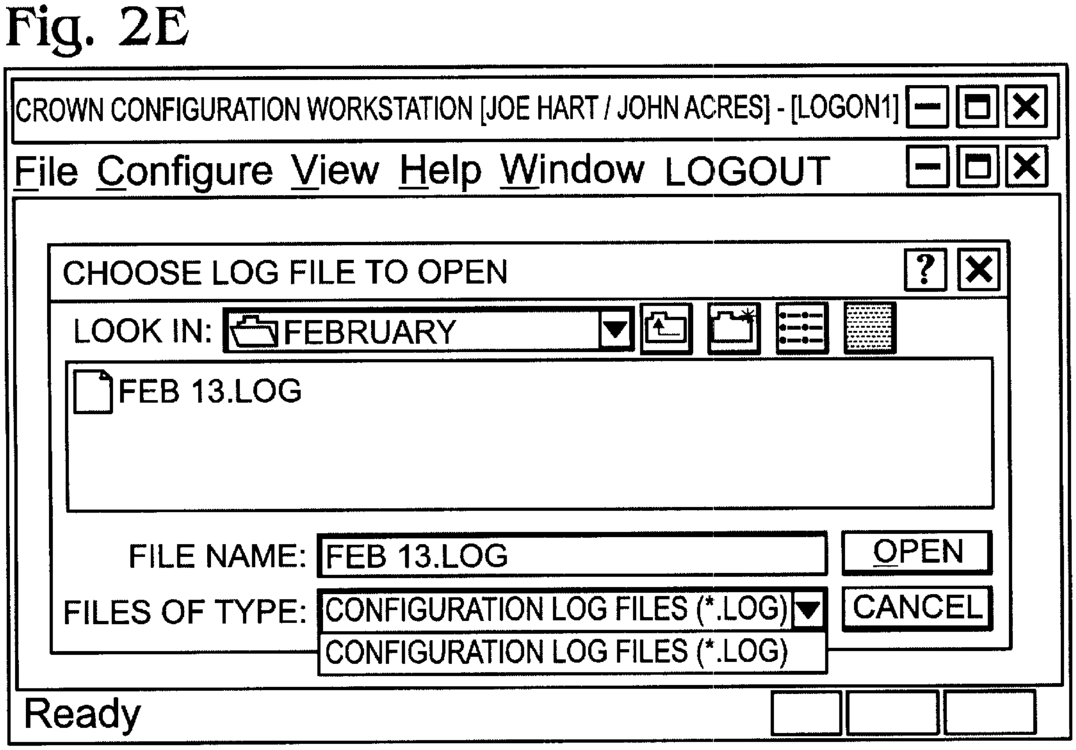
Figure 2F:
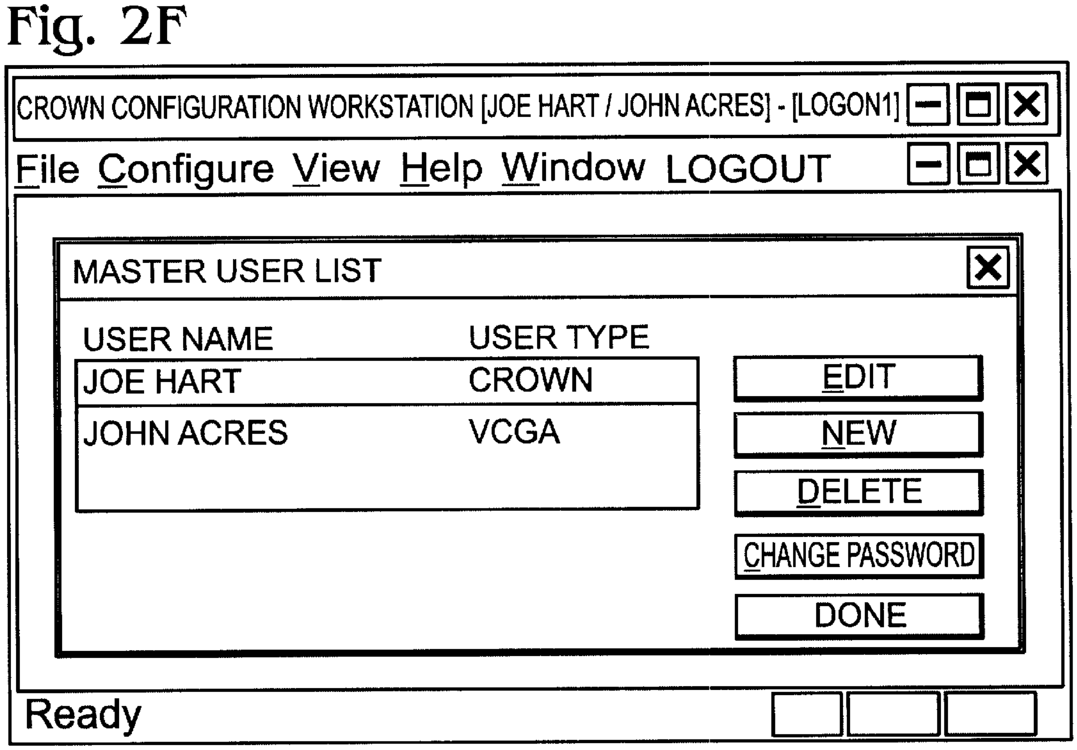
Figure 2G:
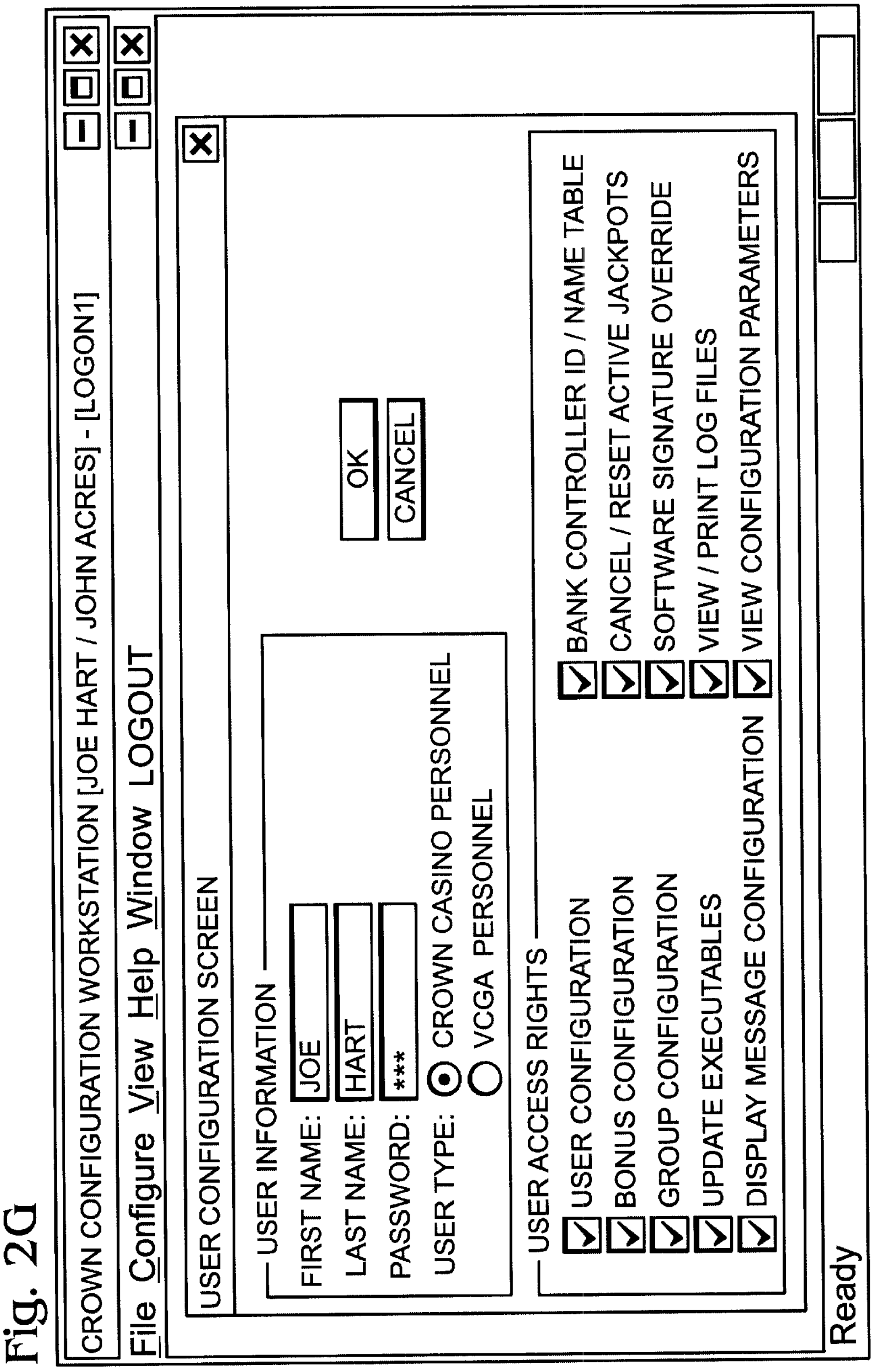
Figure 2H:
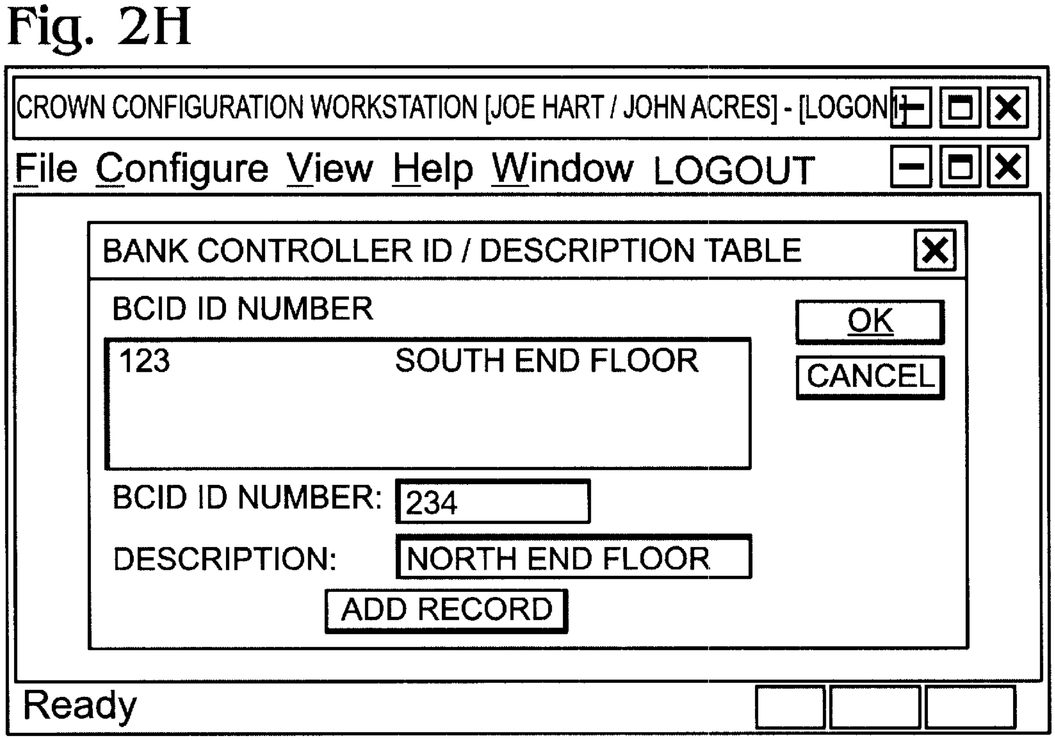
Figure 2I:
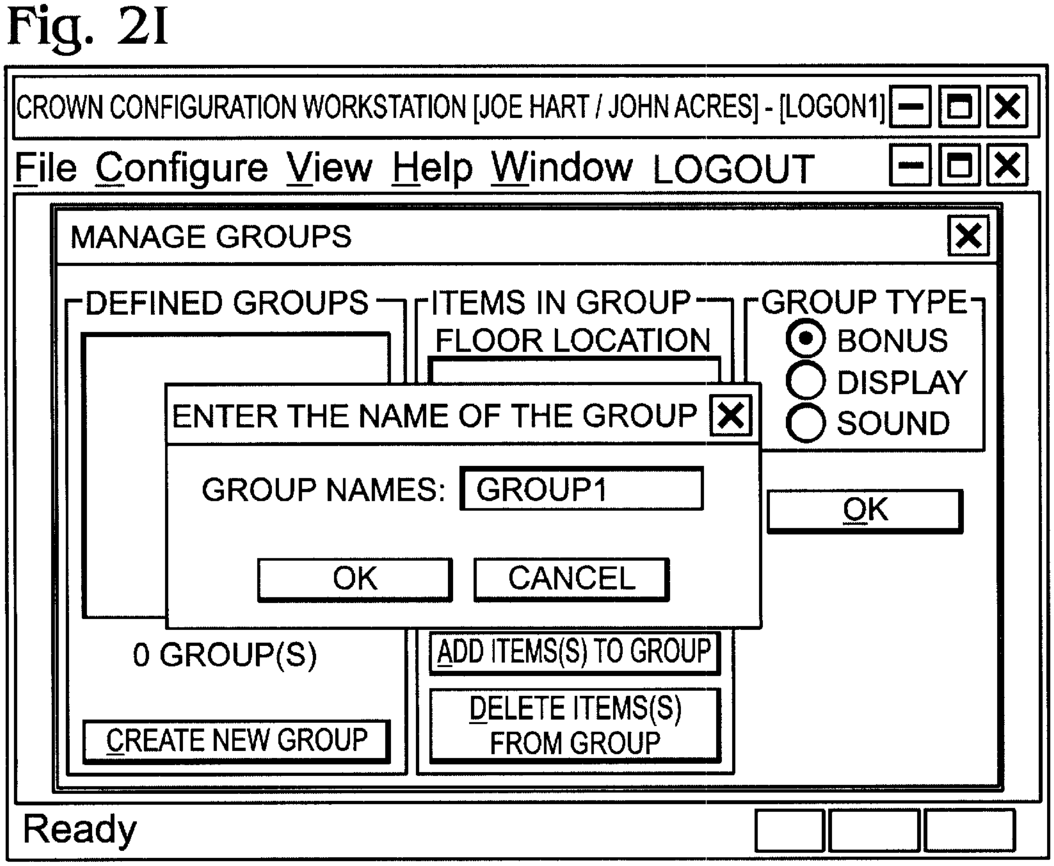
Figure 2J:
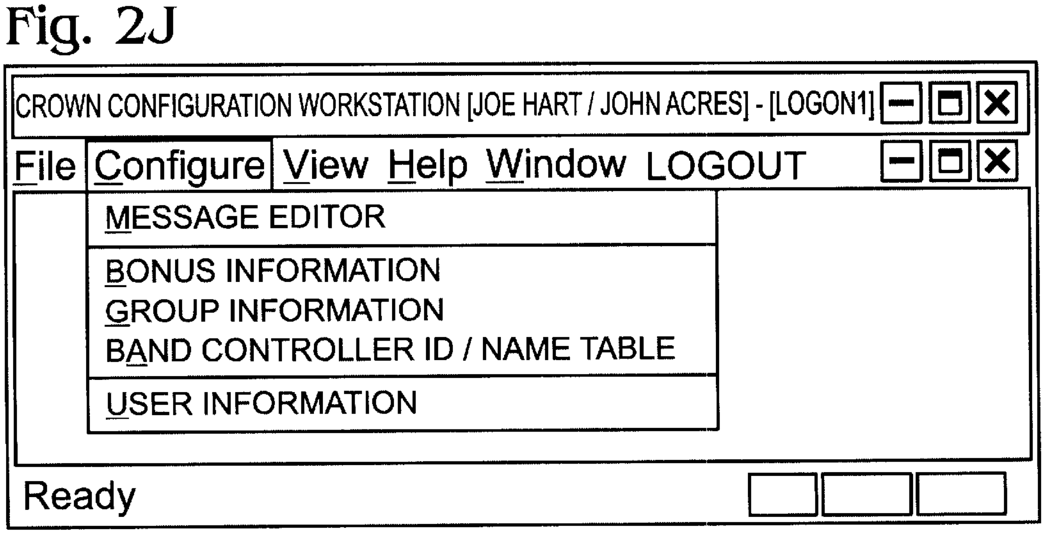
Figure 2K:
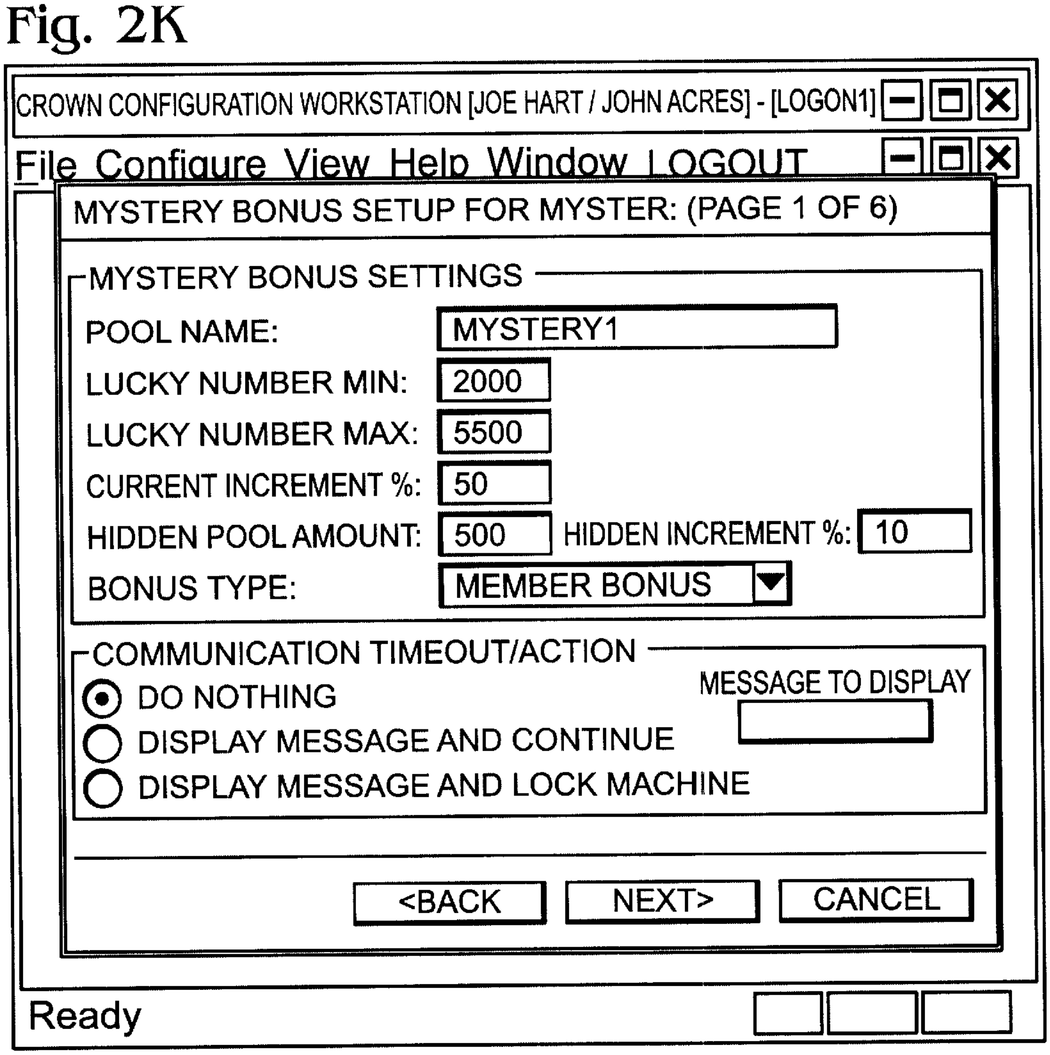
Figure 2L:
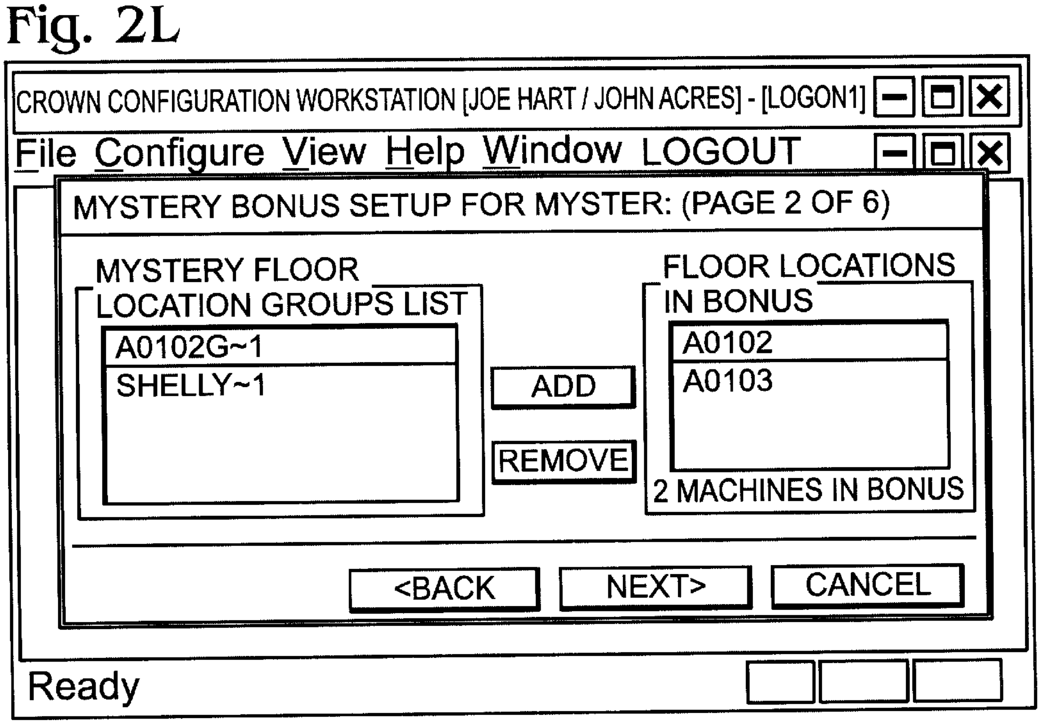
Figure 2M:
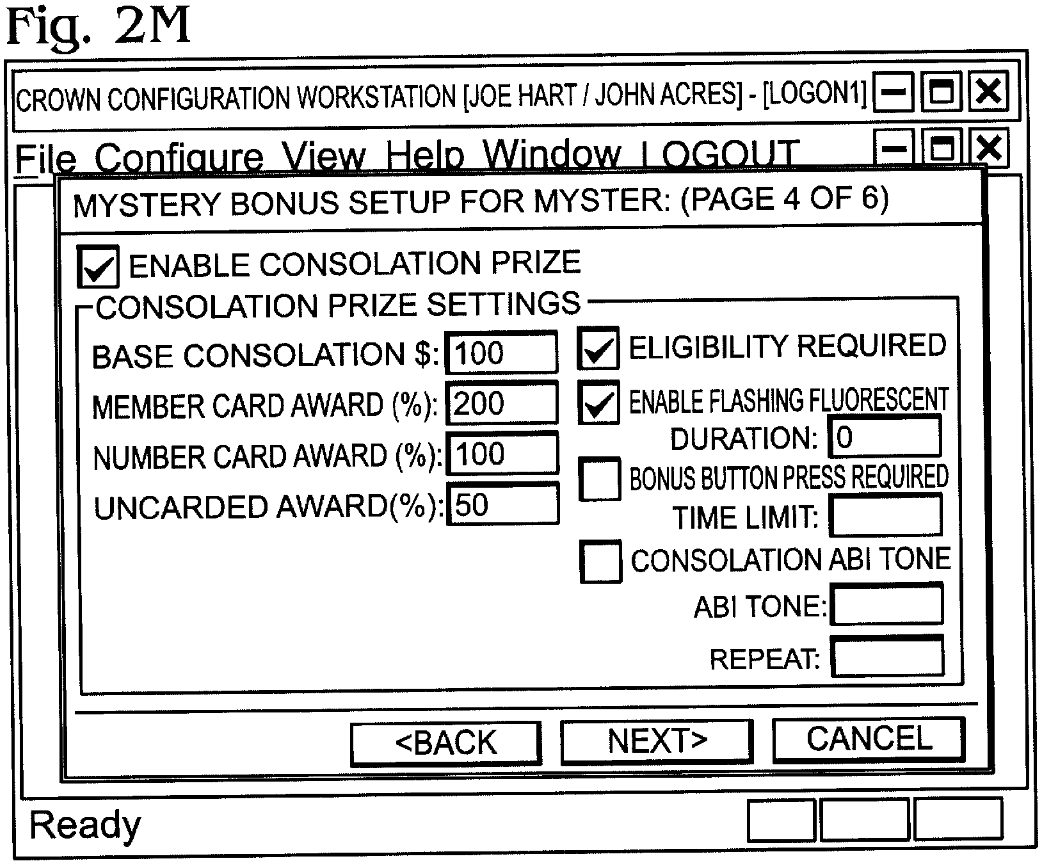
Figure 2N:
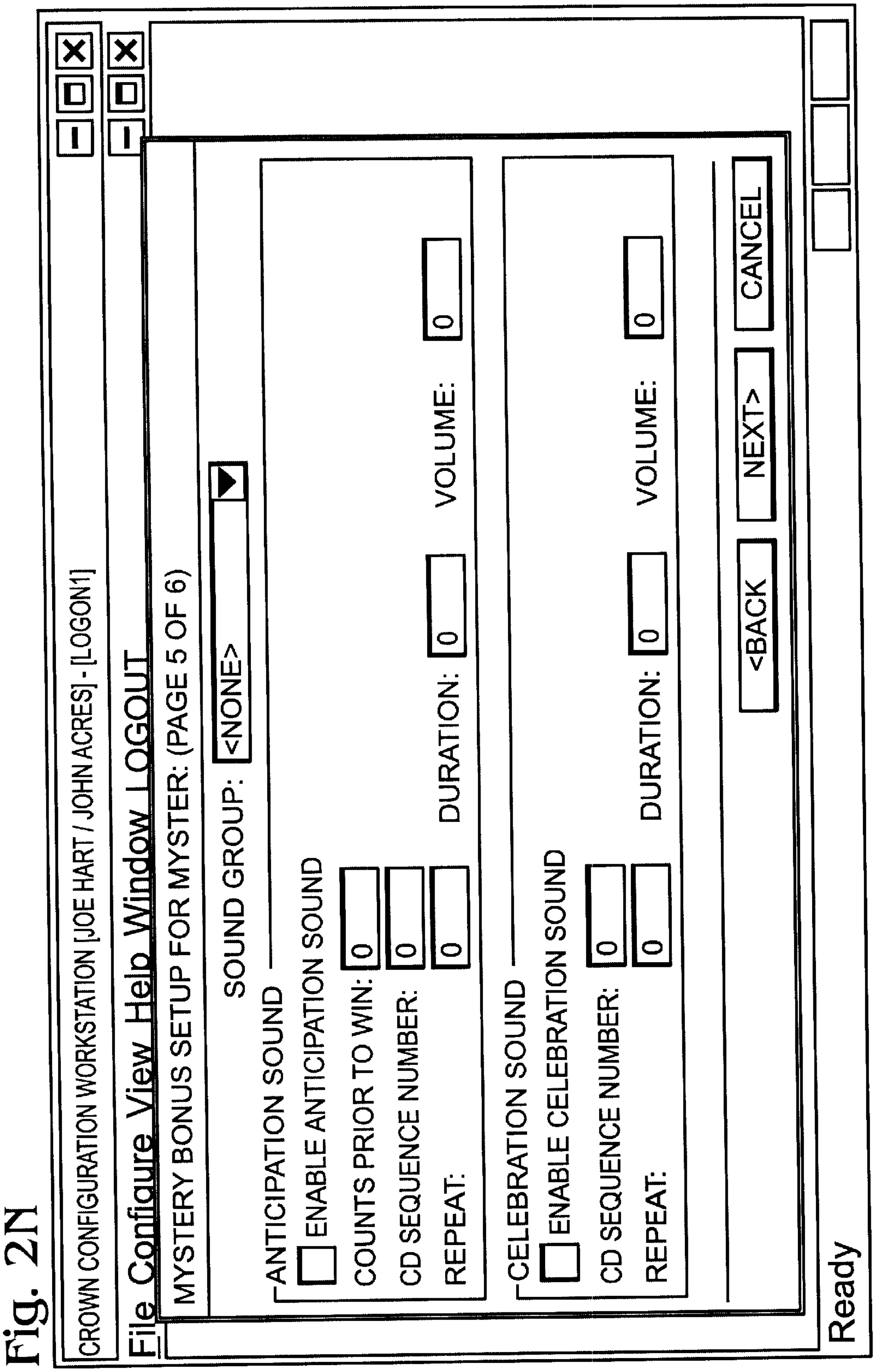

A configuration workstation 359 is used to monitor, configure and modify bonus parameters on the bonus server 351. FIGS. 2A through 2N show screen images for configuring the bonus promotions of the present invention using the configuration workstation 359.

B. Bonus Server

In the described embodiment, each bonus server 351 is implemented as an IBM compatible personal computer having an Intel TM "PENTIUM" compatible microprocessor and running the pSOS real time operating system. Each bonus server has an IP address which is identified by a dongle attached to its parallel port. Each bonus server is configured with both primary and secondary non-volatile random access memory (NVRAM) for storage of bonusing data. This NVRAM is implemented on PCMCIA cards (PC-cards). Two megabytes of static RAM is required, and PC-card based hard disks can be used to increase storage capacity. Each bonus server also includes an Ethernet interface for communication with the concentrator 352.

C. Bank Controller

Figure 6:
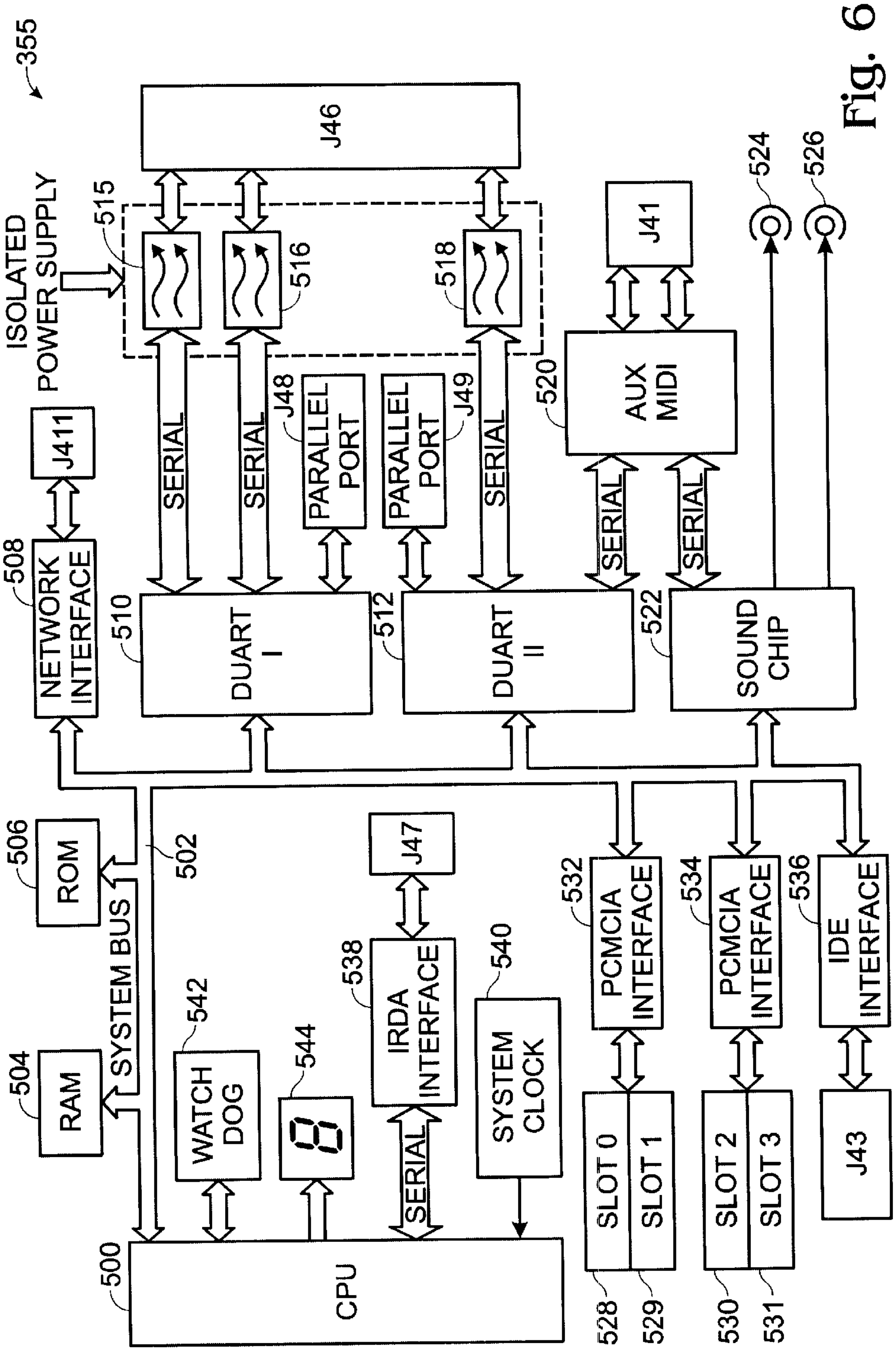
FIG. 6 is a functional block diagram of an embodiment of a bank controller in accordance with the present invention.

FIG. 6 is a block diagram of an embodiment of a bank controller 355 constructed in accordance with the present invention. The bank controller includes a central processing unit (CPU) which is preferably an NS486 type microprocessor. The NS486 processor is compatible with an Intel type 80486 microprocessor. The CPU is interfaced to an industry standard type SIMM72 RAM chip 504 and an industry standard type 27C4096 ROM chip 506 through a system bus 502. The system bus includes all of the address, data, and control lines, as well any decoding circuits, direct memory access (DMA) circuitry, and "glue logic" required to interface the CPU to the memory devices and any other peripheral devices.

The Bank Controller includes a network interface circuit 508 which interfaces the CPU 500 to the concentrator 352 of FIG. 5. The network interface circuit is based on an ETHERNET compatible type SMC91C94 network interface chip which is connected to the CPU through the system bus 502 and is accessible through connector J411. The network interface circuit includes an industry standard type 78Z11228B-01 I/O driver chip which interfaces the network interface chip to the connector J411.

The Bank Controller also includes two dual universal asynchronous receiver/transmitter (DUART) chips 510 and 512 which are also interfaced to the CPU through the system bus 502. The duart chips are preferably industry standard type ST16C552 devices having two serial ports and one parallel port each. The two serials ports on DUART 510 are coupled to a connector J46 through two optical isolation circuits 514 and 516 which are based on industry standard type HCNW139 opto-coupler chips. The isolation circuits are designed to be compatible with the "OL" type serial communication ports described below with reference to the Machine Communication Interface. In a preferred embodiment, the isolation circuits are powered by an isolated power supply and are designed to provide 3 KV of electrical isolation between the DUART and the connector J46. The isolation circuits are configured to function as "master" communication ports, i.e., they supply the power necessary for running the serial communication link. Each of the isolation circuits 514 and 516 includes a set of high current totem-pole complimentary output transistors which allows it to drive up 32 slave communication ports in parallel. Thus, the bank controller can communicate with a total of 64 Machine Communication Interfaces.

The parallel ports on DUARTs 514 and 516 are accessible through parallel port connectors J48 and J49 and allow the bank controller to read a bank ID number from a dongle attached to one of the parallel ports.

One of the serial ports on DUART 512 is coupled to connector J46 through another optical isolation circuit 518 which is identical to circuits 514 and 516. This port is preferably connected to the overhead display device 357 of FIG. 5, a card reader assembly for use in, for instance, the multiple jackpot 310, such as assembly 311 of FIG. 7, and/or any other device having an "OL" compatible serial communication link operating as a slave. The other serial port on DUART 512 functions as an auxiliary port and is coupled to connector J41 through a dual RS232 interface chip 520 such as an industry standard type ADM232AARN which converts standard logic level signals from the DUART 512 to the RS232 drive levels.

The bank controller further includes a sound chip 522 which provides two channels of analog audio output and a serial communication port. The sound chip, which is preferably a type AD1812, is commonly known as a "sound blaster" chip and is interfaced to the CPU through the system bus 502. The two audio output channels are accessible through sub-miniature phone jacks 524 and 526. The audio signals from the sound chip must be amplified by external equipment.

The serial port of sound chip 522 functions as a Musical Instrument Device Interface (MIDI) port and is used to control MIDI compatible special effects devices such as lighting equipment, motors, external sound devices, and any other devices as required for specific promotions. The serial port is coupled to connector J41 through the RS232 interface chip 520 described above so as to convert standard logic level signals from the sound chip 522 to the RS232 drive levels that are required by MIDI compatible equipment.

Support for four Personal Computer Memory Card Interface Architecture (PCMCIA) slots 528–529 are provided by two PCMCIA interface chips which are interfaced to the CPU through system bus 502. The PCMCIA interface chips 532 and 534 which are preferably type CL-PD6722 devices.

An IDE interface circuit 536 is interfaced to the CPU through the system bus and provides an IDE standard port for interfacing the bank controller to a CD-ROM drive through connector J43.

The bank controller includes an "iRda" compatible infrared communication port which utilizes an asynchronous serial communication port on the CPU 500. The iRda port includes an iRda interface circuit 538 and is accessible through connector J47. The iRda interface circuit includes input/output buffers and high current complimentary output transistors for driving iRda compatible equipment. The iRda interface circuit is preferably coupled to an infra-red receiver/transmitter mounted above the bank controller on a stalk or pole.

A system clock circuit 540 is based on an AV9154A-27 chip and generates a 50 MHz system clock signal for the CPU, as well as clock signals for the various UART serial port circuitry, and a 14 MHz clock signal for the sound chip 522.

A watchdog circuit 542 monitors the CPU and resets it if stops sending a periodic signal to the watchdog circuit or if the power supply voltage exceeds predetermined limits. The watchdog circuit is preferably based on an MAX705CSA type watchdog chip.

Finally, an LN514RA type 7-segment LED display 544 with decimal point is interfaced to eight discrete I/O lines on the CPU through an industry standard type 74ACTQ245 logic chip.

D. Machine Communication Interface

Figure 7:
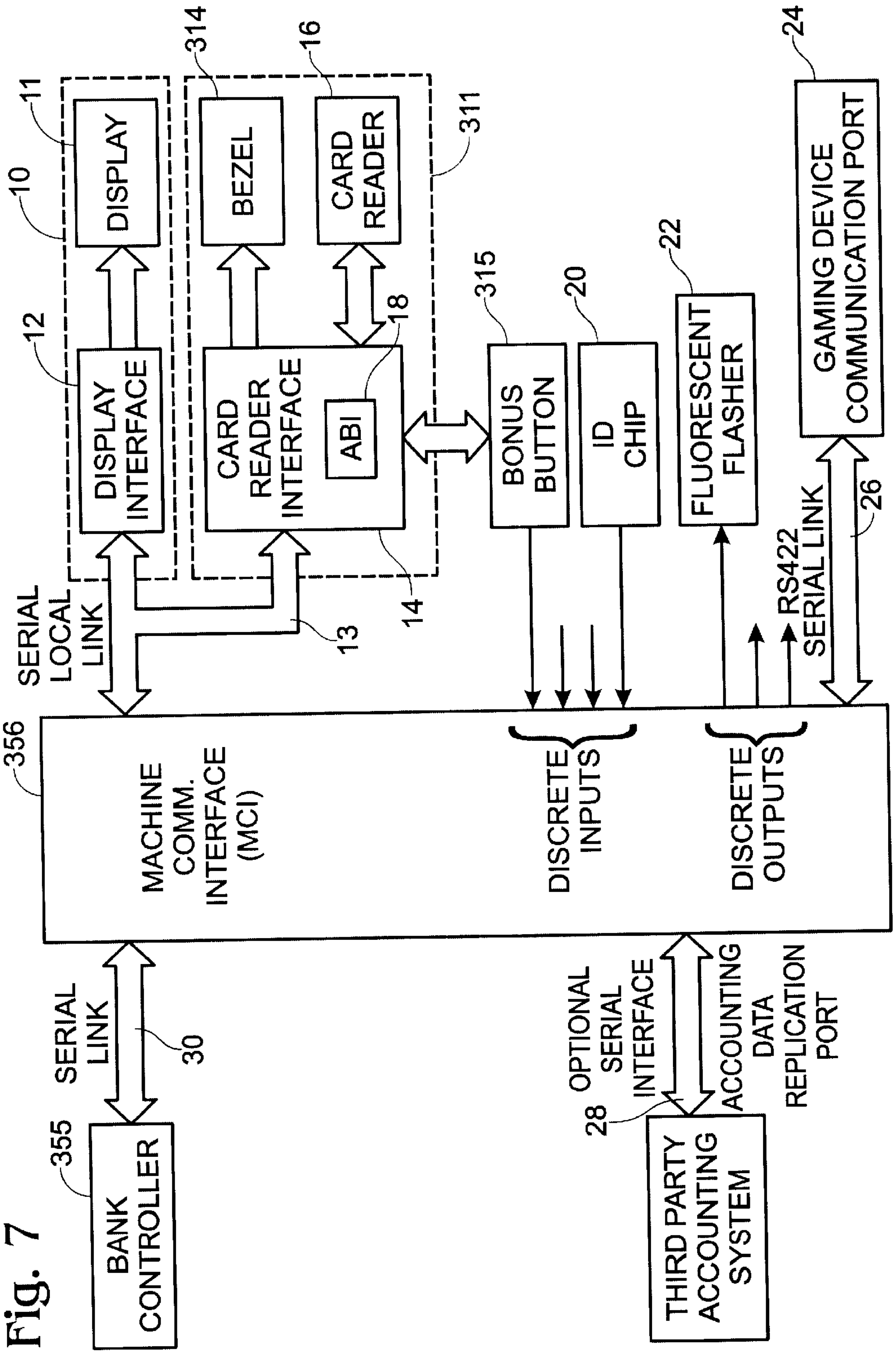
FIG. 7 is a block diagram showing how a machine communication interface can be interconnected to other components of a bonus promotion system in accordance with the present invention.

In the described embodiment of the present invention, each gaming device 300 (also referred to as an electronic gaming machine or "EGM") includes a machine communication interface (MCI) 356 which is interfaced to several peripheral components as shown in FIG. 7. A display assembly 210 is mounted to the front of the gaming device for displaying bonus amounts, greeting messages, instructions, anticipation messages an other information. The display assembly 210 includes a display device 11, which is preferably a vacuum fluorescent display (VFD) module, and a display interface board 12.

A card reader assembly 311 is also mounted to the front of the gaming device. The card reader assembly includes a card reader interface board 14, a lighted bezel 314, and a card reader module 16. An audible bonus indicator 18 is fabricated integral to the card reader interface board.

Both the display interface board 12 and the card reader interface board 14 are coupled to the MCI through a local serial link 13 which provides two-way communication between the MCI and the display assembly 210, and between the MCI and the card reader assembly 311. The serial local link 13 is also referred to as the local "On-Line" link or local OL. Additional components can be added to the serial local link 13 as the need arises. The local serial link also provides power to the display assembly and card reader assembly.

A lighted bonus button 315 is mounted to the front of the gaming device 300 and derives power from the card reader interface board 14. The bonus button includes a switch which is coupled to both the card reader interface board and the MCI to provide an electronic signal whenever the button is pressed by a player. The selection of the bonus button is driven primarily by aesthetic considerations rather than engineering factors since the "look and feel" of the bonus button are important considerations for a gaming device.

An identification circuit (also referred to as an "ID chip") 20 is connected to the MCI to provide a unique identification number to each MCI installed in a gaming device.

A fluorescent flasher unit 22 is optionally coupled to the MCI to provide additional signaling capabilities to gaming devices equipped with fluorescent illumination lights.

The MCI is coupled to an EGM communication port 24 on the gaming device through an industry standard RS422 serial link 26. Each gaming device 300 is controlled by an internal control system which operates independently of the bonusing promotion system 350. The communication port 24 allows other equipment to access the internal control system of the gaming device for data collection and control purposes. In the described embodiment, the MCI communicates with the gaming device by using a protocol such as ASP 1000 which is published by Aristocrat Leisure Industries of Australia. The communication port 24 is typically used by a third-party accounting system to extract accounting data from the gaming device. However, in a gaming device that is configured for bonusing operation in accordance with the present invention, the communication port is used by the MCI to monitor meters and events from the gaming device and to issue bonus related commands to the gaming device.

To allow third party accounting systems to operate even when an MCI is connected to the communication port 24, each MCI also includes an optional serial interface 28 which acts as an accounting data replication port.

Each MCI is coupled to its associated bank controller through a multi-drop serial communication link 30. The serial link 230 is also referred to as an "On-Line" or "OL" link. On the OL link 30, all of the MCI receivers are connected to the transmitter of the bank controller, and all of the MCI transmitters are connected to the receiver of the bank controller. Thus, all MCIs "hear" the Bank Controller communications simultaneously, but the MCIs do not "hear" each other. Only one MCI can transmit at a time. The OL link utilizes a four-conductor cable to physically couple each MCI to the bank controller.

Similarly, on the local OL link 13, the receivers of all of the peripheral devices such as the display 10 and card reader 311 are connected to the transmitter of the MCI, and the transmitters of all the peripheral devices are connected to the receiver of the MCI so that all peripherals "hear" the MCI communications simultaneously, but the peripherals do not "hear" each other.

Not all of the peripheral components need be installed in each machine, and some components, such as the card reader assembly and display assembly can be installed in a gaming device and operated in a "stand alone" mode without an MCI.

Figure 8A:
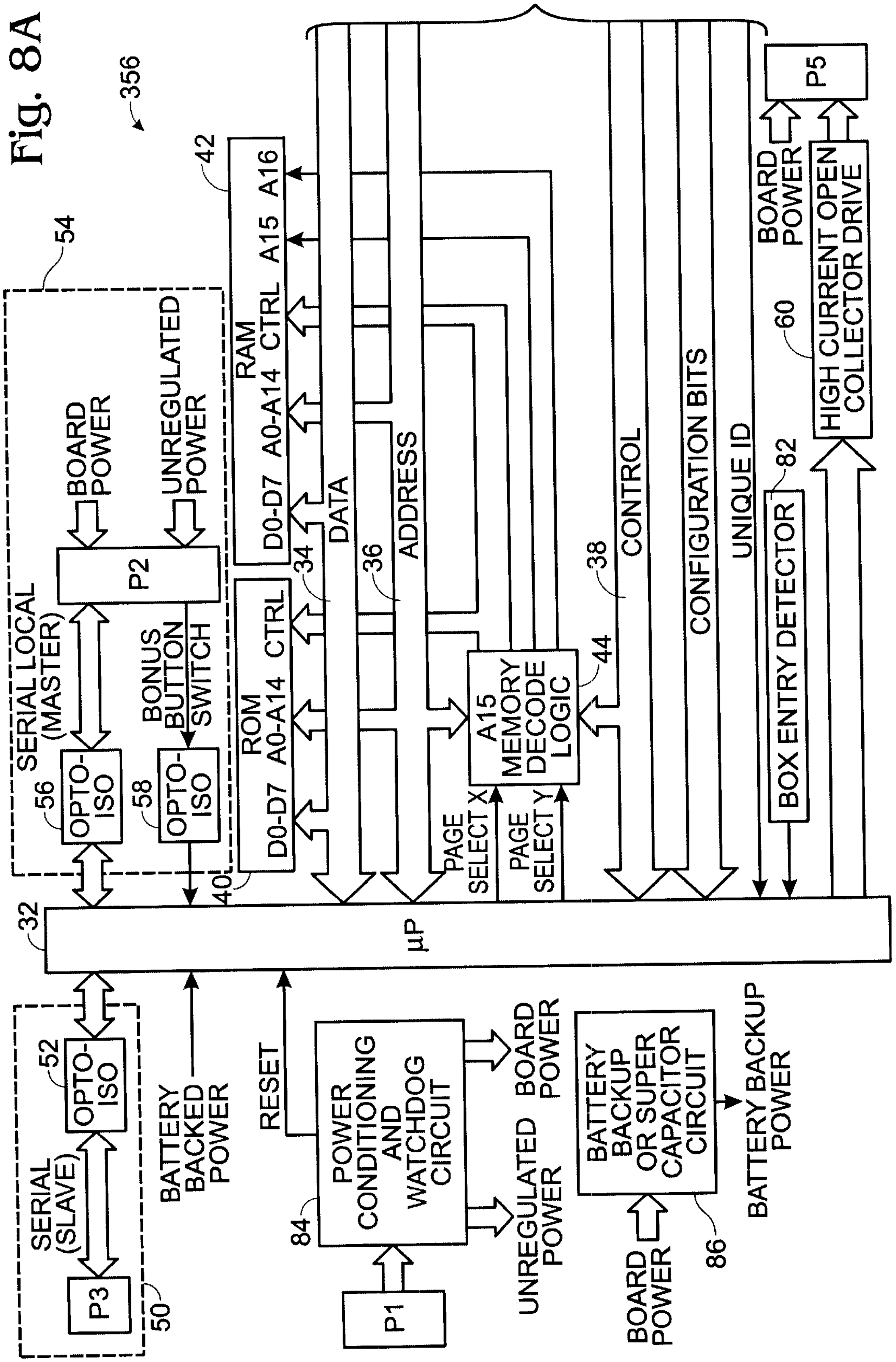
FIGS. 8A and 8B together form a block diagram of an embodiment of a machine communication interface in accordance with the present invention.
Figure 8B:
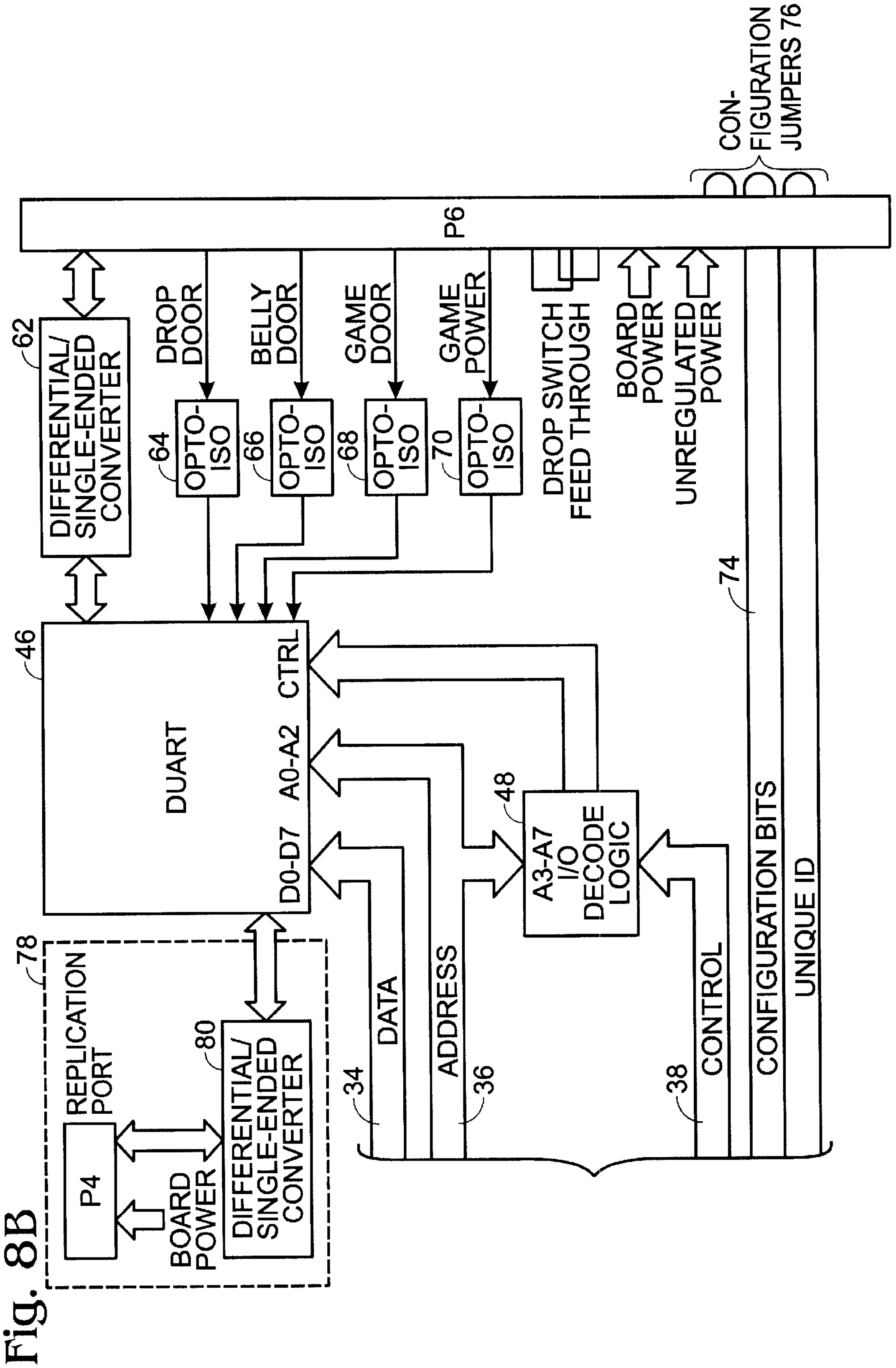

FIGS. 8A and 8B, which are referred to collectively as FIG. 8, form a block diagram of an embodiment of a machine communication interface (MCI) 356 constructed in accordance with the present invention. This block diagram would enable one of ordinary skill in the art to design an MCI which is capable of performing all of the functions necessary to practice the present invention. Referring to FIG. 8, each MCI includes a microprocessor 32. In a preferred embodiment, the microprocessor is a microcontroller having two serial communication ports and numerous discrete digital input and output ports such as an "H8/325" type controller manufactured by Hitachi of Tokyo, Japan. Although the processor 32 could possibly be run exclusively from internal memory, in a preferred embodiment, the processor utilizes a combination of internal and external memory devices to increase the available memory space and to provide more flexibility in selecting the microprocessor.

The external memory is arranged in a paged addressing scheme to facilitate a software implementation structure which is described below. A 32 Kbyte read only memory (ROM) chip 40 and a 128 Kbyte random access memory (RAM) chip 42 are interfaced to the processor through data bus 34, address bus 36, control bus 38, and a memory decode logic circuit 44. Control bus 38 includes the control lines which are typically required to interface memory and I/O devices to a microprocessor such as read, write, and I/O strobe lines. ROM chip 40 is preferably an industry standard type 27C256, while RAM chip 42 is preferably an industry standard type KM681000.

Memory decode logic circuit 44 enables the processor to access either the ROM chip or a 32K page of the RAM chip in response to the PAGE SELECT X, PAGE SELECT Y, and ROM/RAM signals which are generated by the processor through discrete digital I/O lines. When the ROM/RAM signal is low, ROM is selected. When ROM/RAM is high, a 32K page of RAM is selected depending on the state of the PAGE SELECT X, PAGE SELECT Y signals. If both PAGE SELECT X and PAGE SELECT Y are low, the lowest 32K page is selected using the A15 and A16 address bits of the RAM chip. If PAGE SELECT X is high and PAGE SELECT Y is low, the next lowest 32K page is selected, etc.

By using a pull-up resistor on the ROM/RAM line, the memory decode logic circuit takes advantage of the fact that the digital I/O lines are configured as high impedance inputs when the processor is initialized to assure that the processor always accesses the ROM chip after power-up or reset initialization.

A dual universal asynchronous receiver/transmitter (DUART) chip 46 is interfaced to the processor through data bus 34, address bus 36, control bus 38, and an I/O decode logic circuit 48. The DUART chip 46 provides two additional serial communication ports as well as several discrete digital I/O lines. The serial ports and digital I/O lines of the DUART are mapped into the I/O space of the processor by an I/O decode logic circuit 48 as is known in the art. The DUART is preferably an industry standard type 16C452/552 device.

Each MCI includes a serial OL port 50 for communicating with the bank controller 355 over an OL link. The OL port 50 is configured as a slave, which means that power for the link is supplied by the equipment on the other end of the cable, i.e., the bank controller. Configuring the OL port as a slave also means that it can only "hear" communications from the master, i.e., bank controller, but not from other slaves. Likewise, a slave OL port can only transmit to the master and not other slaves.

The OL port 50 includes a connector P3 for connecting the port to the bank controller via a four-wire OL cable (not shown). The OL port also includes an optical isolation circuit 52 which optically couples connector P3 to a native serial port on the processor 32 and provides full duplex communication. In a preferred embodiment, the optical isolation circuit utilizes industry standard type CNW139 opto-isolator chips and provides full electrical isolation to 3 KVDC between the OL cable and the rest of the MCI to comply with regulatory standards. Such optical isolation circuits are known in the art and will not be discussed further.

Each MCI also includes a "local" serial OL port 54 which is configured as a master, i.e., it supplies the power necessary to run the local OL link. The local OL port 54 includes a connector P2 for connecting the port to peripheral devices such as card readers, displays, etc. through a cable (not shown). An optical isolation and drive circuit 56 couples connector P2 to a native serial port on the processor and provides full duplex communication between the MCI and the peripheral components. In a preferred embodiment, the local OL optical isolation circuit 56 utilizes an industry standard type 6N137 opto-isolator chip to receive signals, and a high-current Darlington transistor to enable the local OL port to drive about eight OL slave devices in parallel when transmitting.

The local OL port provides power to peripheral components through connector P2. Both board power (typically 5

VDC and ground) and an unregulated power supply (typically 24 VDC and common) are provided at P2. The unregulated power supply is necessary for powering the light on the bonus button 315. Since the board power provided to P2 is the same power supply used by the processor and other sensitive electronic devices in the MCI, care should be taken to assure that any peripheral devices attached to the local OL port through P2 are mounted internal to the gaming device to reduce the possibility of coupling external sources of electrical interference back into the board power supply.

The local OL port also includes another optical isolation circuit 58 for coupling the bonus button switch to a discrete digital input on the processor. Optical isolation circuit 58 preferably utilizes an industry standard type TLP621 opto-isolator chip and any suitable circuit topology. In a preferred embodiment, the bonus button switch is wired in series with both the optical isolation circuit 58 on the MCI and a similar circuit on the card reader interface 14 so that a bonus button signal is provided instantaneously and simultaneously to the MCI and the card reader interface when the bonus button is pressed. The bonus button signal is preferably coupled to a discrete digital input which can generate an interrupt for software purposes.

Each MCI is interfaced to the gaming device through connectors P5 and P6. Connector P5 is coupled to four discrete digital output lines on the processor through a high-current, open-collector Darlington drive circuit 60. This provides high current digital outputs for controlling auxiliary devices such as fluorescent flashers. Board power is also provided to connector P5.

Connector P6 interfaces the MCI to the gaming device and allows the MCI to communicate with the gaming device's internal controller and monitor the status of various features of the gaming device. A differential/single-ended converter circuit 62 couples connector P6 to a serial port on the DUART 46 and forms an RS422 port for coupling the MCI to the communication port in the gaming device. The differential/single-ended converter circuit 62 is based on an industry standard MAX490 integrated circuit and allows the RS422 port to be configured for the polarity of the driver circuit in the gaming device communication port.

Connector P6 also interfaces the gaming device's DROP DOOR switch, BELLY DOOR switch, and GAME DOOR switch to discrete digital inputs on the DUART through optical isolation circuits 64, 66, and 68, respectively. Another optical isolation circuit 70 couples a GAME POWER signal from the gaming device to a digital input on the DUART through P6. Optical isolation circuits 64–70 preferably utilize industry standard TLP620-2GB type opto-isolator chips.

The unique ID chip 20 is coupled to connector P6 to through a set of "flying leads." The unique ID chip provides the processor 32 with a unique 32-bit identification number through a single data line that is coupled to a discrete digital input line.

Three configuration lines 74 are coupled to digital inputs on the processor using pull-up resistors. These lines enable the processor to adjust the operation of the MCI based on the presence or absence of configuration jumpers 76 on connector P6.

In a preferred embodiment, connector P6 is provided with feedthrough connections for machine drop switch signals.

Board power is supplied to P6 to provide a ground reference for the RS422 communication link and configuration jumpers, and to provide a power source for the unique ID chip. The unregulated power supply is also provided to P6 to provide power for driving the opto-isolators.

In a preferred embodiment, the digital inputs are connected to input pins on the processor which are capable of generating interrupt requests for programming purposes. The input and output lines for the OL serial links, high current outputs, and input power lines preferably have inductors in series to protect the MCI from electromagnetic transients.

Each MCI further includes a replication port 78 which emulates the communication port on the gaming device. This facilitates the use of older third party accounting (data collection) systems even when an MCI is connected to the gaming device's communication port. The MCI can be programmed to perform a translation function wherein the MCI transmits data to the data collection system in whatever language the system requires, e.g., "SAS." The replication port includes a differential/single-ended converter circuit 80 which couples a serial port on the DUART to connector P4. The converter circuit 80 is based on a MAX490 integrated circuit. Connector P4 is also provided with board power. In a preferred embodiment, the circuitry for the replication port is fabricated on a printed circuit board with the rest of the MCI circuitry, but the components for the port are only loaded on the board as an optional feature.

A power conditioning and watchdog circuit 84 receives an input power supply signal through connector P1. The power supply signal is rectified by two full-wave rectifier bridges. The first bridge is coupled to an electrolytic capacitor and produces the unregulated DC power supply for running the light on the bonus button, opto-isolators and other devices that do not require regulated power. The output voltage of the unregulated power supply varies with the voltage of the input power supply signal.

The second bridge is coupled to another electrolytic capacitor, which in turn, is coupled to a switching voltage regulator that generates the board power source. The switching voltage regulator is preferably based on an industry standard type LM2576 and produces a 5 VDC power signal suitable for powering the microprocessor 32, memory chips 40 and 42 and other sensitive devices. The board power supply must have adequate current capacity to power the electronics on the MCI 356, the card reader 311, the display 10, and any other devices coupled to the local serial link 13. Although the input power supply signal can be either an AC or a DC signal and can range from 8.5 volts to 24 volts for the board power supply to operate properly, at least 18 volts are required to cause the unregulated power supply to generate the 24 VDC required to operate the light on the bonus button.

The input power supply signal is preferably provided by an uninterruptable power supply (UPS) so that the MCI retains its supervisory capability even if the gaming device it is installed in looses power. Thus, the MCI can detect a door opening on the gaming device in the event of a power outage as required by some regulatory authorities.

The power conditioning and watchdog circuit 84 also includes a watchdog timer and power-down manager based on an industry standard type HA16103FPJ watchdog integrated circuit. This type of circuit is well known in the art and drives the RESET line to the processor to assure the processor is initialized properly after a power-up, or a watchdog fault condition.

A backup power circuit 86 is provided to preserve the operational state of the MCI in the event of a power failure. The backup power circuit can be any suitable type of power supply such as a battery back-up circuit, but in a preferred embodiment, it is passed on a "super capacitor" circuit which is well known in the art. The backup power circuit derives charging current from the board power supply and supplies backup power to the processor 32 and RAM chip 42.

The MCI is preferably fabricated on a single printed circuit board having board-mounted connectors P1–P6 for connecting the MCI to the peripheral components and the bank controller. The board is mounted in a sealed metal box inside the gaming device to protect it from damage and tampering. A box entry detector circuit 82 includes a reflective opto-sensor such as an industry standard type LTH209-01. The box entry detector generates a digital signal which produces a digital signal at the processor if the box is tampered with. The box entry detector is mounted so that it is extremely difficult to open the box without triggering the sensor.

E. Card Reader

Figure 9A:
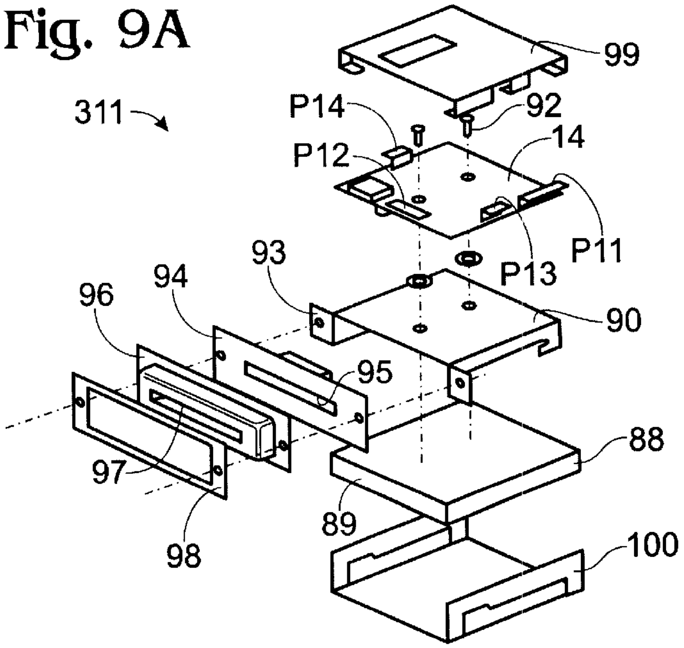
FIG. 9A is and exploded view of an embodiment of a card reader assembly constructed in accordance with the present invention.
Figure 9B:
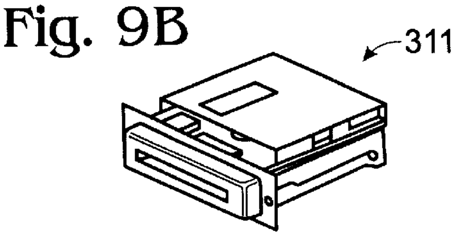
FIG. 9B is a perspective view of the card reader assembly of FIG. 9A.
Figure 9C:
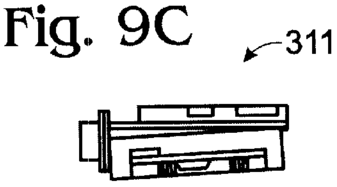
FIG. 9C is a side elevational view of the card reader assembly of FIG. 9A.

Referring to FIGS. 9A, 9B, and 9C, an embodiment of a card reader assembly in accordance with the present invention is shown generally at 311. As seen in the exploded view of FIG. 9A, the card reader includes Panasonic type ZUM2121-S15 magnetic card reader module 88 which is mounted to a bracket 90. Card reader 88 has a slot 89 into which a magnetic card is inserted during operation. A card reader interface board 14 is mounted to the bracket with two screws 92. A bezel PC board 94 is mounted to bracket 90 and electrically coupled to the card reader interface 14 through a connector P12 on the card reader interface. The bezel PC board has a slot 95 through which the magnetic card slides into the card reader 88. Two pieces of heat shrink tubing 93 are attached to mounting tabs on the bracket 80 to insulate the bezel PC board from the bracket. A bezel 96, which also has a slot 97 through which the magnetic card slides, is attached to the bezel board so as to be illuminated by light emitting diodes (LED's) on the bezel board. A cover 98 trims the bezel. The card reader assembly also includes two polycarbonate covers 99 and 100 which enclose the card reader and card reader interface while still allowing access to connectors P11, P13, and P14 on the card reader interface.

Figure 10:
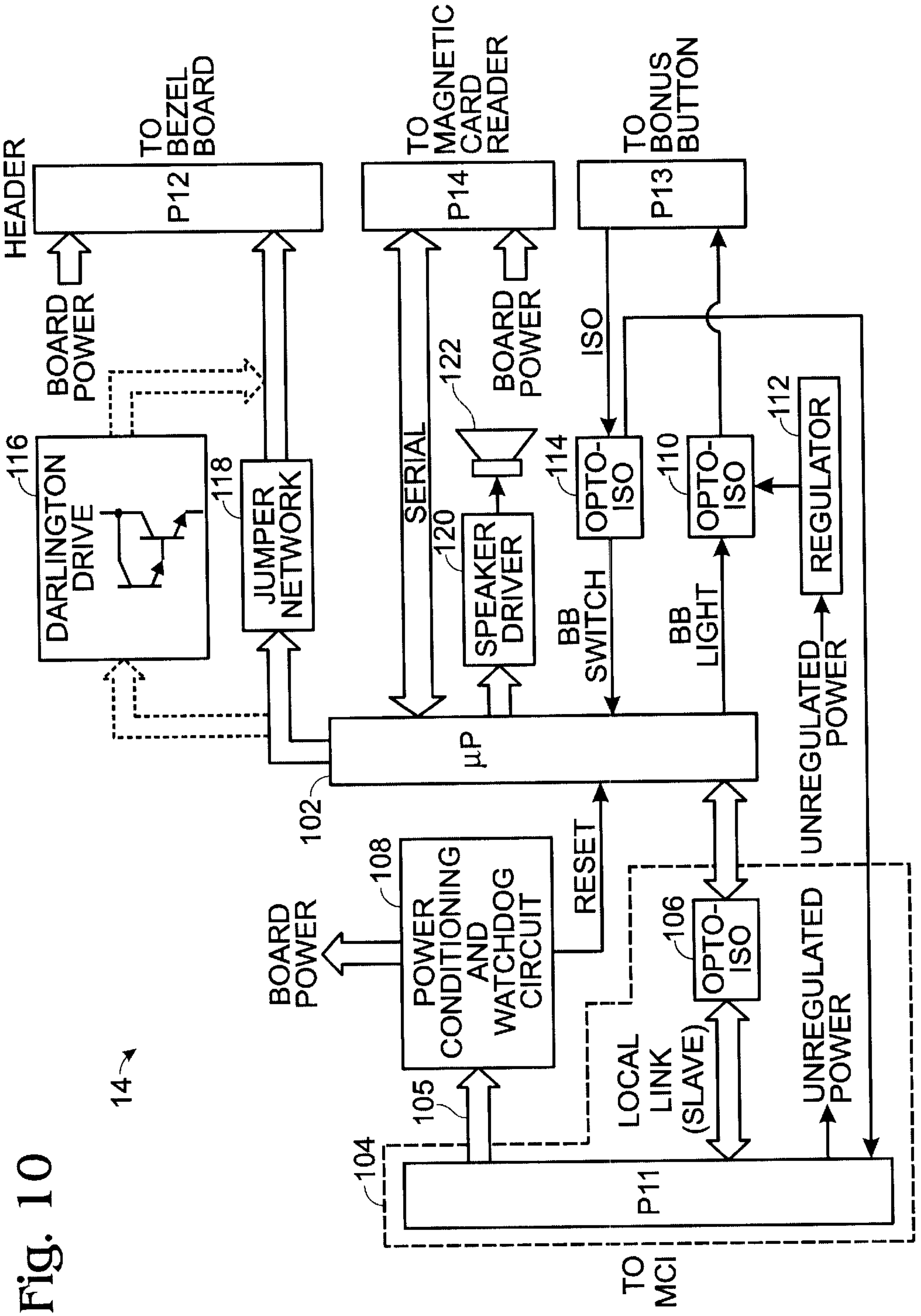
FIG. 10 is a block diagram of an embodiment of a card reader interface board in accordance with the present invention.

More details of the card reader interface 14 are shown in block diagram form in FIG. 10. This block diagram would enable one of ordinary skill in the art to design a card reader interface which is capable of performing all of the functions necessary to practice the present invention.

Referring to FIG. 10, the card reader interface 14 includes a microprocessor 102 which is preferably an AT89C2051 type of microcontroller (also known as a "51"). This is a completely self-contained controller having internal RAM and ROM.

The card reader interface also includes a "local" OL serial port 104 which is configured as a slave which means that power for the link is supplied by the equipment on the other end of the cable, i.e., the MCI. The local OL port includes a connector P11 for connecting the port to the MCI through a cable (not shown). An optical isolation circuit 106 couples connector P11 to a native serial port on the processor 102 and provides full duplex communication between the card reader interface and the MCI (or other master device if the card reader assembly is operated in a stand-alone mode). In a preferred embodiment, the local OL optical isolation circuit 106 utilizes an industry standard type 6N137 opto-isolator chip to receive signals, and an industry standard type TLP621 opto isolator chip to transmit signals. The transmit opto-isolator chip only needs to supply enough current to drive a single 6N137 opto-isolator device on the MCI since the card reader interface only communicates with the MCI over the local OL.

The local OL slave port 104 receives regulated power to run the card reader interface through connector P11. The card reader interface also receives an unregulated power supply (typically 24 VDC and ground) through connector P11.

The card reader interface further includes a power conditioning and watchdog circuit 108 which includes one of two different watchdog subcircuits depending on the voltage level of the regulated power supply 105 provided to connector P11. If 10 VDC is provided, the power conditioning and watchdog circuit 108 uses a first subcircuit which is a standard watchdog circuit based on an industry standard type HA16103FPJ watchdog IC chip. The first subcircuit includes a PNP transistor which is connected in series between the 10 VDC power supply and the board power bus to reduce the 10 VDC power supply to 5 volts for board power. The PNP transistor is controlled by the HA16103FPJ IC chip.

If a regulated 5 VDC power supply is provided to connector P11, a second watchdog circuit based on an industry standard DS1232LPS-2 watchdog IC chip is used. In this case, the 5 VDC power supply runs the board directly. The circuitry for both the first and second subcircuits is fabricated on the printed circuit board with the rest of the card reader interface circuitry, but the components for only one of the subcircuits are loaded depending on whether the board is intended for use with a 5 volt or 10 volt supply.

The processor 102 on the card reader interface communicates with the card reader module 88 through connector P14 which couples the card reader to three discrete digital input lines on the processor. The digital input lines are preferably capable of generating interrupt requests for programming purposes. The communication protocol for the card reader is well known in the art and will not be discussed further. Board power is supplied to connector P14 to provide power for running the card reader.

The lighted bonus button is coupled to the card reader interface through connector P13 which is preferably a right angle header as shown in FIG. 9A. The bonus button light is controlled by a discrete digital output on the processor through an optical isolation circuit 110 which is based on a TLP621 opto-isolator chip. Power for the bonus button light is provided by the unregulated power supply which is received at connector P11. An optional voltage regulator 112 regulates the power for the bonus button light to 24 VDC.

The switch from the bonus button is coupled to a discrete digital input on the processor through optical-isolation circuit 114 and connector P13. Optical-isolation circuit 114 is also based on a TLP621 opto-isolator chip and is powered by the unregulated power supply. The optical-isolation circuit 114 on the card reader interface 14 is preferably wired in series with optical isolation circuit 58 on the MCI (shown in FIG. 58) so that the switch closure signal from the bonus button is received at the processors in the MCI and card reader interface simultaneously when the bonus button is pressed by a player.

The card reader interface is coupled to the bezel board 94 through connector P12 which is preferably a right angle header as shown in FIG. 9A. Board power is provided to the bezel board through connector P12. The processor 102 utilizes two or more discrete digital output lines to drive the LED's or other light sources on the bezel board 94 through either a Darlington driver circuit 116 or a network of jumpers 118. If the bezel board does not have on-board LED drivers, the Darlington driver circuit is loaded with an industry standard type ULN2003A 7-channel Darlington drive chip. If the bezel board has on-board drive circuitry, a network of jumpers is loaded instead of the Darlington drive chip to couple the drive signals from the processor directly to the bezel board.

The card reader interface further includes a speaker drive circuit 120 which drives an audible bonus indicator (ABI) 122, such as a STAR MUT-03A speaker in response to four or more digital output signals from the processor. Such speaker drive circuits are known in art and allow the audible indicator to vary in tone and volume under software control. The tone of the audible indicator is preferably selected to be noticeably different from other common electronic audible indicators such as those used for cellular telephones.

Figure 11:
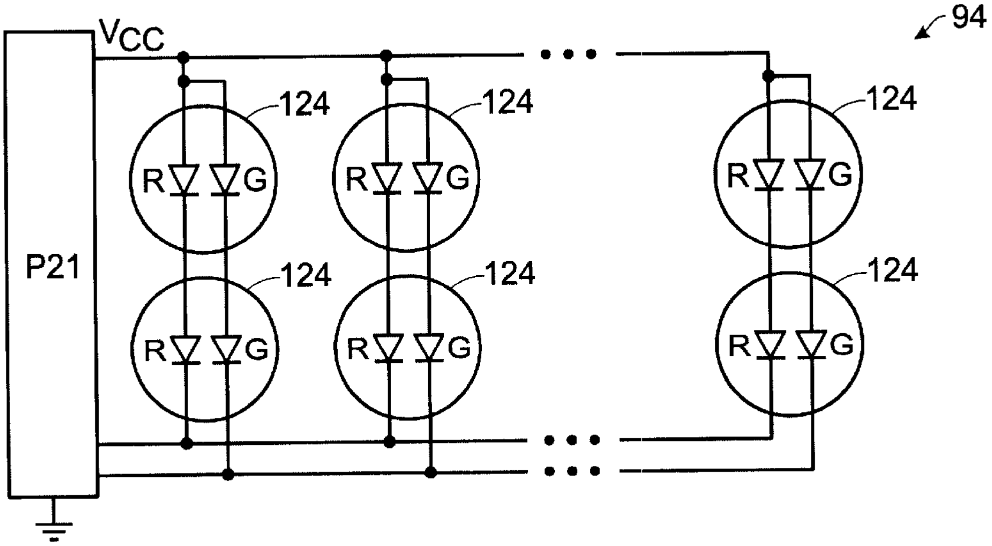
FIG. 11 is a schematic diagram of an embodiment of a bezel printed circuit board in accordance with the present invention.

A schematic diagram of the bezel PC board 94 is shown in FIG. 11. The bezel PC board includes a plurality of light-emitting diodes (LED's) 124 which are mounted around the perimeter of the opening 95 in the printed circuit board which is shown in FIG. 9A. In the preferred embodiment, the LED's are dual light-emitting diodes capable of producing two primary colors and a third combination color. The LED's receive drive signals and power from the card reader interface through connector P21.

E. Display

The display assembly 210 includes essentially the same hardware including the controller, driver, and vacuum fluorescent display unit as shown and described in U.S. patent application Ser. No. 08/322,172 entitled "METHOD AND APPARATUS FOR OPERATING NETWORKED GAMING DEVICES," filed Oct. 12, 1994, now pending, which is incorporated herein by reference for all purposes.

III. Operation

A. Data Flow Between Components

1. Overview

The individual components of the system 350 communicate with the bonus server 351 via messages exchanged as data packets. The process of data packet exchange is referred to as the data flow. From the standpoint of the bonus server 351, there are four types of data packets. First, broadcast packets originate at one source and are received at several destinations. For example, a meter broadcast packet originates from a concentrator 352 and is received by several bonus servers 370 for communicating meter information potentially utilized by the several bonus servers 370 in the funding of their respective bonus promotions. Second, an event packet originates at one source and is received at a single destination. Typically, an event packet communicates the occurrence of a particular condition to the receiving destination. For example, a bonus pay packet communicates the amount, hit sequence number and bonus server identifier (ID) from a bonus server 370 to a particular MCI 356. Third, a query packet also originates at a single source and is received at a single destination. For example, a history query packet originates at the DACOM host 354 for requesting the number of records and the start date and time of operation for a particular bonus server 370. Finally, a response packet is a packet sent in reply to a query packet for providing the particular information sought. The particular packets exchanged between the individual components varies according to the bonus promotion, as further described below.

2. Cash Bonus

Figure 22:
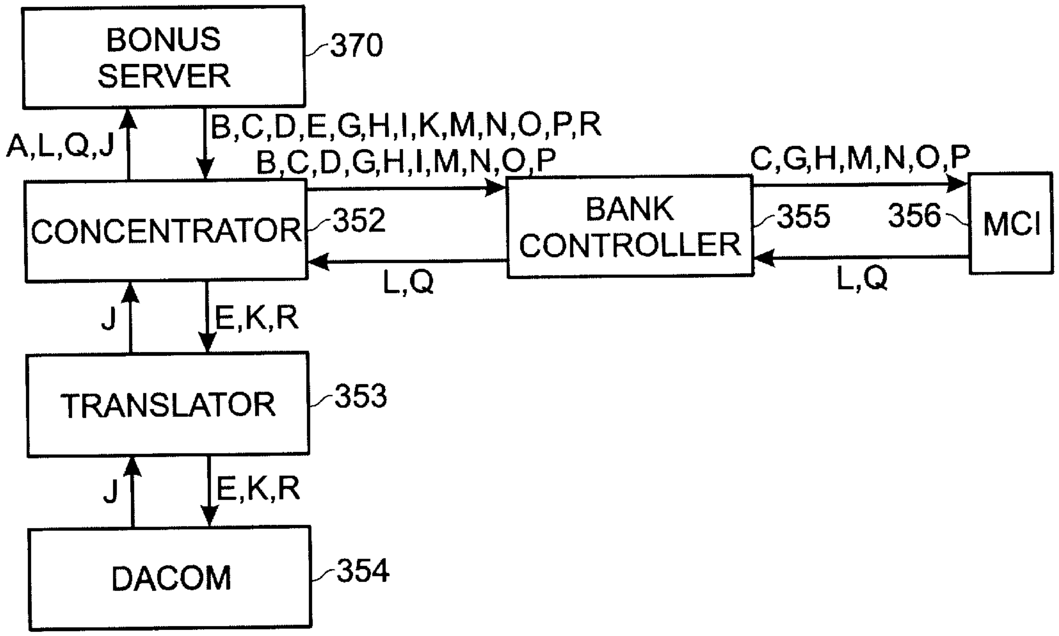
FIG. 22 shows a functional block diagram of the data flow and packet format table for the bonus server of FIG. 5 in conducting the cash bonus.

FIG. 22 shows a functional block diagram of the data flow and packet format table for the bonus server 351 of FIG. 5 in conducting the cash bonus 307 operating on the system of FIG. 5. Each unidirectional connection in the functional block diagram is labelled with one or more alphabetic characters corresponding to a row in the packet format table. The packet's type, source and destination, name and description are set forth in each column of the packet format table.

During normal operation, a meter broadcast packet A is sent from the concentrator 352 to each bonus server 370 every half second. The meter broadcast packet A includes a machine field for identifying the transmitting concentrator 352, a meter vector containing individual meter readings and a status field for indicating the status of each MCI 356. As described above with reference to FIG. 5, each concentrator 352 is interconnected with a plurality of bank controllers 355 and each bank controller 355 is interconnected with a plurality of MCIs 356. Individualized reporting of updated meter values from each MCI 356 every half second would create a substantial volume of data packets. Instead, the concentrator 352 collects all of the individual meter readings from each MCI 356 and sends the combined readings as a single meter broadcast packet A to the bonus server 370. This consolidation of meter readings frees the bonus server 370 from having to receive individual updated meter readings from each MCI 356 and substantially decreases the volume of data packets. Upon receipt of the meter broadcast packet A, the bonus server 370 parses the meter vector and updates the bonus pool 304 and hidden pool 306 with a percentage of each meter reading.

When the bonus pool 304 substantially equals the cash bonus 307, a sequence of data packets is exchanged as follows. Prior to cash bonus 307 award, the bonus server 370 broadcasts a start anticipation message B to the group of bank controllers 355 participating in the cash bonus 307 for controlling the anticipation music of the each music system 358. Similarly, the bonus server 370 broadcasts a start anticipation message C to the group of MCIs 356 participating in the cash bonus 307 for configuring each associated gaming device 300. The bonus server 370 sends additional start anticipation messages D and D1 respectively to the bank controller 355 group and music system 358 for controlling another selection of anticipation music. The bonus server 370 also sends a before bonus notify message E to the DACOM host 354 for reporting the location of the winning gaming device 300 and related accounting information, a bonus pay message G to the winning MCI 356 and a consolation message H to the remaining MCIs 356.

Upon the awarding of the cash bonus 307, the bonus server 370 broadcasts a start celebration message I and a start anticipation message I1 respectively to the music system 358 and bank controller 355 group for controlling the celebration music.

The DACOM host 354 maintains historical data regarding the bonuses paid. Periodically, the DACOM host 354 sends a history query message J to the bonus server 370 and in response the bonus server 370 returns a history response message K. Similarly, each MCI 356 periodically sends a bonus pay complete message L to the bonus server 370 upon the pressing of the bonus button 315. In turn, the bonus server 370 sends an after bonus notify message R to the DACOM host 354 upon the completion of a bonus promotion pay-out.

Each gaming device 300 can participate in a number of bonus promotions, each of which is controlled by a separate bonus server 370. In the described embodiment, the bonus promotion system 350 can support up to 32 separate bonus servers 370. Each bonus server 370 communicates to the gaming devices participating in its bonus program using bonus configuration messages which include an enroll MCI message M, a display configuration message N, an effects configuration message O, a de-enroll MCI message P. In addition, every half second, the bonus server 370 receives approximately 1% of the floor map from the MCIs 356 using a floor map message Q.

3. Mystery Bonus

Figure 23:
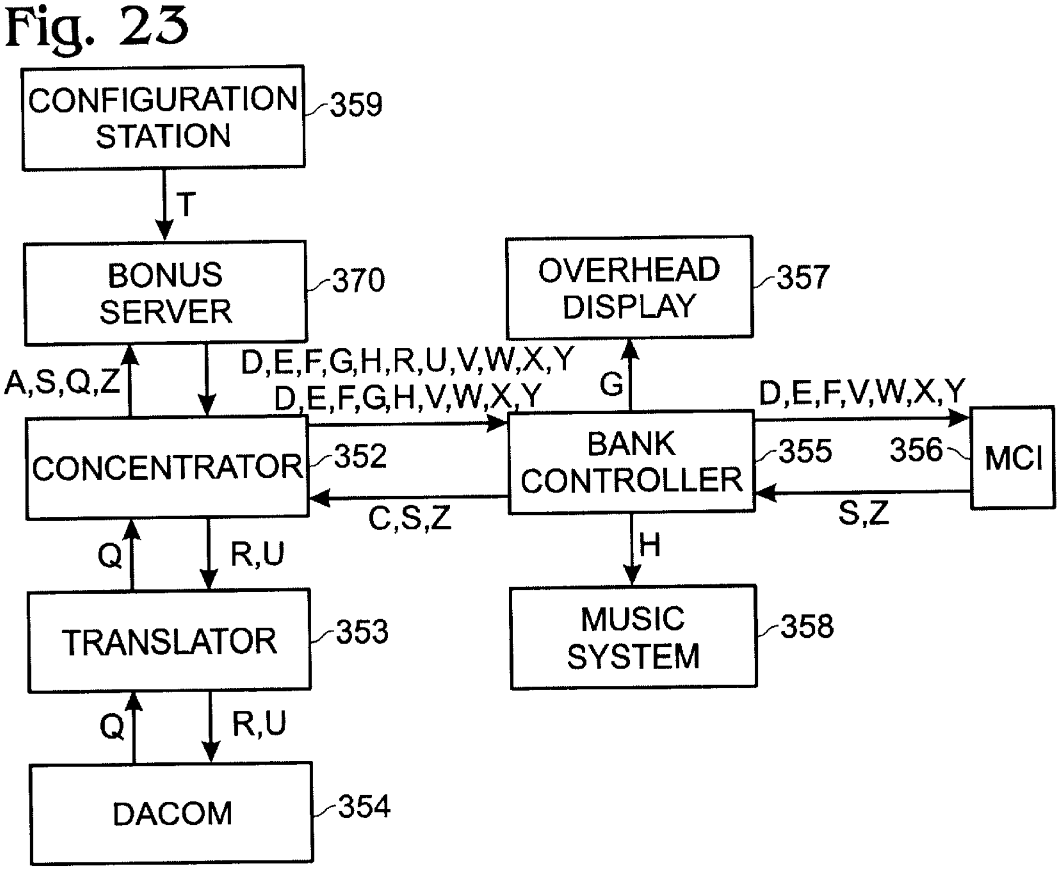
FIG. 23 shows a functional block diagram of the data flow and packet format table for the bonus server of FIG. 5 in conducting the mystery bonus.

FIG. 23 shows a functional block diagram of the data flow and packet format table for the bonus server 351 of FIG. 5 in conducting the mystery bonus 308. Each unidirectional connection in the functional block diagram is labelled with one or more alphabetic characters corresponding to a row in the packet format table. The packet's type, source and destination(s), name and description are set forth in each column of the packet format table.

During normal operation, a meter broadcast packet A is sent from the concentrator 352 to each bonus server 370 every half second in the same manner and with the same content described above for the Cash Bonus in Section III.A.2. Upon receipt of the meter broadcast packet A, the bonus server 370 parses the meter vector and updates the bonus pool 304 and hidden pool 306 with a percentage of each meter reading.

When the bonus pool 304 substantially equals the cash bonus 307, a sequence of data packets is exchanged as follows. Prior to cash bonus 307 award, the bonus server 370 broadcasts an anticipation message D to the group of MCIs 356 participating in the cash bonus 307 for configuring each associated gaming device 300 to lock machines, activate the florescent flasher 22, beep the ABI 122 and so forth. The bonus server 370 sends a bonus pay packet E to the selected MCI 356, including the amount, hit sequence number and bonus server ID, and a consolation packet F to the remaining MCIs 356, including member, non-member and uncarded amounts and a consolation pay message number. In addition, the bonus server 370 sends effects messages G and H to the bank controller 355 for respectively controlling the overhead display 357 and music system 358.

The DACOM host 354 maintains historical data regarding the bonuses paid. Periodically, the DACOM host 354 sends a history query message Q to the bonus server 370 and in response the bonus server 370 returns a history response message R. Similarly, each MCI 356 periodically sends a bonus pay complete message S to the bonus server 370 upon the pressing of the bonus button 315.

Between bonus promotions, each bonus server 370 can be configured using the configuration station 359 via a config message T. In turn, the bonus server 370 sends a configuration change message U to the DACOM host 354 and group, display and effects configuration messages V, W and X to the MCIs 356. An MCI 356 can be removed from a bonus group with a remove MCI message Y. Finally, every half second, the bonus server 370 receives approximately 1% of the floor map from the MCIs 356 using a floor map message Z.

4. Progressive Bonus

Figure 24:
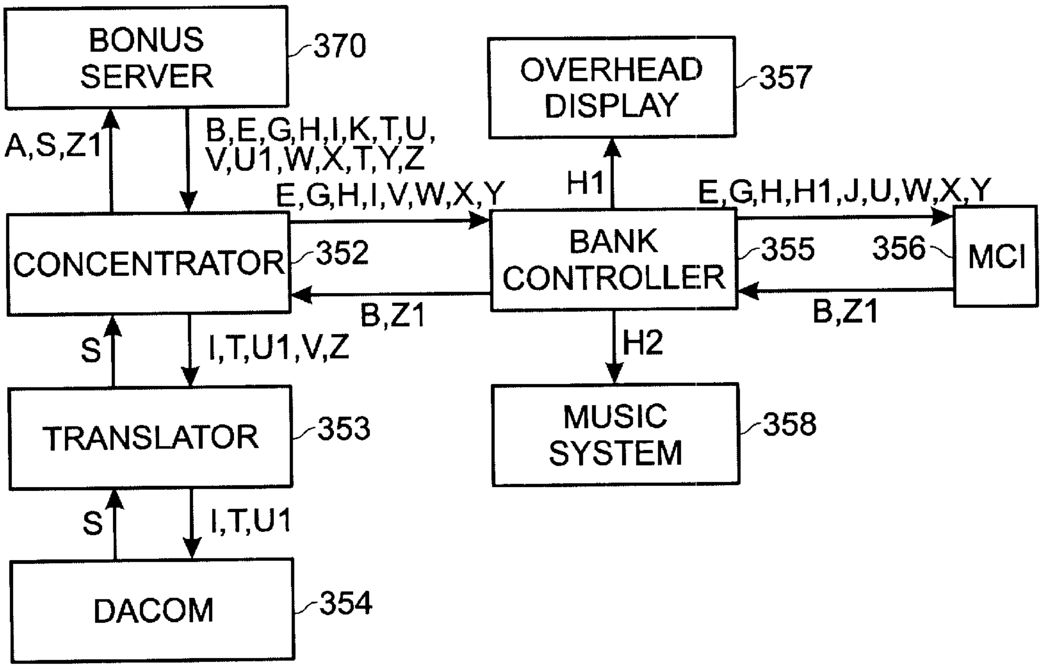
FIG. 24 shows a functional block diagram of the data flow and packet format table for the bonus server of FIG. 5 in conducting the progressive bonus.

FIG. 24 shows a functional block diagram of the data flow and packet format table for the bonus server 351 of FIG. 5 in conducting the progressive bonus 309. Each unidirectional connection in the functional block diagram is labelled with one or more alphabetic characters corresponding to a row in the packet format table. The packet's type, source and destination(s), name and description are set forth in each column of the packet format table.

During normal operation, a meter broadcast packet A is sent from the concentrator 352 to each bonus server 370 every half second in the same manner and with the same content described above for the Cash Bonus in Section III.A.2. Upon receipt of the meter broadcast packet A, the bonus server 370 parses the meter vector and updates the bonus pool 304 and hidden pool 306 with a percentage of each meter reading. In addition, each MCI 356 sends a jackpot packet B to the bonus server 351 indicating the awarding of a jackpot prize by the associated gaming device 300.

When the bonus pool 304 substantially equals the cash bonus 307, a sequence of data packets is exchanged as follows. Prior to cash bonus 307 award, the bonus server 370 broadcasts a consolation setup packets E and G to the group of MCIs 356 participating in the cash bonus 307, including member, non-member and uncarded amounts and a consolation pay message number, and a bonus pay packet H to the selected MCI 356, including the amount, hit sequence number and bonus server ID. In addition, the bonus server 370 sends effects messages H1 and H2 to the bank controller 355 for respectively controlling the overhead display 357 and music system 358.

The DACOM host 354 maintains historical data regarding the bonuses paid. After awarding each progressive bonus 309, the bonus server 370 sends a program payout packet I to the DACOM host 354. Periodically, the DACOM host 354 sends a history query message S to the bonus server 370 and in response the bonus server 370 returns a history response message T. Similarly, each MCI 356 periodically sends a bonus pay complete message U to the bonus server 370 upon the pressing of the bonus button 315 which the bonus server 370 reports to the DACOM host 354 via a DACOM paid bonus packet U1.

Between bonus promotions, each bonus server 370 can be configured using the configuration station 359. The bonus server 370 sends group, display and effects configuration messages V, W and X to the group of MCIs 356. An MCI 356 can be removed from a bonus group with a remove MCI message Y. Finally, every half second, the bonus server 370 receives approximately 1% of the floor map from the MCIs 356 using a floor map message Z and online message Z1.

5. Multiple Jackpot

Figure 25:
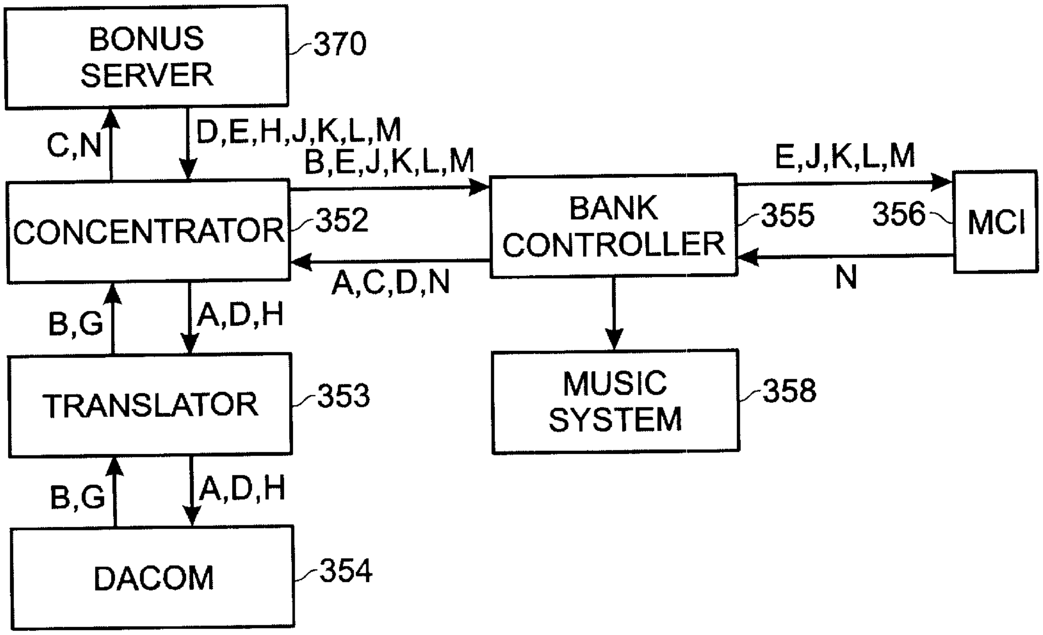
FIG. 25 shows a functional block diagram of the data flow and packet format table for the bonus server of FIG. 5 in conducting the multiple jackpot.

FIG. 25 shows a functional block diagram of the data flow and packet format table for the bonus server 351 of FIG. 5 in conducting the multiple jackpot 310. Each unidirectional connection in the functional block diagram is labelled with one or more alphabetic characters corresponding to a row in the packet format table. The packet's type, source and destination(s), name and description are set forth in each column of the packet format table.

Each multiple jackpot 310 begins with the insertion of a special card into the card reader of a bank controller 355, as described above in Section II.C. In response, the bank controller 355 sends a card in packet A to the DACOM host 354. The DACOM host 354 then confirms the validity of the inserted special card to the bonus controller 355 via a card response packet B. Finally, the bank controller 355 notifies the bonus server 370 of the special card insertion via a card packet C.

Upon commencing the awarding of multiple jackpots 310, the bonus server 370 sends a multiple jackpot time ("MJT") start packet D to the DACOM host 354. The bonus server 370 also sends an MJT group start packet E to the group of MCIs 356 participating in the bonus promotion.

The DACOM host 354 maintains historical data regarding the bonuses paid. Periodically, the DACOM host 354 sends a history query message G to the bonus server 370 and in response the bonus server 370 returns a history response message H.

Between bonus promotions, each bonus server 370 can be configured using the configuration station 359. The bonus server 370 sends group, display and effects configuration messages J, K and L to the group of MCIs 356. An MCI 356 can be removed from a bonus group with a remove MCI message M. Finally, every half second, the bonus server 370 receives approximately 1% of the floor map from the MCIs 356 using a floor map message N.

B. Bonus Server

1. Cash, Mystery and Progressive Bonuses

Figure 26:
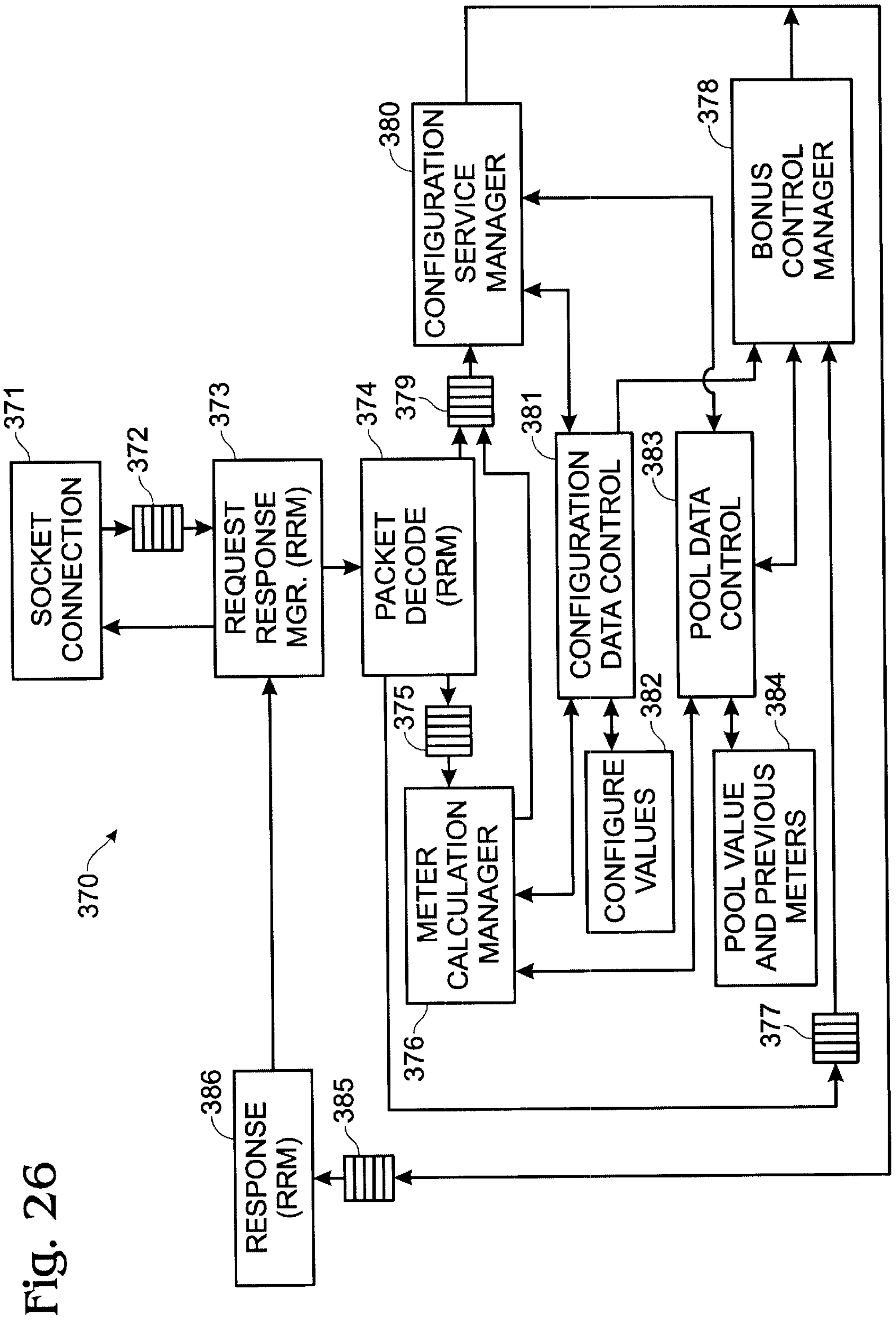
FIG. 26 shows a flow diagram of a method for controlling a bonus promotion according to the present invention.

FIG. 26 shows a method for controlling a bonus promotion according to the present invention using the bonus server 370 of FIG. 5. In the described embodiment, the method is embodied as a computer program implemented in the C programming language, although other computer languages are equally suitable. The bonus server 370 is controlled by the pSOS operating system, an event-driven, real-time operating system.

The control method is organized into four event managers: request response manager (RRM) 373; configuration service manager (CSM) 380; meter calculation manager (MCM) 376; and bonus control manager (BCM) 378. Within the bonus server 370, messages are passed for communicating information and revising status indicators. Each event manager will now be discussed.

RRM 373 controls the interfacing of the bonus server 370 over the network to the remainder of the bonus promotion system 350. RRM 373 sends and receives data packets over the network via a socket connection 371. Incoming data packets are temporarily stored in a message queue 372. If an incoming data packet is a broadcast message or is addressed to the bonus server 370, the data packet is initially placed in the message queue 372 by the socket connection 371 and subsequently forwarded by RRM 373 to a packet decode module 374. Outgoing data packets from CSM 380 and BCM 378 are temporarily stored in a message queue 385. Each outgoing packet is removed from the message queue 385 by a response module 386 and subsequently forwarded by RRM 373 to the socket connection 371 for transmission over the network.

CSM 380 interfaces the bonus server 370 to the DACOM host 354 and configures the gaming devices 300 participating in the bonus server's promotion through their respective MCIs 356. Incoming packets for CSM 380 are stored in a message queue 379. CSM 380 accesses stored configure values 382 for the bonus server 370 through a configuration data control module 381. For interfacing with the DACOM host 354, CSM 380 process history response queries, controls the on-line status of the bonus server 370 and sends a software signature at least once a day. For gaming device 300 configuration, CSM 380 transmits configuration information whenever a new MCI 356 comes on-line and can take any MCI 356 off-line.

BCM 378 detects a bonus condition and notifies the other components in the bonus promotion system 350 prior to, during and after the bonus award. Incoming packets for BCM 378 are stored in a message queue 377. BCM 378 accesses stored configure values 382 for the bonus server 370 through the configuration data control module 381. BCM 378 also accesses the bonus pool 304 and hidden pool 306 values stored in pool value and previous meters 384 through a pool data control module 383.

MCM 376 calculates updated meter values for each participating gaming device 300. Incoming packets for MCM 376 are stored in a message queue 375. MCM 376 accesses stored configure values 382 for the bonus server 370 through the configuration data control module 381. MCM 376 also accesses the bonus pool 304, hidden pool 306 and previous meter values stored in pool value and previous meters 384 through a pool data control module 383. Finally, MCM 376 updates the bonus server's configuration by sending updated configuration values to CSM 380.

Figure 27:
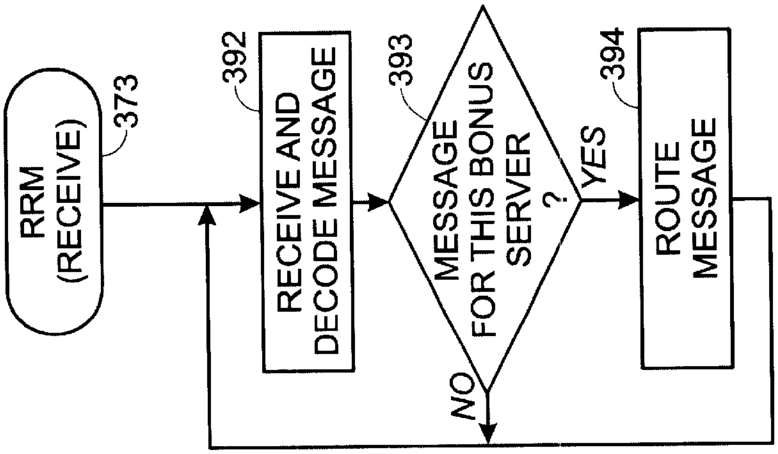
FIG. 27 shows a flow diagram of a routine for controlling a packet receipt by a request response manager in the method shown in FIG. 26.

FIG. 27 shows a flow diagram of a routine for controlling a message receipt from the network using RRM 373 as shown in FIG. 26. The routine identifies and decodes incoming messages and routes them to the appropriate event manager. Blocks 392–394 form an infinite processing loop that is performed whenever a new message (event) is received into the message queue 372. During each iteration of the loop (blocks 392–394), each new message is received and decoded (block 392). If the message is addressed to the particular bonus server 370 (block 393), the message is routed to the appropriate event manager (CSM 380, BCM 378 or MCM 376) (block 394). Otherwise, the message is ignored.

Figure 28:
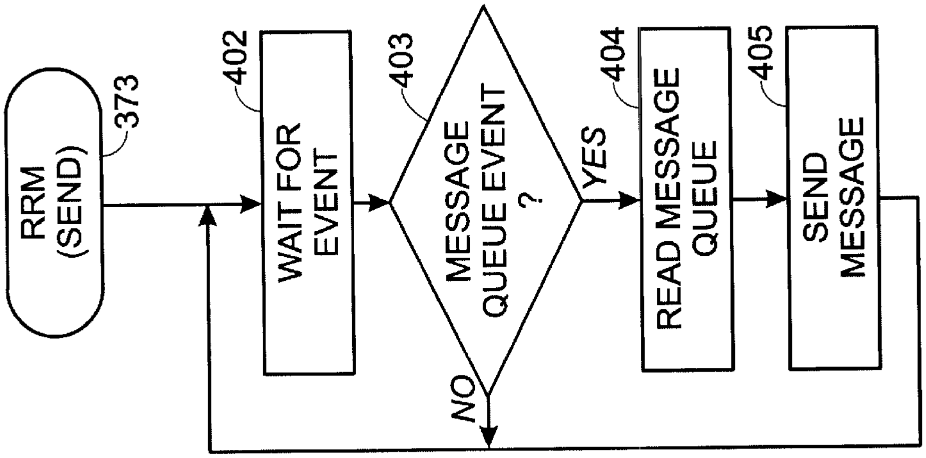
FIG. 28 shows a flow diagram of a routine for controlling a packet dispatch by a request response manager in the method shown in FIG. 26.

FIG. 28 shows a flow diagram of a routine for controlling a message dispatch over the network using the request response manager as shown in FIG. 26. The routine sends outgoing messages from the event managers. Blocks 402–405 form an infinite processing loop that is performed whenever a new message (event) is received into the message queue 385. During each iteration of the loop (blocks 402–405), the routine waits for a message queue event to occur, that is, a new message arriving in the message queue 385 (block 402). If the message queue event is an outgoing message (block 403), the message is read (block 404) and sent over the network through the socket connection 371 (block 405).

Figure 29:
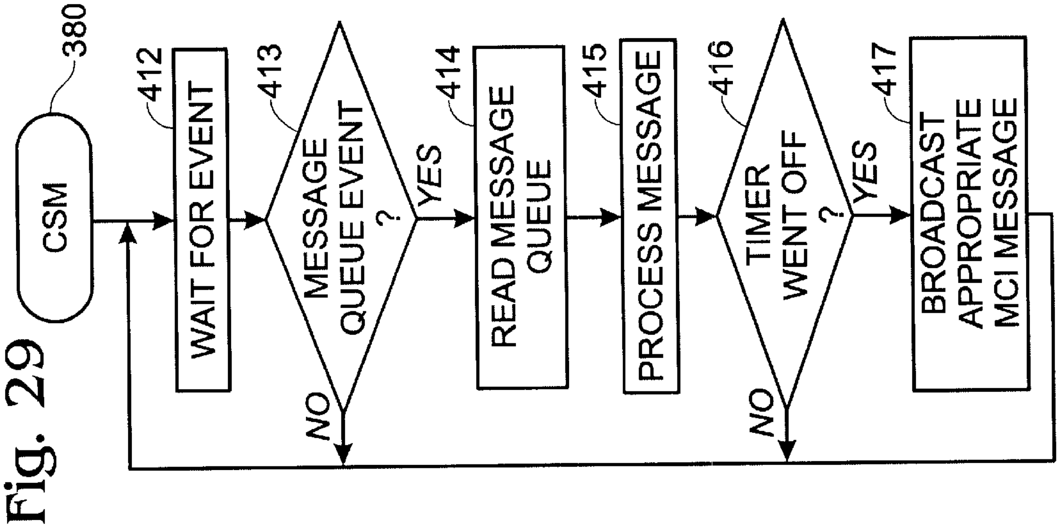
FIG. 29 shows a flow diagram of a routine for controlling a configuration service manager in the method shown in FIG. 26.

FIG. 29 shows a flow diagram of a routine for controlling CSM 380 in the method shown in FIG. 26. The routine sets up the appropriate configuration parameters and environment for the bonus server 370 for controlling the bonus promotion. Blocks 412–417 form an infinite loop that is performed whenever a new message (event) is received into the message queue 379. During each iteration of the loop (blocks 412–417), the routine waits for a message queue event to occur, that is, a new message arriving in the message queue 379 (block 412). If the message queue event is a configuration message (block 413), the routine reads the message queue 379 (block 414) and processes the message (block 415). The types of messages to process include synchronizing the bonus server 370 to a broadcast timestamp, resetting the bonus server 370 and the bank controller 355, updating the meter array by sending the floor map to each of the respective MCIs 356, revising the configure values 382 by adding new gaming devices 300 to the group of participants, deleting game devices 300 from the group of participants, passing messages through to the DACOM host 354 and sending a software signature message to the DACOM host 354 at least once a day upon request. In addition, CSM 380 responds to queries for accounting information from the DACOM host 354. After the message has been processed, if a program timer has gone off (block 416), a message is broadcast to each MCI 356 (block 417), such as an anticipation, winner, consolation, congratulations, celebration or set-up message.

Figure 30:
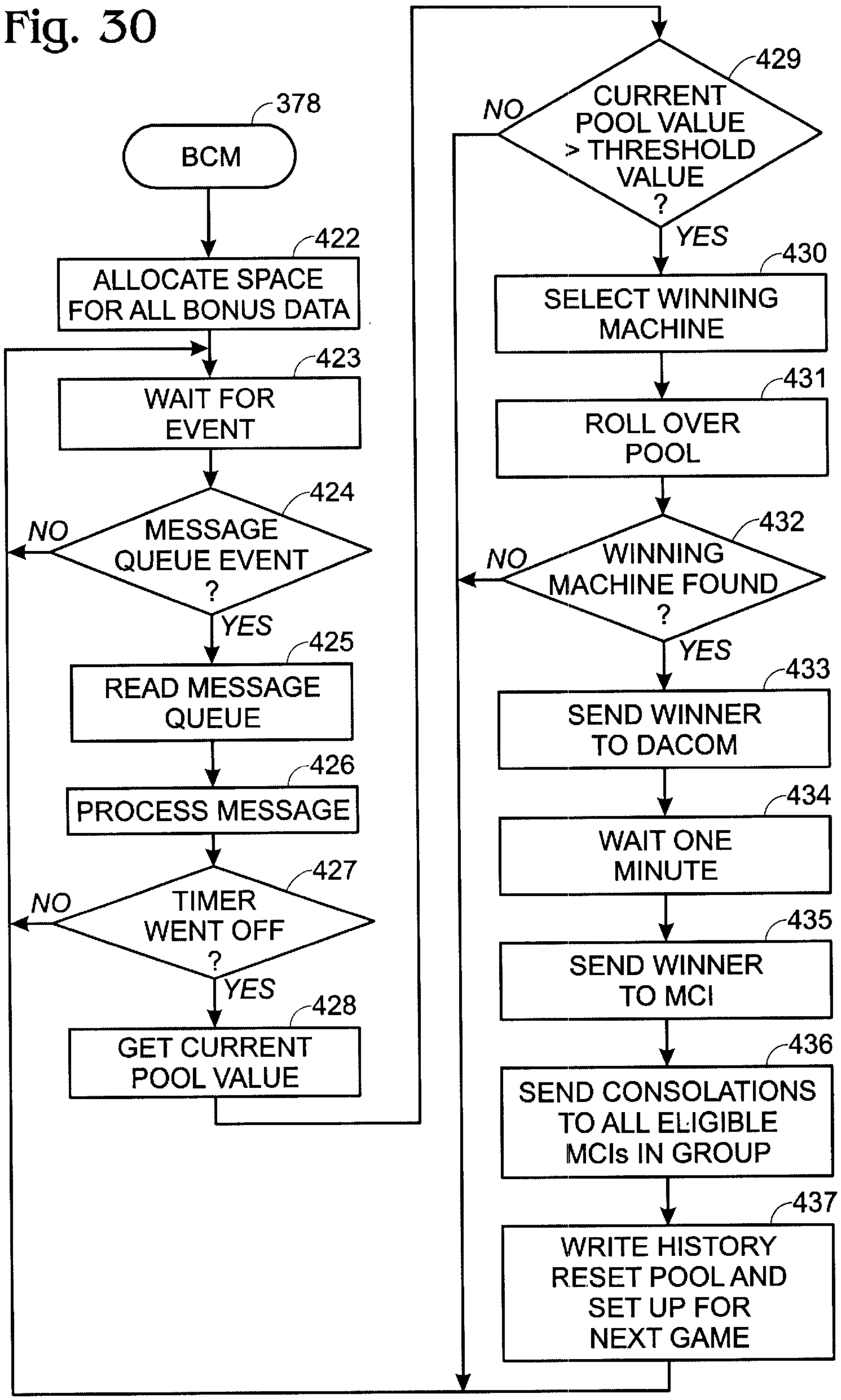
FIG. 30 shows a flow diagram of a routine for controlling a bonus control manager in the method shown in FIG. 26.

FIG. 30 shows a flow diagram of a routine for controlling BCM 378 in the method shown in FIG. 26. The routine determines the occurrence of a bonus event, processes a payout and writes the appropriate history record to the DACOM host 354. Blocks 423–437 form an infinite loop that is performed whenever a new message (event) is received into the message queue 377. Upon system initialization, space is allocated for storing all bonus data (block 422). Space is allocated for all bonus data, including configuration values, anticipation configuration data, winner configuration data, celebration sounds, consolation configuration information, public address celebration configuration information and the bonus definition. During each iteration of the loop (blocks 423–437), the routine waits for a message queue event to occur, that is, a new message arriving in the message queue 377 (block 423). Once the message queue event occurs (block 424), the message is read from the message queue 377 (block 425). The message is then processed (block 426). Processing includes synchronizing the message to a broadcast time, detecting a bonus hit, detecting the payment of a bonus or passing the message through to the DACOM host 354. If the value of the bonus pool 304 exceeds the threshold value (block 429), a winning gaming device 300 ("machine") is selected, preferably at random (block 430). The bonus pool 304 is "rolled over" by taking an accounting of the payment of the bonus and resetting the bonus pool to a new value (block 431). Once a winning machine has been found (block 432), the identifier for the gaming device 300 is sent to the DACOM host 354 (block 433). The bonus server 351 waits approximately one minute (block 434) before sending the winner message to the MCI 356 for the winning machine (block 435). Consolation prizes, if applicable, are awarded to eligible MCIs 356 in the group of participating gaming devices 300 (block 436). Finally, the history for the awarding of the bonus is updated, the bonus pool 304 and hidden pool 306 are reset and the bonus server 370 set for the next game (block 437).

Figure 31:
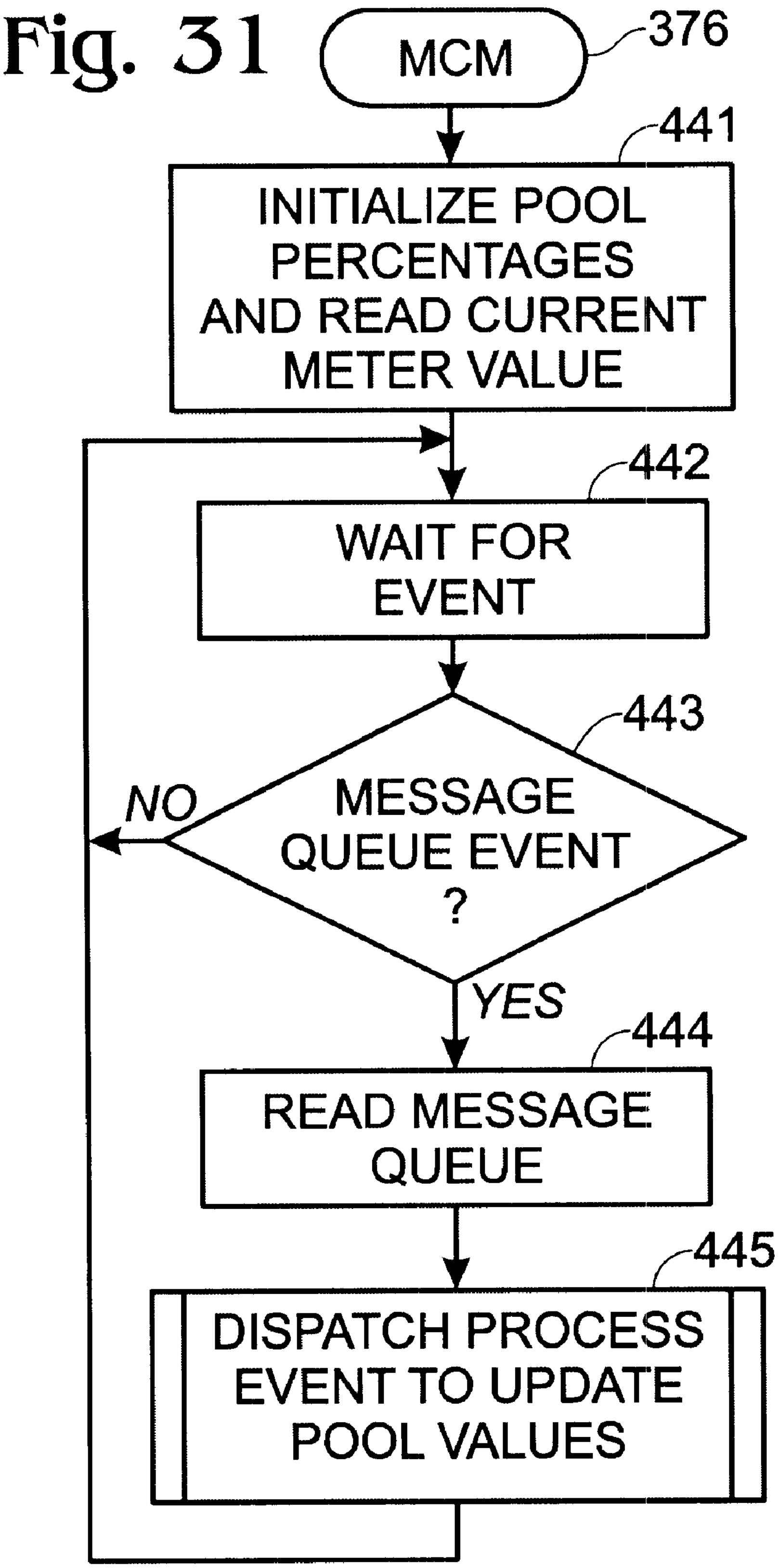
FIG. 31 shows a flow diagram of a routine for controlling a meter calculation manager in the method shown in FIG. 26.

FIG. 31 shows a flow diagram of a routine for controlling MCM 376 in the method shown in FIG. 26. The routine accumulate a percentages of the coin-in for each of the participating gaming devices 300 and adds the coin-in percentage to the appropriate pool. Blocks 442–445 form an infinite loop that is performed whenever a new message (event) is received into the message queue 375. Upon system initialization, the bonus pool 304 and hidden pool 306 are initialized and the current meter values for each participating gaming device 300 are read (block 441). During each iteration of the loop (blocks 442–445), the routine waits for a message queue event to occur, that is, a new message arriving in the message queue 375 (block 442). Once the message queue event occurs (block 443), the message is read from the message queue 375 (block 444) and a event for process an update of the pool values is dispatched (block 445), is further described below with reference to FIG. 32.

Figure 32A:
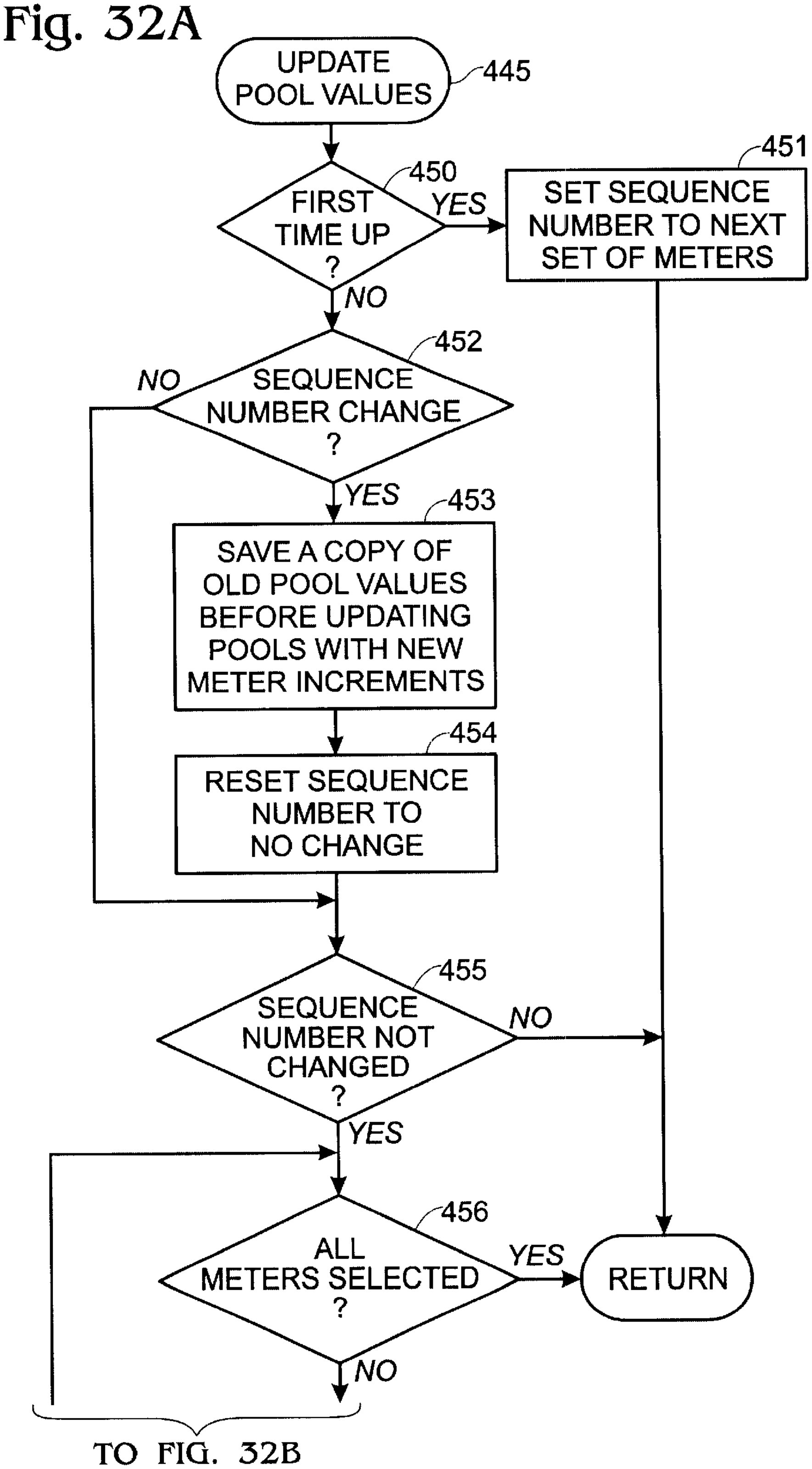
FIG. 32 shows a flow diagram of a routine for updating pool values in the routine shown in FIG. 31.
Figure 32B:
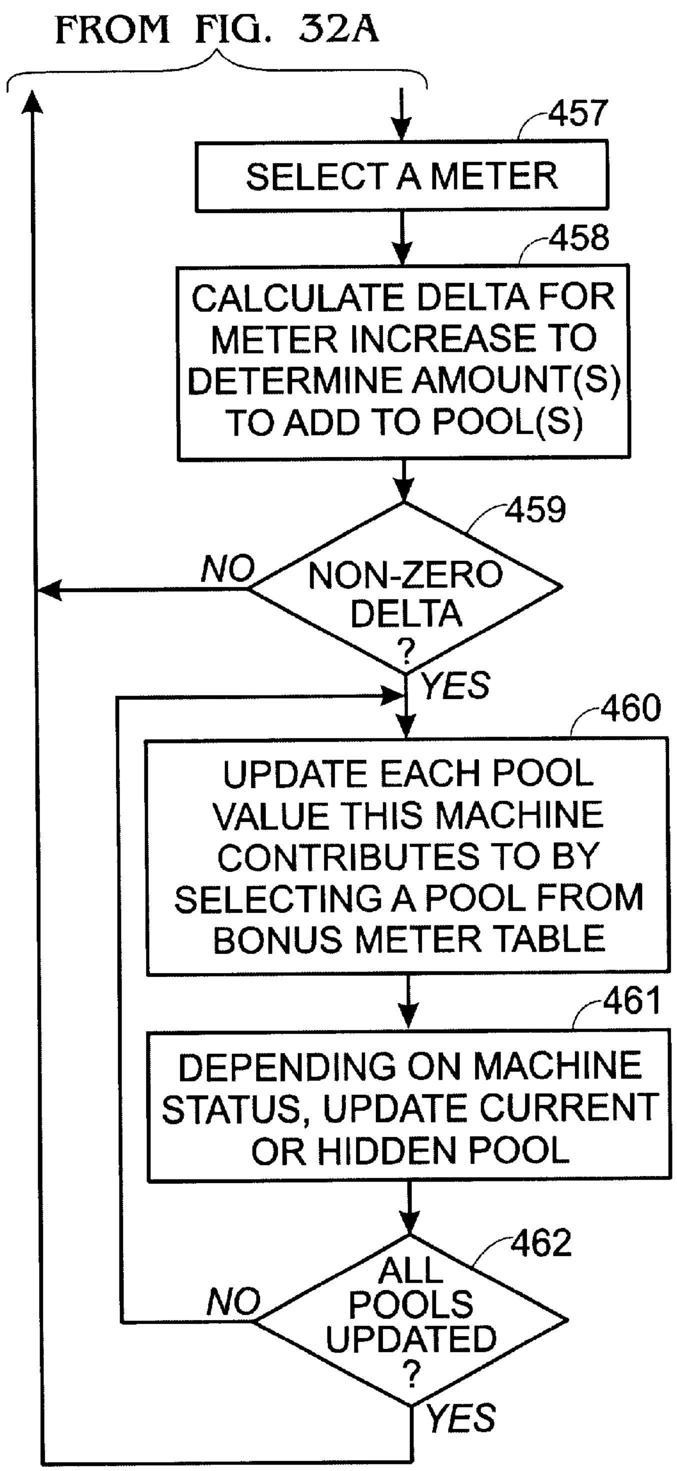

FIGS. 32A and 32B show a flow diagram of the routine for updating pool values in the routine shown in FIG. 31. If this is the first time that the bonus server 370 is receiving a set of meter values (block 450), the sequence number used to track the set of meter values is set to the next set of meter values (block 451) and the routine returns. Otherwise, if this is not the first time up (block 450), the sequence number is checked to see whether it has changed since the last meter broadcast message was received (block 452). This step is necessary because messages are sometimes retransmitted and duplicate messages bearing the same sequence number are possible. Thus, if the sequence number has changed (block 452), a copy of the old pool values for the bonus pool 304 and hidden pool 306 are saved before the pools are updated with the new meter increments (block 453). The sequence number is reset to reflect no change (block 454) to enable the next segment of the routine (blocks 456–462) to be executed.

If the sequence number has not changed (block 455), a loop to iteratively process each of the meters (blocks 456–462) is entered. Once all the meters have been selected (block 456) the routine returns. Otherwise, meters still remain to be selected (block 456) and a meter is selected (block 457). A delta value for the increase in each gaming device 300 meter is determined for each bonus pool 304 and hidden pool 306 in which the gaming device 300 participates (block 458). If there has been a change in the meter value, that is, the delta is non zero (block 459), each pool is selected using a bonus meter table stored in the memory space for pool value and previous meters 384 (block 460). Finally, depending on the status of the gaming device 300, either the bonus pool 304 or hidden pool 306 is updated (block 461). Ordinarily, a percentage of the coin-in for a particular gaming device 300 is added to the appropriate pool. However, if the bonus promotion uses the hidden pool 306 to accumulate a second percentage of the coin-in, both the bonus pool 304 and hidden pool 306 are updated. In the special case of a new MCI 356 coming on-line, a percentage of any increase of coin-in between the current meter reading and the last recorded meter reading is added to the hidden pool 306. Once all pools have been updated (block 462), the next meter is selected and the processing loop (blocks 456–462) is repeated.

2. Multiple Jackpot

Each multiple jackpot 310 is activated for a particular bank of gaming devices 300 (shown in FIG. 1) by sliding a special award card into the card reader attached to the bank controller 355, as described above in Section II.C. for that bank of gaming devices. Several types of award cards are available. Each card only contains an ID number which indicates the particular multiple jackpot 310 award being made. The actual award parameters are stored in a dedicated bonus server 370 (shown in FIG. 25.

In the described embodiment, multiple jackpot 310 awards are always paid at 2×, 3×, 4×, 5×, 6×, 7×, 8× or 9× their normal jackpot values. Each multiple jackpot 310 award is programmable in two ways: (1) award duration; and (2) minimum and maximum jackpots required for multiplied payout eligibility. In addition, participation can be dependent upon player eligibility, such as described above in Section I.C., and type of card 312, such as uncarded, numbered (anonymous) or named. Up to ten award cards can be defined at any one time using the following parameters stored in the dedicated bonus server 370:

| FOR all CARDS, regardless of ID | |
|---|---|
| MIN TIME | Minimum time 00 to 999 minutes between awards |

| FOR each CARD X, where X is from 1 to 10 | |
|---|---|
| CARD ID | ID of card assigned to award X |
| UNCARDED | |
| MULTIPLIER | 2–9 |
| DURATION | 00–99 seconds |
| MINIMUM | Minimum jackpot value multiplied |
| MAXIMUM | Maximum jackpot value multiplied |
| MESSAGE | Actions of display assembly 210, ABI 122, bonus button 315 and fluorescent flasher 22 (shown in FIG. 7) |
| NUMBERED | |
| MULTIPLIER | 2–9 |
| DURATION | 00–99 seconds |
| MINIMUM | Minimum jackpot value multiplied |
| MAXIMUM | Maximum jackpot value multiplied |
| MESSAGE | Actions of display assembly 210, ABI 122, bonus button 315 and fluorescent flasher 22 |

-continued

| FOR each CARD X, where X is from 1 to 10 | |
|---|---|
| NAMED | |
| MULTIPLIER | 2–9 |
| DURATION | 00–99 seconds |
| MINIMUM | Minimum jackpot value multiplied |
| MAXIMUM | Maximum jackpot value multiplied |
| MESSAGE | Actions of display assembly 210, ABI 122, bonus button 315 and fluorescent flasher 22 |
| CD_ROM | |
| TRACK# | Sound track to be played |
| DURATION | Sound track duration |
| REPEAT | Number of times to repeat sound track |
| VOLUME | 00 to 100% |

All bank controllers 355 (shown in FIG. 5) participate in the multiple jackpot 310, although the casino can exclude a bank controller by removing or disconnecting the card reader attached to that bank controller 355. The dedicated bonus server 370 regularly transmits all award card IDs and values to all bank controllers 355 as broadcast messages about every minute. No acknowledgment messages are sent. Each bank controller 355 echoes the values, except music system 358 settings, to all attached gaming devices 300.

The card readers attached to each bank controller 355 are identical to those used in each gaming device 300. When no award card is inserted, the bezels of these specially connected card readers are turned off. When an invalid award card insertion occurs, the bezel flashes red.

Upon the valid insertion of an award card, the bank controller 355 searches its memory for a matching card ID. If none is found, the bezel flashes orange and no multiple jackpot 310 award occurs. Otherwise, if the card ID is found, the bank controller 355 requests permission to pay from the dedicated bonus server 370. In turn, the dedicated bonus server 370 examines a table in which it has recorded all bank controller 355 requests. The table is ordered by bank controller ID. If the required minimum amount of time between multiple jackpot 310 awards sessions has elapsed, a permission signal is returned to the requesting bank controller 355. Otherwise, the bank controller 355 is sent a denial message. If the multiple jackpot 310 request is denied, the bezel on the special card reader turns a steady orange for indicating that permission was denied.

If permission is granted, the bank controller 355 sends an acknowledgement to the dedicated bonus server 370 and the bezel on the special card reader turns a steady green. In all cases, the bezel color remains until the card is removed.

Once the bank controller 355 acknowledgement is received, a log of the time and bonus controller ID is made in the table. This log is reported to the DACOM host 354 for tracking the number of multiple jackpot 310 awards made each day. However, no information regarding the actual awards paid is recorded. Rather, the individual amounts paid increment each gaming device's bonus meter which report the sum of all bonus payments.

During the multiple jackpot 310, the bank controller 355 sends an activation signal to each of the gaming devices 300 in the bank, including the card ID. When each gaming device 300 receives the activation signal, it tests eligibility and card type and implements the corresponding multiple jackpot 310 bonus according to the player card type, that is, uncarded, numbered or named, and player eligibility status. The bank controller simultaneously plays the specified CD-ROM sound track on the music system 358.

3. Player Points

In the described embodiment, player points are calculated by the MCI 356 (shown in FIG. 7) associated with each gaming device 300 for the welcome back 316, match play 317 and personal progressive 318 bonuses. When a player card 312 is inserted into the card reader 311 of the gaming device 300, the MCI 356 sends the card ID to the DACOM host 354 which responds with that player's record, including player name, various points data, $Turnover/Point and related information.

During each game, the following information is obtained by the MCI 356 from the DACOM host 354 and used to calculate the player points:

| | |
|---|---|
| NAME_FIRST | Player's first name (16 bytes) |
| NAME_LAST | Player's last name (16 bytes) |
| CROWN_POINTS | Total points (4 bytes) |
| SLOT_POINTS | Gaming device 300 earned points (4 bytes) |
| $TURNOVER_POINT | Dollars of player per point increase (2 bytes) |

If the inserted card 312 has an invalid read, the card reader bezel 314 displays a bright flashing red and a re-insert message is displayed on the display assembly 210. If possible, the ABI 122 also beeps three times to indicate an error condition.

When the inserted card 312 is properly read and a valid player record returned from the DACOM host 354, the MCI 356 tests whether the card 312 is the same as was last card 312 inserted into that card reader 311 and that no game play has transpired since the card 312 was last removed. If the card 312 is the same and no interim game play has occurred, the MCI 356 uses the variables it already stores from the last game session. Otherwise, the MCI 356 requests a player record from the DACOM host 354 and clears all point balances and related information remaining from any previous game session. If the MCI 356 receives an invalid player record from the DACOM host 354, the card reader bezel 314 displays a fast flashing red and requests a re-insertion of the card 312.

If the new player record is valid or if the previous player record is being used, the MCI 356 turns the card reader bezel 314 a flashing orange to indicate player card acceptance. The display assembly 210 displays a welcome message which may include the player name and points total using the CROWN_POINTS+POINTS_EARNED value.

As game play continues, the MCI 356 increments the POINTS_EARNED total by one count each time play activity equal to $TURNOVER_POINT occurs. This process continues until the card 312 is removed and a summary player record of POINTS_EARNED is returned to the DACOM host 354.

4. Welcome Back Bonus a. Overview

The welcome back 316 bonus is administered by each MCI 356 (shown in FIG. 7) using information obtained from the DACOM host 354 and a dedicated bonus server 351, known as a "Player Server" (PS). The PS 351 is responsible for calculating the time-based WB_TODAY flag (defined below). The PS 351 is configured for determining the appropriate time to begin each welcome back 315 bonus session. At the same time each day, the PS 351 simply increments WB_TODAY by a value of one. In the described embodiment, the WB_TODAY flag is a two-byte unsigned integer. It is initialized at startup to a value of one and can be incremented to 65,535, thereby requiring about 179 years to roll over. The PS 351 creates the WB_MSG1 flag with the time of rollover embedded within it.

The DACOM host 354 stores parameter information specific to individual players, including the following:

| | |
|---|---|
| WB__ENABLE | Determines whether participation in a welcome back bonus 316 is allowed (1 bit) |
| WB__POINT__NEXT | Points required until next welcome back bonus 316 award (2 bytes) |
| WB__BALANCE | Welcome back bonus 316 award balance remaining (2 bytes) |
| WB__DAY__EARNED | Day number of award earned (2 bytes) |

The dedicated bonus server 351 provides award information common to all players, including the following:

| | |
|---|---|
| WB__TODAY | Current Day Number (2 bytes) |
| WB__AWARD | Welcome back bonus 316 award value (2 bytes) |
| WB__POINTS | Points per welcome back bonus 316 (2 bytes) |
| WB__HOUR | Hour of day welcome back bonus 316 becomes effective (6 bytes, e.g., "6:00 AM") |
| WB__UPDATE | Point interval for update messages (2 bytes) |

The following message formats for the display assembly 210, fluorescent flasher 22 (shown in FIG. 7) and ABI 122 are used:

| | |
|---|---|
| WB__MSG1 | Welcome back bonus 316 earned but not time qualified message |
| WB__MSG2 | Welcome back bonus 316 active message |
| WB__MSG3 | Points required until next welcome back bonus 316 award message |

b. Functional Operation

The PS 351 functions in a manner similar to the other bonus servers 351. All assigned gaming devices 300 are enrolled in a group. Each period, the PS 351 broadcasts a "training" sequence containing all values and messages required to administer a welcome back bonus 316 session. Each MCI 356 regularly issues a "group assignment" message which the PS 351 uses to confirm group enrollments.

c. Card Insertion Event

When a card 312 is inserted into the card reader 311, the MCI 356 sends a message containing the card ID to the DACOM host 354. In response, the DACOM host 354 sends the player record storing data for the player. The MCI 356 displays the programmed welcome message described above, including points balance, while examining the player record for welcome back bonus 316 status. Based on that status, the MCI 356 performs the following steps.

(1) If WB__ENABLE=0, welcome back bonus 316 participation is not allowed.

(2) Existing Welcome Back Bonus 316 Balance: The MCI 356 tests whether the welcome back bonus 316 was active in a prior session. If WB__BALANCE>0, the welcome back bonus 316 is already active and the MCI 356 proceeds accordingly.

(3) Make New Award: The MCI 356 tests whether an award has just become active. WB__DAY__EARNED contains the day number on which the welcome back bonus 316 award was earned. If WB__DAY__EARNED=0, no award has been earned. Otherwise, if WB__DAY__EARNED>0, WB__DAY__EARNED is tested for whether it is less than the current day, WB__TODAY. If (WB__DAY__EARNED>0 AND WB__DAY__EARNED<WB__TODAY), the welcome back bonus 316 is old enough and therefore immediately available. The MCI 356 then sets the following:

WB__BALANCE:=WB__AWARD

WB__POINT__NEXT:=0 and proceeds to process the welcome back bonus 316 award.

(4) Not Time Qualified: If WB__DAY__EARNED>0 and WB__DAY__EARNED=>WB__TODAY, the welcome back bonus 316 is not yet time qualified. The MCI 356 causes the WB__MSG1 message to appear and proceeds with normal operation.

d. Operation During Play (1) Ordinarily, if WB__ENABLE=0, welcome back bonus 316 participation is not allowed. Otherwise, the following activities are performed.

(2) No Welcome Back Bonus 316 Active: If no welcome back bonus 316 is active and conditions have not been met to earn a new award, the MCI 356 simply monitors game play and calculates the next award. The welcome back bonus 316 portion is calculated as follows:

(a) Each time another Player Point is awarded by the MCI to the player account, the MCI also increments WB__POINT__NEXT. After each point increment:

(i) If WB__DATE__EARNED>0, normal operation proceeds. Do not add points to WB__POINT__NEXT or display any other welcome back bonus 316 messages.

(ii) If WB__DATE__EARNED=0, RESULT=WB__POINTS−WB__POINT__NEXT (a) If RESULT<=0, enough points have been earned for a welcome back bonus 316. The MCI 356 causes the WB__MSG1 message to appear and sets WB__DATE__EARNED:=WB__TODAY to set the time for the award.

(b) If RESULT>0, not enough points have been earned. The MCI 356 must check whether it is time for a message update telling the player how close to an award he is. The MCI 356 divides the result of WB__POINTS−WB__POINT__NEXT by the value in WB__UPDATE. If the result is a whole integer, the MCI 356 causes the WB__MSG3 message to appear.

Welcome Back Bonus Active (1) If a welcome back bonus 316 is ACTIVE, the MCI 356 places the game into welcome back bonus 316 mode. The WB__MSG2 message is constantly displayed on the display assembly 210. Each time a wager 301 is made, half of the wager amount is subtracted from WB__BALANCE and added to the internal EGM credit meter. WB__BALANCE is displayed within the WB__MSG2 message and is constantly updated. WB__POINT__NEXT is also incremented after every point earned.

(2) If WB__BALANCE drops to zero, the welcome back bonus 316 has been used up. The WB__MSG3 message disappears and normal operation resumes.

e. Card Removal Event

When the card 312 is removed from the card reader 311, the MCI 356 sends a removal event message along with current values of WB__POINT__NEXT, WB__BALANCE and WB__DAY__EARNED to the DACOM host 355 for storage in the associated player record.

5. Match Play Bonus

Match play 317 begins when a qualified player, with a valid card 312 inserted in a card reader 311, pushes the bonus button 315 to enter Match Play mode. The internal EGM credit meter records each match play 317 value won. The DACOM host 354 stores the following parameters:

MATCH_PLAY_ENABLE Player qualified for Match Play (1 bit)

SLOT_POINTS Points convertible to Match Play value

A dedicated bonus server 351, known as a "Player Server" (PS), maintains message formats and other data as follows:

| | |
|---|---|
| MATCH_MSG1 | Match Play message for the display assembly 210, fluorescent flasher 22 (shown in FIG. 7) and ABI 122 |
| MATCH_CONVERSION | Multiplier to convert Slot Points to Match Play value (4 bytes $0.9999) |

Ordinarily, each participating MCI 356 calculates and displays player points. However, if the player presses the bonus button 315 and if the MATCH_PLAY_ENABLE flag is set, the MCI 356 enters Match Play mode. The decimal value in MATCH_CONVERSION is used to convert Slot Points into Match Play value. For example, if each Slot Point is worth one cent, MATCH_CONVERSION would contain 0100.

As Match Play value is consumed, the Match Play balance decreases. When the player ends a Match Play session or removes his card 312, the MCI 356 reports the net change in point balance, that is, points earned less points used in Match Play, to the DACOM host 354.

6. Personal Progressive Bonus a. Overview

Each personal progressive bonus 318 is assigned to a single player account and differs from the standard progressive bonus 309 in that the bonus is assigned to individual player accounts. Only game play on a given player account will increment the personal progressive bonus 318 award and only that given player account can win the award.

A dedicated bonus server 351 is used. The DACOM host 354 stores parameter information concerning the account's current value, "lucky number" and interim values when the player has no active session in process. The DACOM host 354 takes no active role in the implementation of the personal progressive bonus 318. The DACOM host 354 stores the following parameters:

| | |
|---|---|
| MMM_ENABLE | Determines whether personal progressive bonus 318 participation is allowed (1 bit) |
| MMM_POOL | Current personal progressive bonus 318 pool value (4 bytes) |
| MMM_LUCKY | "Lucky number" at which the pool award is won (4 bytes) |

The dedicated bonus server 351 maintains the following message formats and related data:

| | |
|---|---|
| MMM_MSG1 | Current pool value message for the display assembly 210, fluorescent flasher 22 (shown in FIG. 7), ABI 122 and bonus button 315 |
| MMM_MSG2 | Winner Message for the display assembly 210, fluorescent flasher 22, ABI 122 and bonus button 315 |
| MMM_NOW | Current lucky number value to assign (4 bytes) |
| MMM_BASE | Starting personal progressive bonus 318 value (4 bytes) |
| MMM_INC | Personal progressive bonus 318 award increment rate (4 bytes) |

b. Functional Operation

The bonus server 351 dedicated to the personal progressive bonus 318 functions in a manner similar to the other bonus servers 351. All assigned gaming devices 300 are enrolled in a group. Each period, the dedicated bonus server 351 broadcasts a "training" sequence containing all values and messages required to administer a welcome back bonus 316 session. Each MCI 356 regularly issues a "group assignment" message which the PS 351 uses to confirm group enrollments.

At ten second intervals, the dedicated bonus server 351 calculates a new "lucky number" MMM_LUCKY and broadcasts this value to the group of enrolled gaming devices 300 at half second intervals. Any MCI 356 for an associated gaming device 300 which is initializing an account or has just processed a personal progressive bonus 318 award will use the lucky number as the next lucky number for that account. The MCI 356 also sets the current award value to the base award value MMM_BASE just broadcast.

After each game has completed, the MCI 356 increments the personal progressive bonus 318 pool value MMM_POOL based on play amount and increment rate MMM_INC. If the new pool value equals the lucky number value after the personal progressive 318 award has been made, the pool is reset and a new lucky number chosen. The process is then repeated.

c. Card Insertion Event

When a card 312 is inserted into the card reader 311, the MCI 356 sends a message containing the card ID to the DACOM host 354. In response, the DACOM host 354 sends the player record storing data for the player. The MCI 356 displays the programmed welcome message described above, including points balance, while examining the player record for welcome back bonus 316 status. Based on that status, the MCI 356 performs the following steps.

(1) If MMM_ENABLE=0, personal progressive bonus 318 participation is not allowed.

(2) If MMM_LUCKY=0, the MCI 356 tests whether the personal progressive bonus 318 has just become active. The DACOM host 354 initializes MMM_LUCKY=0 at enrollment. If MMM_LUCKY is still zero, the personal progressive bonus 318 has never been activated. The MCI 356 sets MMM_POOL:=MMM_BASE and MMM_LUCKY:=MMM_NOW.

d. Operation During Play (1) Ordinarily, if MMM_ENABLE=0, personal progressive bonus 318 participation is not allowed. Otherwise, the following activities are performed by the MCI 356:

(a) MMM_VALUE:=MMM_VALUE+(MMM_INC*$AMOUNT WAGERED)

(b) If MMM_VALUE=>MMM_LUCKY, a personal progressive bonus 318 award is made as described below.

(c) If MMM_VALUE-INT(MMM_VALUE)=0, MMM_MSG1 is displayed.

MMM Award Made

Whenever a personal progressive bonus 318 award is made, the MMM_MSG2 message is displayed. Also, the amount in MMM_VALUE is paid to the game device's credit meter and normal play resumes. Finally, the MCI 356 starts a new pool in the manner described above.

e. Card Removal Event

When the card 312 is removed from the card reader 311, the MCI 356 sends a removal event message along with current values of MMM_VALUE and MMM_LUCKY to the DACOM host 355 for storage in the associated player record.

C. Bank Controller

More detailed consideration will now be given to the operation of a bank controller 355 (shown in FIG. 5). Referring to FIG. 6, the bank controller 355 is controlled by CPU 500 which runs a real-time operating system such as pSOS. A bootstrap portion of the operating system, which includes a network operation kernel, is stored in ROM device 506. When the bank controller starts up, the CPU executes the network kernel from ROM. The kernel establishes communication with the concentrator 352 of FIG. 5 which downloads the remainder of the operating system to the bank controller. The operating system is then stored in, and executed from, RAM device 504.

Alternatively, the bootstrap code stored in ROM can be programmed to retrieve an operating system from a CD-ROM drive through the IDE interface 536. This is advantageous for operating a bank controller as a stand-alone unit.

The sound chip 522 plays sound sequences that are stored on the CD-ROM drive. The CD-ROM can generally store about 120 minutes of high-fidelity monophonic sound which the sound chip plays back as a 16-bit 44.1 KHz audio signal.

During normal operation, the bank controller routes communications to and from the MCIs 356 and concentrator 352 of FIG. 5. The bank controller monitors the communication status of all attached MCIs 356 and determines when one of these units goes off line. It also determines when a machine communication interface (MCI) has come back on-line and whether it needs to have updated code down loaded to it as described below with respect to the operation of the MCI.

After a bank controller successfully downloads a new version of code to an MCI, it sends of message to the host telling it that an MCI has come on-line. The host then issues a message telling the bank controller to get a signature or ID number from the MCI. The bank controller retrieves the ID number from the MCI and forward it to the host through the concentrator. The host then checks the MCI ID and sends an MCI ID status message. If the MCI fails the check the bank controller sends a message to the host telling it that the MCI is off-line. This message is intercepted and passed along by the concentrator which marks the MCI as off-line and prevents any further communication with the bonus servers. Communications with the bonus servers resumes after the MCI has successfully passed the ID check and the concentrator marks the MCI as on-line.

D. Machine Communication Interface

More detailed consideration will now be given to the operation of a Machine Communication Interface (MCI). The following description would enable one skilled in the art to implement communications between the Bank Controller and the MCI in accordance with the present invention.

1. Memory Structure

Figure 12:
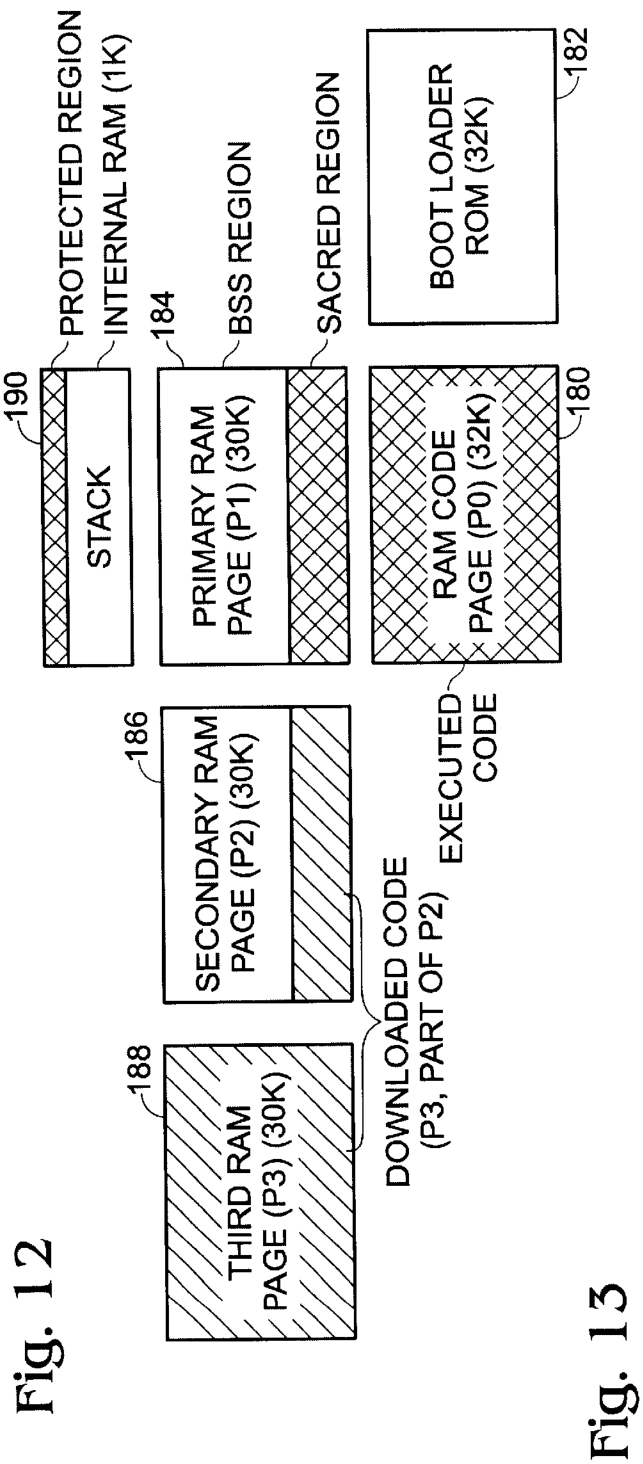
FIG. 12 is a simplified diagram of the internal memory structure of an embodiment of a machine communication interface in accordance with the present invention.

FIG. 12 is a simplified diagram of the MCI's internal memory structure showing how the different memory areas are paged. A RAM code page (P0) and a ROM page 182 are referred to as lower pages, while RAM pages 184, 186, and 188 (P1, P2, and P3) are referred to as upper pages. Only one of the three upper RAM pages can be accessed at a time.

A boot loader program is contained in ROM 182 and is preprogrammed during factory assembly. The RAM code page P0 contains the actual executable MCI code, while the primary RAM page P1 contains most of the MCI's variable and data space. The secondary and third RAM pages P2 and P3 are used for miscellaneous memory and storage of infrequently accessed data. Page P3 and part of page P2 are also used to temporarily store downloaded code when it is received from the bank controller. After validation, the downloaded code is moved to page P0. All RAM is battery backed with a super capacitor circuit.

Page P1 is divided into two regions: a SACRED region (in the lower part of the page) which contains variables that rely on battery back-up and are not reinitialized during startup; and a BSS region which is initialized to zero after every software reset.

An internal RAM section 190 is the only memory region that is immune to paging. The internal RAM is reserved for the STACK except for a PROTECTED region (8 bytes at the top of internal RAM) which contains variables that must be available regardless of which page is active. To conserve the STACK space, the MCI program favors global variables, declares locals as static, and limits the number of arguments to and from functions. This also improves the execution speed.

Referring to FIG. 8, whenever the MCI resets (e.g., power-up, watchdog reset, etc.) the input and output lines on MCI processor 32 are initialized to a high impedance state. This causes the RAM/ROM line to be pulled to a high logic level by a pull-up resistor in the memory decode logic circuit 44. This, in turn, causes the ROM chip 40 to be selected as the lower memory page.

2. Boot Loader Operation

After a reset, the processor begins executing the boot loader code in ROM. The boot loader code first checks and initializes the hardware. Digital I/O lines that are used for output are set to an appropriate logic level and configured as outputs. The boot loader code then determines if the code located in the RAM code page is valid by calculating a software check figure (SCF) between a start address and an end address specified at predefined memory locations. The calculated SCF is then compared to an SCF stored at another predetermined memory location. If the two SCFs do not match, the boot loader retains control of the MCI until proper code has been downloaded from the bank controller. No gaming device or card reader communication takes place during that time. If the two SCFs match, this only indicates that the software currently in the RAM code area is not corrupt—it does not guaranty, however, that it is the proper version of the software.

After verifying the integrity of the RAM code, the boot loader next attempts to confirm that the software in the RAM code is the proper version. To accomplish this, it attempts to establish communication with the bank controller to receive the Software Identification Number (SID) of the software it should be running. If the SID matches the SID of the software currently in RAM, the Boot Loader executes the software in RAM, otherwise it downloads new code (using a method described below).

If the bank controller is down, the boot loader times out in its attempt to establish communication, and runs the software currently in its RAM (as long as the SCF checks out). The boot loader passes a parameter to the software in RAM, indicating that it was started without verification of being the proper revision. There is a "short" type of time out when no communication is detected at all, and a "long" type of time out when the MCI is not being addressed by a bank controller, but still detects some kind of traffic on the line.

When the boot loader decides to switch to the software in RAM, a small section of code is copied into the high end of RAM and then executed. The PAGE SELECT X and PAGE SELECT Y lines are set to the appropriate logic levels to select RAM page P0. The RAM/ROM output line on the processor (shown in FIG. 8) is then pulled to a low logic level, thereby switching from ROM to RAM and causing RAM page P0 to be mapped to the memory space where the ROM used to be. Jumping to the small section of code at the high end of RAM allows the pages to be switched during a fetch-execute cycle.

3. Communication With Bank Controller

Referring to FIG. 7, the MCI 356 communicates with the bank controller 355 via a multidrop opto-isolated serial link 30 at 19.2 Kbaud and full duplex. The four wire cable between the MCI and the bank controller is commonly referred to as an "On-Line cable" or OL cable. The OL communication link carries all communications between the MCI and the rest of the system (e.g., bank controller, concentrator and bonus servers). The OL link 30 allows the MCI to report data needed for bonusing to the bonus servers, report the meters to be cached for the front-end host system (DACOM 6000) via the concentrator, report gaming device, bonusing, and card reader events, set up all MCI and bonusing parameters, and download new MCI code.

The bank controller is the master of the OL communication link, and the MCI does not communicate unless polled. There is never more than one outstanding poll per MCI. This means that the bank controller waits for a poll answer (or a reasonable time out) before polling the MCI again. However, the bank controller sends broadcasts (such as current participation jackpot values) at any time.

Each MCI in the system is uniquely identified by a 32 bit Unique ID preprogrammed in a unique ID chip 272 which is attached to MCI wiring harness with flying leads. However, using the unique ID for addressing purposes is inefficient, so instead, the controller dynamically assigns a one byte "nickname" to each MCI through the following "binary search" process:

(1) The bank controller issues a SEARCH poll containing a range of unique IDs. All MCIs whose unique ID are within that range answer with their unique ID.

(2) If several devices answered the SEARCH poll (i.e., if several MCIs have a unique ID falling in the specified range), the response will be corrupted due to the collision of the responses, and the bank controller issues a new SEARCH poll with a smaller range.

(3) When the Controller detects that only one MCI answers within the specified range, the bank controller assigns it a nickname that identifies this MCI on the OL link for the duration of the session (i.e. until the MCI drops off line, power is lost, etc.).

Each MCI can also be addressed as part of a group identified by a 16 bit group number. MCIs always belong to a group known as an "everyone" group. Any MCI message can be addressed to a group, but an MCI never answers a group message. The SEARCH poll and ACTIVITY poll (described below) are special broadcast messages that do not comply with this rule.

Figure 13:
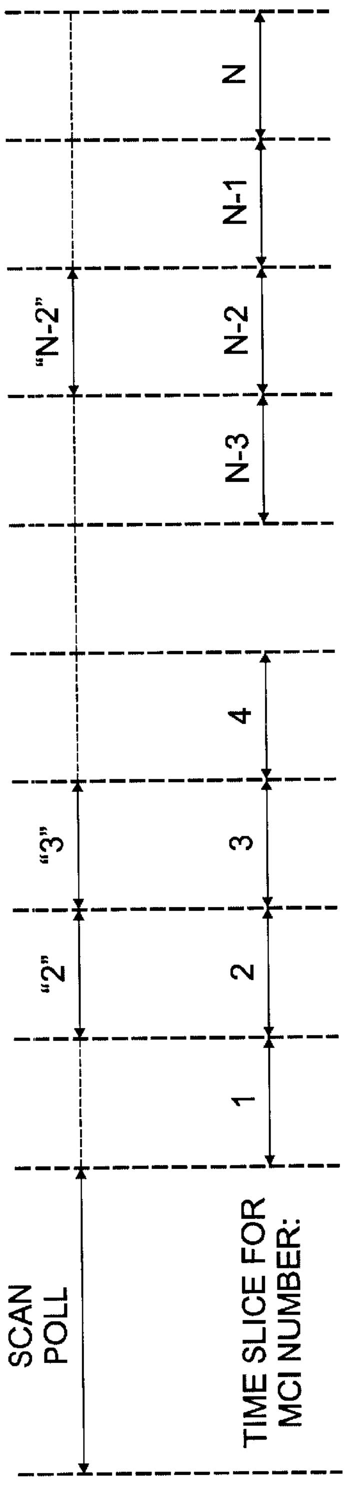
FIG. 13 is a timing diagram showing the operation of a scan poll communication cycle between a bank controller and a machine communication interface.

The bank controller communicates with the MCIs primarily through the use of scan polls and activity polls. Referring to FIG. 13, the bank controller first broadcasts a SCAN poll to determine which MCIs have something to report. Each MCI is given a response time slice following the last byte of the SCAN poll. MCIs that need to report data answer the SCAN poll with their nickname during their allocated time slice. MCIs having no data to report do not respond to the SCAN poll. In the example shown in FIG. 13, MCIs 2, 3 and N-2 indicate that they have something to report. N is a fixed parameter in the system and determines the polling speed. Preferred values of N are 16 or 32 (i.e. a maximum of 16 or 32 MCIs per bank controller).

Timing has to be very precise at the MCI end to ensure that the MCI answers during its allocated time slice and that its answer does not collide with another MCI's response. The time slice allocated to each MCI is preferably 1.5 times greater than a byte transmission time. Timing is accomplished by using hardware timers at interrupt level. The bank controller does not have to check the timing of the responses because each MCI answers with its nickname. The bank controller takes each byte as it comes in and compiles a list of the MCIs that have information to report. An MCI answers the SCAN poll every time a primary meter changes, every time a new event report packet is generated (i.e. every time a new event occurs), every time the MCI status changes, every time an event report packet needs to be resent, and any other time it wants to be polled by an activity poll.

Figure 14:
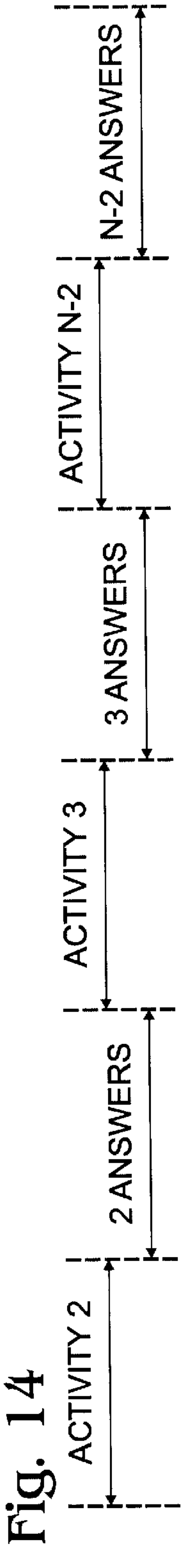
FIG. 14 is a timing diagram showing the operation of an example of an activity poll communication cycle following the scan poll cycle of FIG. 13.

After conducting a SCAN poll, the bank controller uses one or more ACTIVITY polls to retrieve the information from the MCIs that responded to the SCAN poll. FIG. 14 shows the sequence of activity polls that would be used after the example scan poll shown in FIG. 13. Referring to FIG. 14, the bank controller first polls MCI 2. MCI 2 then answers with a response that includes the information it has for the bank controller. The bank controller then polls MCI 3, which answers with its a response. The bank controller continues polling the MCIs until it has collected information from all of the MCIs that responded to the scan poll.

Figure 15:
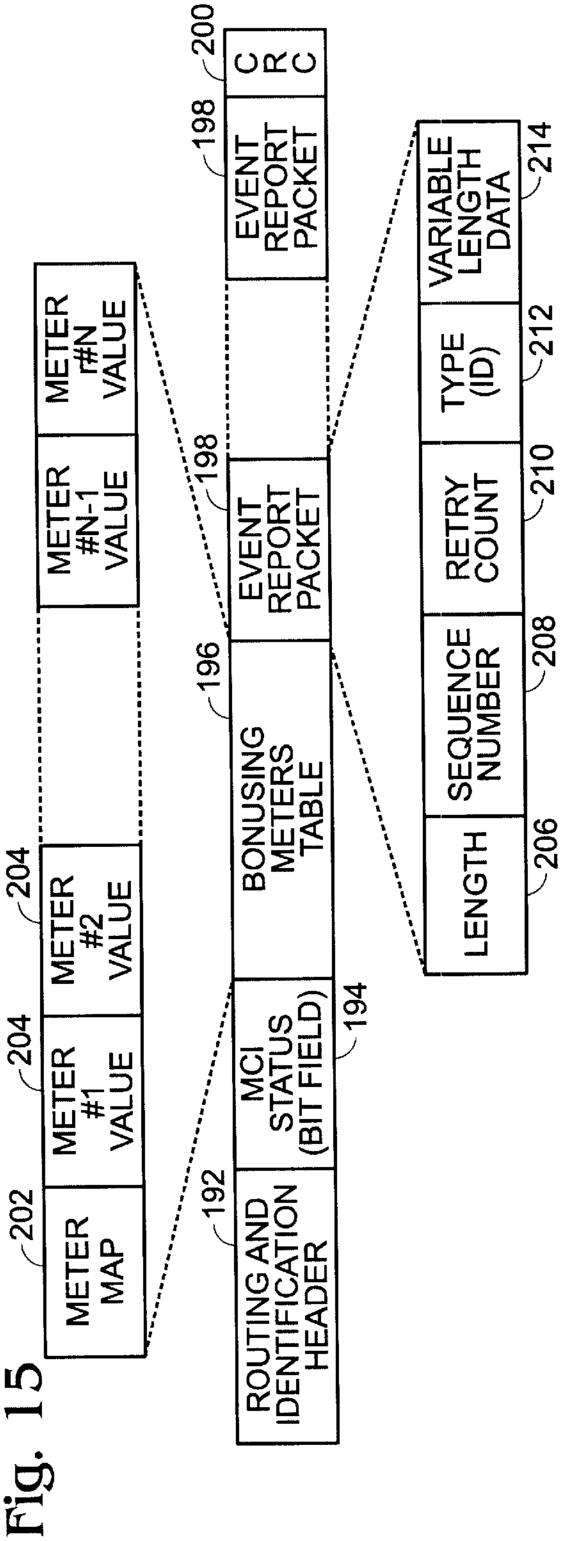
FIG. 15 is a block diagram of an example of an answer message sent from a machine communication interface in the activity poll cycle of FIG. 14.

A typical response sent by an MCI is shown in FIG. 15. The response includes the following: a routing and identification header 192; an MCI and player status field 194; a bonusing meters table 196; one or more event report packets 198; and a cyclical redundant check figure (CRC) 200. The exact contents of the activity poll response can be changed to accommodate different applications; however, the bonusing meters table is always included so as to allow recovery of the meter values if a message is not received properly by another device in the system.

The MCI and player status field 194 includes information on whether the gaming device is actively being played, card status, etc. The bonusing meters table 196 includes all meters 204 that need to be monitored on a real time basis to support bonusing. The meters being monitored can be changed to accommodate different applications, so the table is preceded by a meter map bit field 202 that indicates which meters out of the entire set of meters being monitored are used for bonusing.

Each event report packet 198 includes information on security events, jackpots, card insertions, etc. Each event report packet has its own sequence number 208 and is acknowledged separately. Event report packets are appended to the ACTIVITY response until they are acknowledged. If the number of packets is too great for the total message length, the events that occurred first are appended, and subsequent events are appended on subsequent polls.

If the MCI does not receive an acknowledgment to an event within a predetermined number of SCAN polls, it appends the event to the subsequent SCAN poll and increments the retry count associated with the event. After a certain number of retries, the MCI appends the event to its SCAN is less frequent intervals. The MCI keeps appending this event at the reduced frequency until it has been acknowledged by the bank controller (potentially forever). The retry count associated with the event informs the rest of the system how many times the event has been transmitted.

When the retry counter reaches its maximum value it stays at that value, but the MCI keeps retrying. Another device in the system can then decide to log the event to a special file and acknowledge the event to inform the MCI that it should stop sending it.

The bank controller (and other parts of the system, using the bank controller as a gateway) can poll the MCI for a variety of data such as its status or the values of the meters it maintains on its own (such as number of openings of the MCI cover) or to ask the MCI to perform other specific actions. The MCI answers the bank controller either with the proper poll answer, an acknowledgment message, or no answer at all depending on the communication protocol used between the bank controller and MCI. The MCI typically has very little processing to do before it answers the poll, so the poll answer is sent immediately following the poll, i.e. there won't be any outstanding polls. If the MCI does not answer within a predetermined period of time, the bank controller decides the MCI did not answer and takes proper action, e.g., retry the transmission. With passthrough polls (described below), however, the bank controller does not expect a response from the MCI. Polls for data are given a lower priority than the SCAN/ACTIVITY cycle in the processor on the MCI and are used as sparsely as possible. The MCI is code is preferably written to minimize the time required to answer polls.

The bonusing promotion system of the present invention can also act as a "conduit" to pass queries from a host system all the way to the gaming device. To facilitate this function, queries from the host are embedded in a special passthrough packet. It can take a substantial amount of time for the MCI to pass the query on to the gaming device, for the gaming device to process it, and for the MCI to get the answer back to the bank controller. Thus, to prevent a communications bottleneck on the OL link while the gaming device is processing a passthrough query, the MCI does not answer passthrough messages as it does with other polls. Instead, the MCI passes the message through to the gaming device and waits for a response. The bank controller does not look for a normal response from the MCI, but instead, expects to eventually see an event message from the MCI which the bank controller treats as the response. When the MCI receives the gaming device's response to query message, it embeds the response into a special event packet and answers the next SCAN/ACTIVITY poll, thus allowing it to send the information back asynchronously. The bank controller then detects this "event" and builds a proper response packet for the rest of the system, i.e., makes it look like a normal query response to the rest of the system. The bank controller then acknowledges this "event," and if the source of the query does not receive the answer, it sends the query again. Thus, by using an event to acknowledge a passthrough message, the bank controller is allowed to keep generating other polls, thereby increasing the throughput of the entire system.

The bank controller (and other devices through the bank controller) can also access the MCI's peripherals directly. For example, a bonus server can cause the card reader bezel to change color when a specific condition is met by addressing the card reader device directly through the MCI. To accomplish this, all messages addressed to an MCI, whether point-to-point or broadcast, are passed directly into the MCI's peripherals through the local OL serial link.

4. Code Updates

Referring to FIG. 12, the MCI code contained in the RAM code page P0 can be updated by the bank controller. Code downloading is done at installation time, during a code upgrade (to support new bonuses for example), or in the event the RAM code is corrupted. Each version of the MCI software is identified by a software identification number (SID). The SID is unique for each version of the MCI software.

Each version of the MCI software is also provided with a software check figure (SCF) as discussed in the section on boot loader operation. The software check figure is a two byte quantity that allows verification of software integrity. When a new version of the code is downloaded and validated, its SCF is stored at a predefined memory location, and that stored value is used for all subsequent checks. The MCI continuously runs a background code integrity check by continuously recalculating the SCF of the code it is running and comparing it to the stored SCF. The SCF can be implemented as a fixed seed and polynomial or as a checksum. The SCF is only used as an internal code integrity check, it is not used as a security feature against tempering like the SID is.

The bank controller uses a "CHECK" message to inform the MCIs of the SID of the software they should be running. As with any bank controller message, the CHECK message can be sent to all MCIs on the link, to a specific group of MCIs, or to a single MCI. When an MCI receives a CHECK message, it will compare its own SID to the SID embedded in the message. If the SIDs match, the MCI does not answer. If the SIDs are different the MCI answers with a "NACK" message. Note that several MCIs could be answering a CHECK message simultaneously, thus causing a collision resulting in an unintelligible packet. Therefore, if the bank controller detects any line activity after a CHECK message, the answer packet is interpreted as a NACK (i.e. at least one MCI needs a code upgrade). The bank controller then knows that at least one MCI on the link needs a code update.

Since checking of the SID is initiated by the bank controller, it must be done often enough to service any MCI that needs a code update in a timely fashion. As a guideline, the CHECK message should be sent by the bank controller every time an MCI or group of MCIs come on line, each time a software upgrade is needed, and at regular intervals.

When the Bank Controller determines that at least one MCI on the link needs a code update, it sends a series of DOWNLOAD messages either to a specific MCI, a group of MCIs, or all MCIs on the link. Preferably, however, the DOWNLOAD message is sent to all MCIs whether they need it or not. The MCI loads the downloaded code into its scrap code pages (P2 and P3) and does not overwrite the code that is running at that time. No acknowledgement of to the DOWNLOAD message is required because, if an MCI were to miss a packet, the code upgrade would not be validated, and the whole cycle would over with the next CHECK message. Code is preferably downloaded during times when there is no other activity so that new code can be sent without interrupting the operation of the gaming device. The code can ultimately originate from the bank controller, the concentrator, or any other device which can receive new code from a modem or storage disk.

The bank controller sends a REBOOT message to the MCIs after all DOWNLOAD messages have been sent. The REBOOT message is substantially similar to the CHECK message, but instead of validating the code currently being executed, it validates the downloaded code. If the validation is correct and the SID is different from the software currently being executed, the MCI copies the downloaded code into the main code page and reboots. If the validation is not correct, the MCI answers the next CHECK message and the downloading cycle starts over. The REBOOT message preferably provides options for conditions under which to reboot such as: reboot immediately; reboot only if no card is present; reboot only if credit meter is zero; reboot only if the main gaming device door is open; reboot at a specific time; etc.

5. Communication With the Gaming Device

Referring to FIG. 7, the MCI collects information from the gaming device over the RS422 serial link 26 using a suitable protocol such as ASP 1000. The MCI only utilizes a subset of the information available from the gaming device. The rest of the information is either used by the host or other parts of the bonusing promotion system, or goes unused. The information that is actively collected or monitored by the MCI includes the primary meters used for bonusing purposes, bonusing related parameters, and some events. All requests received from the front end system (host), or events generated by the gaming device that do not fall into any of the categories above, are passed blindly to and from the gaming device. This means that they encapsulated in a "wrapper" and routed through the bonusing promotion system without any processing being done to the packet. It is important to note that using pass through messages can degrade the performance of the bonusing system. This is why primary meters are collected independently rather than using the pass through mechanism.

Primary meters are the meters that are constantly collected by the MCI and constantly updated at the Concentrator. The primary meters are used for bonusing purposes. Examples of primary meters are: total money turnover, total money won (including jackpot), and total money out as bonus credit. At initialization time, the parameters corresponding to the primary meters above are set up to generate an event every time they change. Whenever the MCI receives an update to one of the meters, it copies the corresponding value into its local copy of the meters to be reported to the bank controller.

The MCI reports events received from the gaming device in the course of regular polling of the gaming device. The MCI also issues commands to the gaming device over the serial link. For example, when a bonus needs to be awarded, as for instance, when a participation jackpot is hit, the MCI issues credits to the player by sending a command to the gaming device. The command includes information such as whether to issue money or credits, the amount of the bonus, the unique ID of the MCI and a transaction count. A transaction count is incremented by one at the end of the bonus operation. The transaction count is saved in non-volatile RAM and is never cleared by the MCI. Alternatively, the gaming device can keep track of the transaction count and report it when it confirms a bonus payout.

The bonusing system may want to disable a gaming device, for example when a bonus is awarded by hand or when the bonus is a non-cash bonus such as a car. In order to disable the gaming device, the MCI issues a command over the serial link telling the gaming device to lockup and providing a "reason" parameter for the lockup, so that lockups due to bonuses are not mistaken for malfunctions. Then, when the bonusing system has determined that the game can be re-enabled (the system detected a bonus attendant card for example), the MCI will release the game by issuing another command.

6. Communication With the Peripheral Devices

Referring again to FIG. 7, the "Local OL" is the multi-drop opto-isolated =serial link 13 that the MCI uses to communicate with its peripherals such as the card reader, displays, etc. On the local OL link 13, the MCI is the master, and the local OL devices do not communicate unless polled. In a preferred embodiment, the protocol used on the local OL is compatible with the protocol used on the OL (the communication line between the Bank Controller and the MCI). Most OL communications addressed to the MCI are propagated on the Local OL. This enables external devices such as Bonus Servers to address the MCI's peripherals directly (e.g., to update a jackpot value on the display). The system can be implemented so that most local OL devices (such as displays) do not answer to the MCI, but receive their commands from other components.

Figure 16:
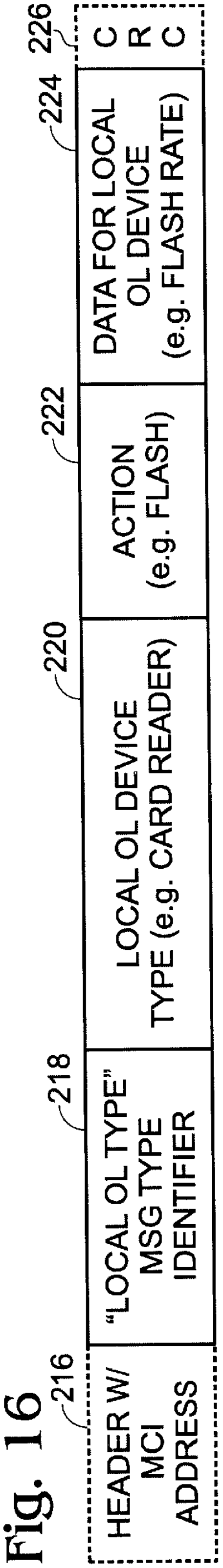
FIG. 16 is an example of a local OL serial communication packet.

An example of a local OL packet is shown in FIG. 16 and includes a header 216 with the MCI address, a local OL type message identifier 218, a local OL device type 220 (e.g., card reader, display, etc.), an action to be taken 222, data for the local device 224, and a cyclic redundancy check (CRC) value 226. The header 216 and CRC 226 are used by the MCI to decide whether to pass the message from its OL to its local OL. The local OL devices do not use the header and CRC value except for the purpose of checking the CRC.

As an example of local OL communication, the MCI polls the card reader on a regular basis, for example, three times per second. The card reader replies with the following information: card status (no card, valid read, invalid read, etc.), card ID number (typically 20 digits, zero padded if needed), and the bonus button state. The bezel color and flash rate are controlled separately through different messages.

Each MCI can support up to 16 displays, with each display being uniquely identified by a DIP switch setting on the display board. In order to increase system efficiency, display messages are loaded into the display at startup, and then retrieved in response to a shorthand message for quicker display response operation. Preferably, the display messages are sent from the bonus server which "teaches" the display by sending it strings of information (display messages). The strings are passed to the display by the MCI which does not understand the contents of the strings.

There are three different types of display information: static information, dynamic information, and control information. Static information, also referred to as message definition information, includes such things as message text, for example: "Hello, welcome to the Casino." Static information also contains information such as scroll rate, the pixel intensity, etc.

Dynamic information, also referred to as token values, includes information that indicates to the display the value associated with a specific token. Tokens can be embedded in static information, for example, "Hello <player name>, welcome to the Casino. The current jackpot is <jackpot value>". When the display finds a token in the static information of a message being displayed, it replaces it by the value associated with the token. For example <player name> is replaced by "John Doe", and <jackpot value> is replaced by "$234.67", etc. Tokens are continuously updated, regardless of whether they are actually used by the display or not. Preferably, the display updates the tokens that are being displayed in real time. Thus, if a message containing a token is scrolling across the display screen, the player can see the token change even as the message scrolls by as opposed to waiting until the next scroll cycle to update the value on the screen.

Control information indicates which message to display. The MCI is responsible for issuing the control information to the display based all the information available to it. In particular, the MCI will handle prioritization of messages.

The MCI preferably does not control the static display information, but rather, the display information is sent directly to the display at startup, from outside of the MCI, e.g. from a bonus server or translator. The MCI controls only the dynamic information it "owns."

The MCI is also responsible for controlling other devices such as the card reader bezel and the audible bonus indicator ABI 122 (shown in FIG. 10) through the local OL link. In a preferred embodiment, these devices are integral to the card reader assembly and controlled by communicating with the card reader interface. These devices can be sent commands such as "flash bezel red 3 times a second", or "alternate playing first and second frequencies on the ABI 122 for 3 seconds".

To provide flexibility in the effects associated with all of the possible conditions that can change the devices' states, the MCI does not build the commands to these devices directly. Instead, at startup, the MCI receives a table of "local OL packets". When a specific event occurs (the player wins a participation jackpot, for example), the MCI gets the corresponding packet from the table and sends it over the Local OL without any knowledge of what is contained in the packet. For example, the packet associated with a bonus winner could contain the Local OL messages "ring ABI 122 ten times", "Flash Bezel red", "display winner message".

7. Bonus Engines

Bonus engines are MCI software modules that implement a specific type of bonus, either independently, or on cue from a bonus server. The bonus engines are the "intelligence" that use the MCI hardware and the software services available through other MCI software modules to support bonuses such as participation jackpots or progressive jackpots.

In a preferred embodiment, most of the decision making "intelligence" of the bonusing promotion system is located in the bonus servers. The MCIs execute tasks and pass along message packets in response to instructions from the bonus servers. However, the MCIs must implement some decision making functions for bonusing features that are time-critical or would require excessive communication overhead if controlled by the bonus server.

An example of a bonusing promotion that requires decision making by a bonusing engine is a multiple jackpot promotion. To implement this promotion, the MCI sends a command to the gaming device instructing it to multiply all wins between a specified minimum and maximum amount (inclusive) by a certain multiplier. The command includes parameters specifying the multiplier, minimum win amount, maximum win amount, and the duration of the promotion. The duration parameter is set to the total expected duration of the bonus, plus an additional margin. The MCI can re-iterate its message several times during the bonus session with an adjusted duration, and possibly a different multiplier. To end the bonus session, the MCI sends a message with a duration set to zero.

Another bonus engine is the eligibility engine. Although not a bonus per se, eligibility to receive a bonus is an "intelligent" decision with specific rules, which could change. It is isolated in its own software module to allow easier modification. This module provides a service function which returns the current eligibility status of the player to any other module.

The eligibility engine is also responsible for triggering the changes in the visual eligibility indicator which is preferably the card reader bezel. For example the eligibility engine can cause the bezel to be illuminated solid red if the EGM is not eligible for bonuses, solid orange if the EGM is eligible for bonuses and no card is inserted, solid green if the EGM is eligible for bonuses and a valid card is inserted, etc. The bezel can also be used to indicate other conditions, such as flash red if a card is not inserted properly.

An example of eligibility logic that can be implemented by the eligibility engine is as follows; for uncarded play, the player is eligible if there has been a coin or currency insertion within the past XX seconds, the game has been played within the last YY seconds, or credits have been paid within the last ZZ seconds; for carded play, the player is eligible if there has been a valid insertion of card within last AA seconds, there has been a coin or currency insertion within the past XX seconds, the game has been played within the last YY seconds, credits have been paid within the last ZZ seconds, or average play during the session exceeds bonus button 315 credits per minute. In the example above, XX, YY, and ZZ are variables which can be adjusted by the operator.

Any game tilt extends eligibility. For example, if a player is playing a game with eligibility on (Orange bezel) and the game detects a coin jam, the eligibility light stays on until the tilt is cleared.

8. Player Tracking Records

When a player inserts a card in the card reader, the MCI opens a Player Tracking Record (PTR). All relevant play data that occurs while that card is inserted is recorded until the card is removed. When the card is removed, the MCI forwards the record to the front end system (DACOM host), via the rest of bonusing promotion system. If the link is down (i.e. the MCI does not receive an acknowledgment for a PTR it has transmitted), the record is queued in the MCI's battery backed up memory and is sent whenever the link comes back up. The MCI only queues a limited number of Player Tracking Records, after which it will not accept any new card insertions. Instead, it displays an appropriate message to the player indicating that no play will be recorded. This message can be accompanied by a change of bezel color or ABI 122 ring.

The maximum number of Player Tracking Record depends on available memory but preferably is not less than 25. The more memory that is available for PTRs, the longer the system can be down without loosing data. Player Tracking Records that do not contain any play information ("trivial records") are not queued. If a player inserts a card, then plays some, removes the card, then reinserts the card, play some more, and finally removes the card, two different player tracking records are generated. If the MCI is powered down while a card is inserted, the MCI generates a PTR at power up, indicating how much play occurred before the power loss.

An example of the type of information recorded in a Player Tracking Record is as follows: Player Tracking Record Identifier Number, Card Number, Turnover played, Wins, Coin to drop, Games Played, Canceled Credits, Time Played, credits used, Credits awarded, and Player Compensation Points received.

9. Software Structure a. Software Modules

Figure 17:
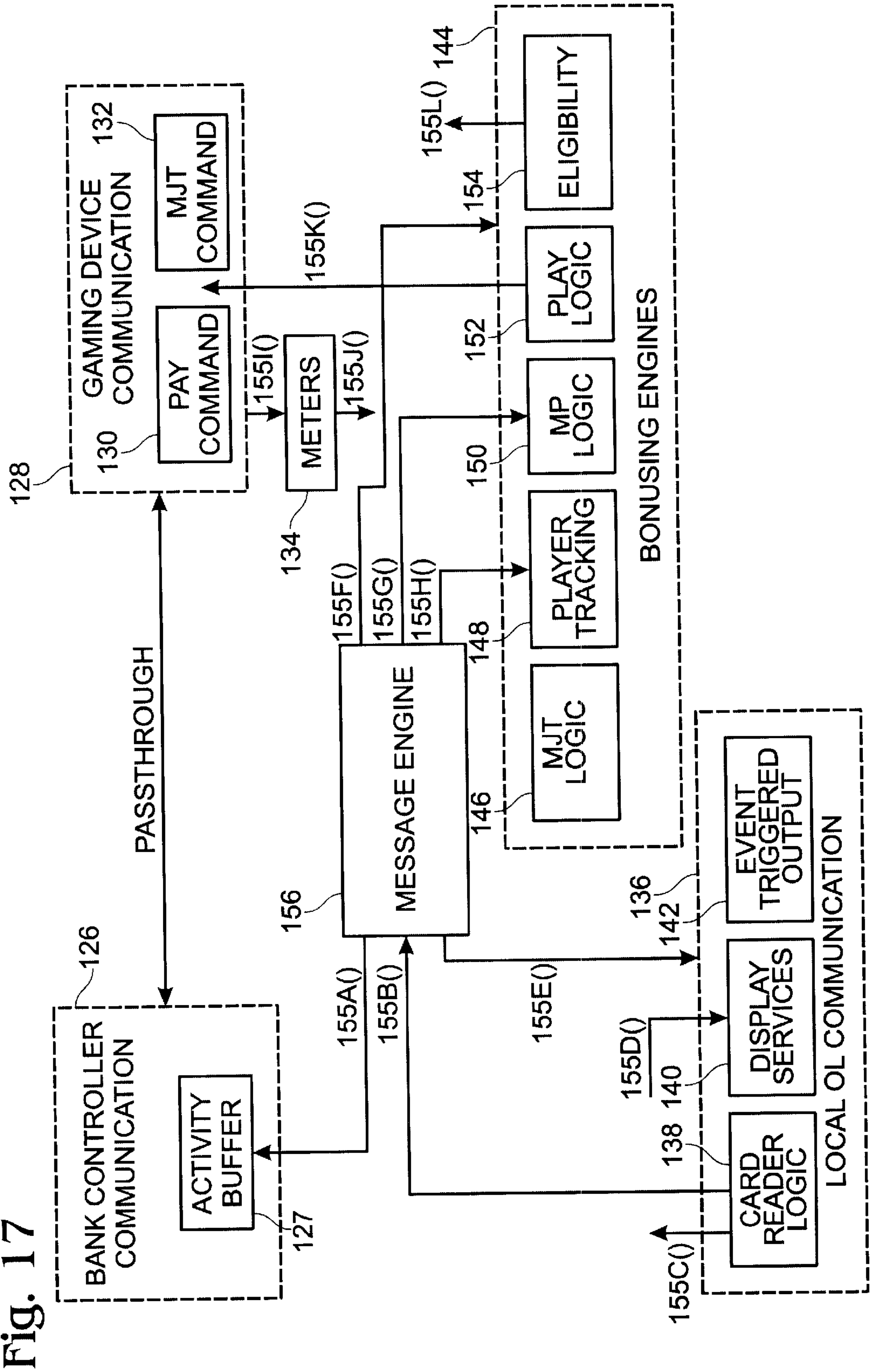
FIG. 17 is a simplified functional block diagram of a software structure for controlling a machine communication interface.

A simplified functional block diagram of a software structure (program architecture) for controlling the machine communication interface is shown in FIG. 17. In the described embodiment, the program structure is embodied as a computer program (software or firmware) running on the microprocessor 32 as shown in FIG. 8. The program is preferably written in the "C" programming language with portions written in assembly language if necessary.

In the example shown in FIG. 17, the architecture includes numerous, somewhat independent modules and a central message engine 156 which implements all of the "intelligence" of the interactions between modules. Some modules are grouped together into "super modules." A bank controller communication supermodule 126 (also referred to as a network communication super module or OL communication super module) performs all of the tasks required to maintain communications with the bank controller over the OL serial link. A gaming device supermodule 128 interfaces the MCI to the gaming device and shields the rest of the modules from the details of the protocol used to communicate with the gaming device. The gaming device supermodule includes a bonus pay command module 130 and a multiple jackpot command module 132.

A meters queue 134 stores the values of meters from the gaming device.

A local OL supermodule 136 shields the rest of the modules from the details of the protocol used to communicate with the peripheral devices over the local OL serial link. The local OL supermodule includes a card reader logic module 138 which handles communications with the card reader, a display services module 140 which handles communications with the display, and an event triggered output module 442.

A bonusing supermodule 144 controls the bonusing decision making that occurs at the MCI level. The bonusing supermodule includes a multiple jackpot module 146, a player tracking module 148, a money or credit matching promotion (TM "MATCH PLAY") module 150, a bonus pay logic module 152, and an eligibility module 154.

The modules carry out actions through interface functions. For example, calling the display services module 140 with the "155D( )" function causes the display module to update the display token that is passed as a parameter. Thus, the action carried out is encapsulated within the display services module, or to a greater extent, within the Local OL super-module 136.

Modules can also run "on their own" through a cooperative multitasking scheme. For example, the card reader logic module 138 polls the card reader at regular intervals, regardless of whether its "155C( )" interface function is called or not.

The modules also communicate with other modules through the use of interface functions. For example, any module can ask the eligibility module 154, which encapsulates the bonus eligibility rules, if the player is currently eligible for bonuses by using the "155L( )" function, which returns TRUE or FALSE. As another example, the bonus pay logic module 152, which can award a bonus based on game results, can cause the gaming device to pay a bonus by calling the bonus pay command module 130 with the "155K( )" command. The bonus pay command module 130 then encapsulates all of the gaming device specific logic needed to cause the proper bonus to be paid.

The arrows in FIG. 17 illustrate examples of interface functions which pass data and request actions between the modules and the message engine but is not an exhaustive representation of the system. Others modules, supermodules, and interface functions can be added or removed as needed to implement various bonusing promotions and to support different hardware configurations.

All messages are directed to the Message Engine, which in turn, decides what actions need to be taken (i.e. which module interfaces functions must be called). For example, when a card is put in the card reader, the card reader module sends a "155B( )" message to the message engine which tells it that a card has been inserted. In response to the card insertion, the Message Engine calls the following interface functions: "155H( )" which causes the player tracking module 148 to open a new player tracking record; "155G( )," which causes the credit matching module 150 to perform the processing associated with a card insertion; "155F( )" which causes the bonus engine to re-evaluate the player's eligibility; "155A( )" which causes the card insertion to be reported to the bank controller; "155E( ) " which causes the proper Local OL packet to be sent to the bezel and display; and any other modules and interface functions necessary for responding to a card insertion.

Meters are a special independent type of module that can be updated by other modules through the "155I( )" interface function and read through the "155J( )" interface function.

An advantage of the software architecture described above is that it breaks the program into small and manageable modules with a well defined interface. Each module can be rewritten independently to support a new protocol or add new functionality. The design allows different members of a software development team to write up a modules independently of the other modules. Another advantage is that centralizing the "intelligent" decision making in the message engine 156 makes the software easy to understand, control, and debug. Yet another advantage is that it allows the gaming device's "language" or protocol to be largely isolated from the rest of the MCI software so that it can be adapted to other protocols by just changing a few modules.

b. Module Implementation

Each module is preferably implemented as a finite state machine to allow cooperative multitasking. Each interface function is called by a main program loop and returns after a single, small step has been executed. In many instances, the interface function does nothing but cause the state machine to change state. The main program loop needs to call each finite state machine engine to run them "simultaneously".

Figure 18:
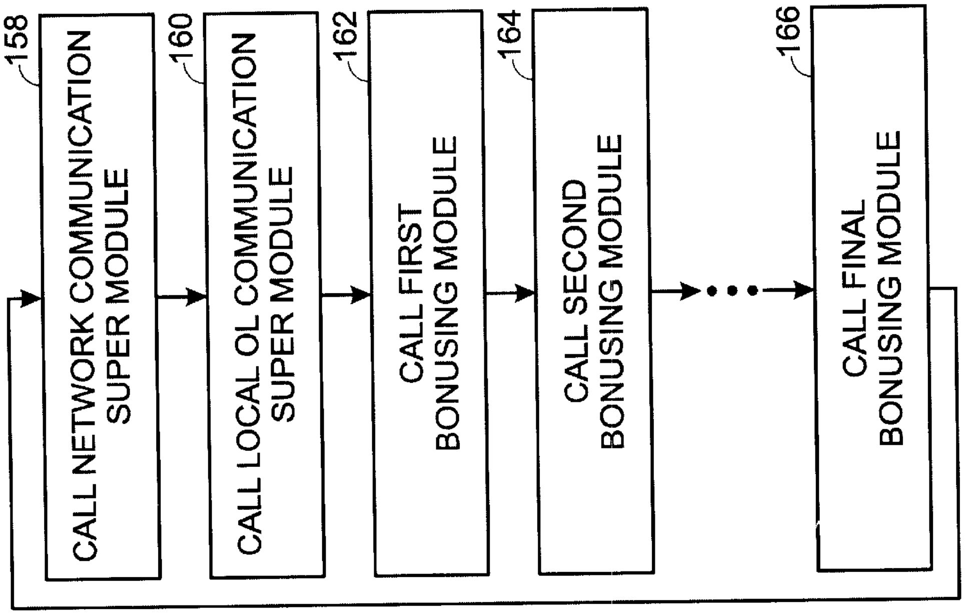
FIG. 18 is a flow diagram of an embodiment of a main program loop for a machine communication interface.

FIG. 18 is a flow diagram of an embodiment of a main program loop for the processor 32 of the MCI. The loop begins at step 158 by calling the bank controller communication super module 126 which performs a small step and then returns to the main loop. During the next step 160, the main loop calls the local OL communication module 138 which, in turn, calls the card reader logic module 138, the display services module 140, etc. In steps 162 through 166, the main loop calls all of the bonusing state machines, e.g., the multiple jackpot engine 146, the eligibility engine 154, etc. If one of the bonusing state machines is unused, it returns immediately when called.

The message engine is preferably implemented in the "C" programming language as a "switch( )" statement. This allows the MCI's behavior for a certain condition (a certain message), to be understood or changed by looking up or changing the corresponding "case" statement.

Interface functions are preferably defined as macros when possible to maintain the code's efficiency. The use of macros as interface functions hides (encapsulates) the actual variable or action behind the function. Efficiency is further enhanced by implementing some interface functions as in-line functions, thus eliminating the associated function call overhead.

c. Bank Controller Communication Super Module

Figure 19:
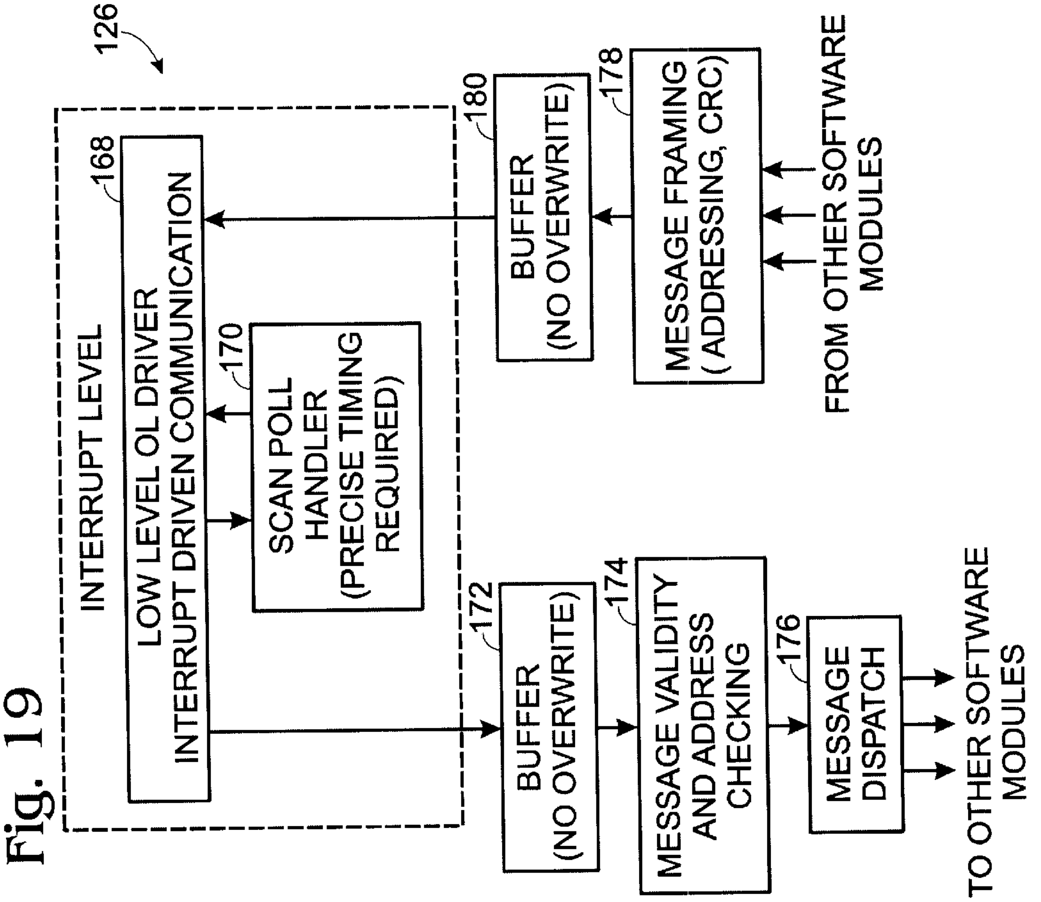
FIG. 19 is a simplified functional block diagram of the software structure of the bank controller communication super module of FIG. 17.

FIG. 19 is a simplified functional block diagram of the software structure of the bank controller communication super module 126 of FIG. 17. Referring to FIG. 19, a low level interrupt OL driver 168 receives and transmits data bytes on the OL link to the bank controller. The interrupt driver includes a receive routine which extracts messages from the input stream using a simple state machine that waits for a length byte to come in to determine the number of bytes N in the message, then retrieves the N bytes and queues the message in a receive buffer 172. The interrupt driver sets a flag when the buffer is full. A message validity and address checking submodule 174 validates messages and addresses received from the bank controller. A message dispatch submodule 176 then routes the messages to the appropriate destination, e.g., to another module within the MCI or to the local OL link for passthrough to a peripheral device.

A message framing module 178 processes messages from other modules and peripheral devices and stores them in a transmit buffer 180. A transmit routine in the interrupt driver 168 then sends the messages out to the bank controller over the OL link. After the bank controller sends a poll to an MCI, it waits for a poll response before sending the next poll to that particular MCI. Thus, at any given time, there is only one poll response in the transmit buffer 180.

The state machine resynchronizes to a "looking for header" state as soon as at least 4 characters time have elapsed without any character being received. This implementation, although less reliable, is preferred over a sliding window because it is less expensive in terms of processing power, and allows for the detection of the SCAN message at interrupt level through a SCAN poll handler 170. In operation, most transmission are preceded by a time with no transmission. The receive interrupt driver also needs to detect SCAN messages to setup a fall-back timer as precisely as possible.

To improve efficiency, the implementation software avoids copying data between buffers. Also, to limit poll latency (especially for the ACTIVITY poll), poll answers are preprocessed before the poll is received. For example, when a SCAN message is received, the MCI "freezes" its ACTIVITY response buffer so that the buffer is ready to be sent when the ACTIVITY poll is received. Thus, this scheme spreads out what would be "burst processing" over a longer period of time.

d. Local OL Communication Super Module

Figure 20:
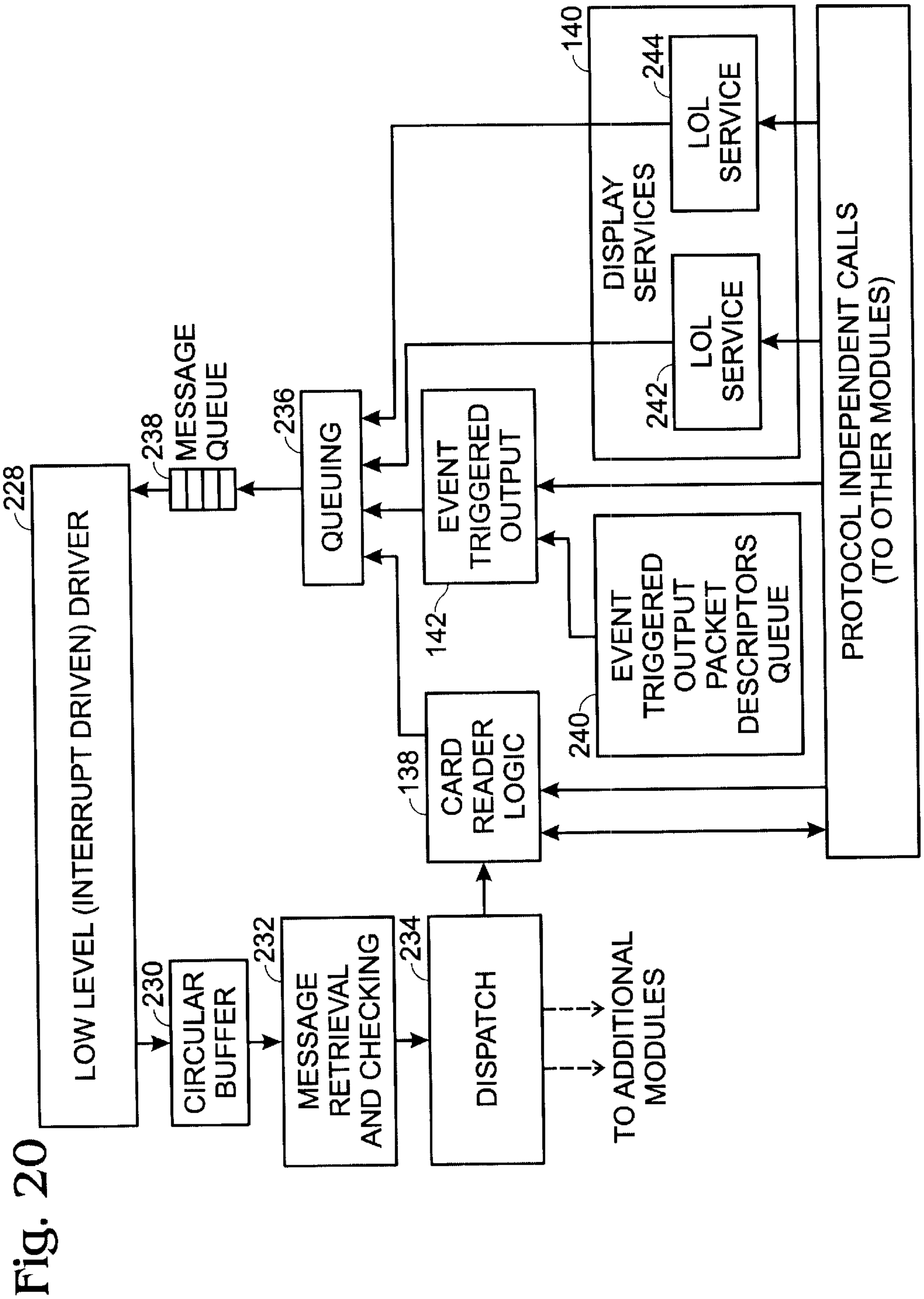
FIG. 20 is a simplified functional block diagram of the software structure of the local OL communication super module shown in FIG. 17.

FIG. 20 is a simplified functional block diagram of the software structure of the local OL communication super module 136 shown in FIG. 17. Referring to FIG. 20, the local OL super module 136 includes an interrupt driven, low level communication driver 228 which receives bytes from the local OL link and places them in a circular buffer 230. A message retrieval and checking module 232 processes each message and passes it along to a message dispatch module 234 in response to an interface function. The message dispatch module 234 forwards the received messages to the card reader logic module 138 or other modules based on a protocol identification byte embedded in the message.

Messages that the MCI needs to transmit out over the local OL link are processed by a queuing module 236 which collects messages from the card reader logic module 138, the event triggered output module 142, and the display services module 140 and places them into a message queue 238. The queue does not hold the actual messages, but rather, pointers to message descriptors. The low level driver 228 retrieves the messages from the queue and transmits them one byte at a time over the local OL link.

When the event triggered output module 142 receives an event notification from another module, it retrieves the corresponding message packet descriptor from a packet descriptor queue 240 and sends it to the message queuing module 236 by means of a function call.

The display services module 140 includes one or more local OL submodules such as submodules 242 and 244 which send messages in response to function calls from other modules. For example, when local OL submodule 244 is called with a parameter "N", it sends a message to the display (via queuing module 236, message queue 238, and low level driver 228) telling it to display message N. As another example, when local OL submodule 242 is called with a parameter "X", it sends a message to the display telling it to update display token X.

The modules of the local OL super-module 136 shield the rest of the software from protocol dependent considerations and maintaining the local OL link. Only protocol independent functions are called, for example to get the card number or update a display token.

e. Gaming Device Communication Module

Figure 21:
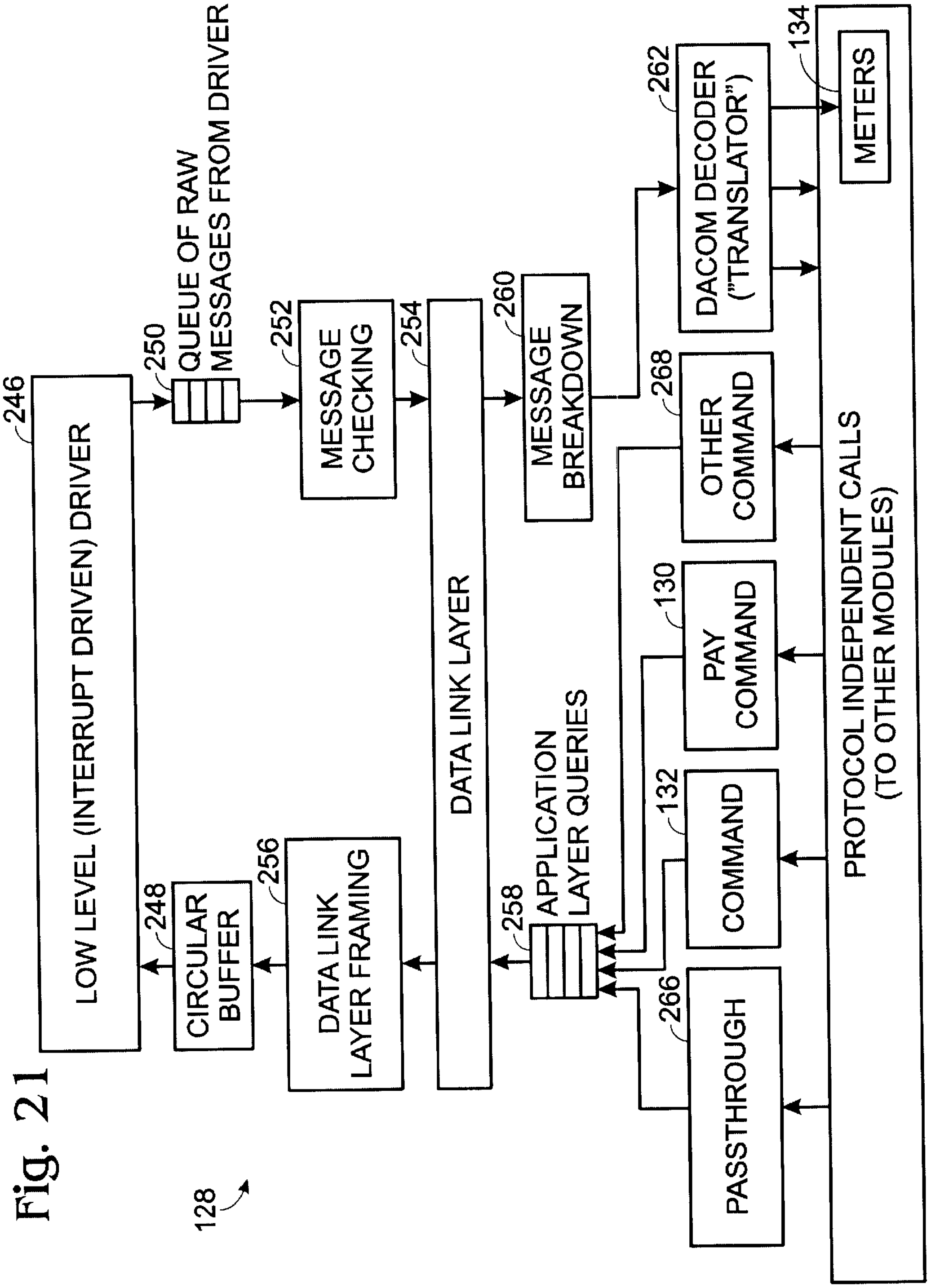
FIG. 21 is a simplified functional block diagram of the software structure of the gaming device communication super module as shown in FIG. 17.

FIG. 21 is a simplified functional block diagram of the software structure of the gaming device communication super module 128 as shown in FIG. 17. Referring to FIG. 21, the gaming device super module includes an interrupt driven, low level communication driver 246 which receives bytes from the gaming device over the RS422 serial link and places them in a raw message queue 250. A message checking module 252 validates incoming messages by performing a cyclical redundancy check (CRC) calculation.

Messages that need to be transmitted to the gaming device are processed by a data link layer framing module 256 which calculates a CRC value for the message, assigns each packet a sequence number for multi-packet messages, determines the message length, and performs any other functions necessary to frame the message. The message is then placed in a circular transmission buffer 248 from which the low level driver 246 transmits it one byte at a time to the gaming device.

A data link layer module 254 interfaces application level modules, such as the pay command module 130, to the lower level modules of the gaming device super module. The data link layer module also keeps manages retries of messages that are not properly acknowledged by the gaming device.

A message break down module 260 takes messages from the data link layer module 254 and breaks them down into "atomic" chunks which are then translated by the DACOM host translator module 262 into messages that can be used by other modules. The DACOM host translator module 262 also updates the meters values in the meters queue 134.

A layer of application modules includes a passthrough module 266, the multiple jackpot module 132, the bonus pay command module 130 and other optional command modules 268. Messages from the application layer modules are placed in a application layer queue 258 and then processed by the data link layer 254 before being sent out to the gaming device.

Having described and illustrated the principles of the invention in a preferred embodiment thereof, it should be apparent that the invention can be modified in arrangement and detail without departing from such principles. We claim all modifications and variations coming within the spirit and scope of the following claims.

What is claimed is:

1. A method for controlling a bonusing promotion system using a bonus server interconnected to a plurality of gaming devices, comprising:

accumulating a percentage of a wager played on each gaming device into a bonus pool stored on the bonus server;

comparing the bonus pool to a threshold value stored on the bonus server each time the bonus pool changes;

selecting one of the gaming devices when the threshold value is met;

awarding a bonus prize funded by the bonus pool to the selected gaming device;

accumulating a further percentage of a wager played on each gaming device into a hidden bonus pool stored on the bonus server;

dividing the hidden bonus pool into a plurality of consolation prizes; and awarding the consolation prizes to gaming devices other than the selected gaming device.

2. A method according to claim 1, wherein accumulating further comprises:

recording the wager on a meter on each gaming device;

receiving a meter reading on the bonus server from the meter on each gaming device;

comparing the meter reading to a meter reading previously received from the gaming device to form a delta value; and determining the percentage of the wager based on the delta value for each gaming device and adding the percentage to the bonus pool.

3. A method according to claim 2, wherein receiving a meter reading further comprises:

receiving the meter reading from each of the gaming devices at regular time intervals.

4. A method according to claim 1, wherein selecting one of the gaming devices further comprises:

choosing one of the gaming devices at random.

5. A method according to claim 1, further comprising:

rolling the hidden pool over into the bonus pool after awarding a bonus prize.

6. A method according to claim 1, further comprising:

generating an anticipation message after comparing the bonus pool to a threshold value when the bonus pool is within a predetermined count from the threshold value, the predetermined count representing a number of wagers required by the bonus pool to meet the threshold value.

7. A method according to claim 6, further comprising:

generating an award message for receipt by the gaming devices after generating an anticipation message.

8. A method according to claim 7, wherein generating an award message further comprises:

locking the gaming devices from further game play;

providing a visual indicator on the gaming devices; and providing an audible indicator on the gaming devices.

9. A method according to claim 1, further comprising:

sending a win message to a bank controller interposed between the bonus server and the gaming devices.

10. A method according to claim 9, further comprising:

activating a visual display on the bank controller responsive to receipt of the win message.

11. A method according to claim 9, further comprising:

activating a sound bank on the bank controller responsive to receipt of the win message.

12. A method according to claim 1, further comprising:

monitoring wagering activity frequency on each gaming device; and selecting those of the gaming devices with such a wagering activity frequency exceeding a predefined frequency as eligible to win the bonus prize.

13. A method of operating gaming devices interconnected by a computer network to a host computer comprising:

permitting players to play the gaming devices;

paying to each device in accordance with a pay table stored in the device;

selecting one of the gaming devices for a bonus;

indicating to the player of the selected device that the device is selected; and paying the bonus at the device responsive to a player-generated input to the gaming device;

paying a substantial award to a different one of the gaming devices prior to selecting one of the gaming devices for a bonus award;

after paying a substantial award to one of the gaming devices:

selecting a plurality of the gaming devices for a bonus;

indicating to the players of the selected devices that the devices are selected; and paying the bonus at the devices responsive to a player-generated input to each gaming device.

14. The method of claim 13 wherein said method further includes:

establishing a predetermined minimum level of gaming device play;

detecting wagers made at each of the gaming devices;

initiating a bonus period during which gaming devices that exceed the minimum level are eligible to be paid the bonus and gaming devices which do not exceed the minimum level are not eligible for the bonus.

15. The method of claim 14 wherein initiating a bonus period comprises transmitting a command over the network to the gaming devices.

16. The method of claim 14 wherein said method further comprises:

using the network to track the amount of money played on the selected gaming devices; and allocating a predetermined percentage played to a bonus pool.

17. The method of claim 16 wherein the bonus period is initiated after the bonus pool exceeds a predetermined level.

18. The method of claim 13 wherein indicating to the player of the selected device that the device is selected comprises transmitting a pay command from the host computer over the network.

19. The method of claim 14 wherein said method further comprises:

storing data defining the predetermined minimum level of gaming device play in a memory at the gaming device; and comparing the level of gaming device play with the stored data.

20. The method of claim 14 wherein said method further includes indicating to a player of the gaming device whether or not the gaming device is eligible to be paid a bonus.

21. A method of operating gaming devices interconnected by a computer network to a host computer comprising:

establishing a predetermined minimum level of gaming device play;

detecting wagers made at each of the gaming devices; and initiating a bonus period during which gaming devices that exceed the minimum level of play are eligible to be paid a bonus responsive to the occurrence of a predetermined event and gaming devices that do not exceed the minimum level of play are not eligible for such a bonus.

22. The method of claim 21 wherein said method further comprises creating a player account accessible by the host computer;

providing access to the account responsive to a command initiated by a player at said one gaming device; and determining whether the command is valid.

23. The method of claim 22 wherein said method further includes indicating to the player whether or not the gaming device is eligible to be paid a bonus.

24. The method of claim 23 wherein indicating to the player whether or not the gaming device is eligible to be paid a bonus comprises actuating a light visible to the player.

25. The method of claim 22 wherein said method further comprises applying a first criterion for paying the bonus to a player providing a valid command and a second criterion for paying the bonus to a player who does not provide a valid command.

26. The method of claim 22 wherein said method further comprises applying a first criterion for paying the bonus to a named player and a second criterion for paying the bonus to an anonymous player.

27. The method of claim 21 wherein initiating a bonus period comprises transmitting a command over the network to the gaming devices.

28. The method of claim 21 wherein said method further comprises:

using the network to track the amount of money played on the selected gaming devices; and allocating a predetermined percentage played to a bonus pool.

29. The method of claim 28 wherein the bonus period is initiated after the bonus pool exceeds a predetermined level.

30. The method of claim 21 wherein the predetermined event comprises a jackpot paid at one of the gaming devices.

31. The method of claim 21 wherein the predetermined event comprises random selection of one of the gaming devices.

32. The method of claim 21 wherein said method further comprises paying a bonus to a gaming device responsive to a pay command transmitted from the host computer over the network.

33. The method of claim 21 wherein said method further comprises:

storing data defining the predetermined minimum level of gaming device play in a memory at the gaming device; and comparing the level of gaming device play with the stored data.

34. A method of operating gaming devices interconnected by a computer network to a host computer comprising:

permitting players to play the gaming devices;

paying to each device in accordance with a pay table stored in the device;

establishing a predetermined minimum level of gaming device play;

detecting wagers made at each of the gaming devices;

initiating a bonus period during which gaming devices that exceed the minimum level are eligible to be paid the bonus and gaming devices which do not exceed the minimum level are not eligible for the bonus;

paying a substantial award to a different one of the gaming devices prior to selecting one of the gaming devices for a bonus award;

selecting each of the eligible gaming devices for a bonus;

indicating to the players of the selected devices that the devices are selected; and paying the bonus at the devices responsive to a player-generated input to each gaming device.

35. The method of claim 34 wherein initiating a bonus period comprises transmitting a command over the network to the gaming devices.

36. The method of claim 34 wherein said method further comprises:

using the network to track the amount of money played on the selected gaming devices; and allocating a predetermined percentage played to a bonus pool.

37. The method of claim 36 wherein the bonus period is initiated after the bonus pool exceeds a predetermined level.

38. The method of claim 34 wherein indicating to the players of the selected devices that the devices are selected comprises transmitting a pay command from the host computer over the network.

39. The method of claim 34 wherein said method further comprises:

storing data defining the predetermined minimum level of gaming device play in a memory at the gaming device; and comparing the level of gaming device play with the stored data.

40. The method of claim 34 wherein said method further includes indicating to a player of the gaming device whether or not the gaming device is eligible to be paid a bonus.

* * * * *

UNITED STATES PATENT AND TRADEMARK OFFICE

CERTIFICATE OF CORRECTION

PATENT NO. : 6,565,434 B1
DATED : May 20, 2003
INVENTOR(S) : Acres

It is certified that error appears in the above-identified patent and that said Letters Patent is hereby corrected as shown below:

Title page,
Item [56], References Cited, U.S. PATENT DOCUMENTS, "6,039,648 A * 3/2000 Guinn et al. ….. 463/163" should read -- 6,039,648 A * 3/2000 Guinn et al. ….. 463/16 --.

Column 7,
Line 6, "the preselected random" should read -- the pre-selected random --.
Line 65, "10) The cash" should read -- (10) The cash --.

Column 11,
Line 66, "a fixture visit" should read -- a future visit --.

Column 16,
Line 31, "is out red of order" should read -- is out of order --.

Column 27,
Line 19, "E. Display" should read -- F. Display --.

Column 34,
Line 28, (shown in FIG. 25." should read -- (shown in FIG. 25). --.

Column 44,
Line 28, "with its a response." should read -- with its response. --.

Column 47,
Line 64, "opto-isolated =serial link" should read -- opto-isolated serial link --.

Signed and Sealed this

Twentieth Day of July, 2004

JON W. DUDAS
*Acting Director of the United States Patent and Trademark Office*